(12) United States Patent
Noppel et al.

(10) Patent No.: US 11,492,106 B2
(45) Date of Patent: Nov. 8, 2022

(54) VERTICAL TAKE-OFF AND LANDING VEHICLE

(71) Applicant: FLUGAUTO HOLDING LIMITED, Tortola (VG)

(72) Inventors: Frank Noppel, Dubai (AE); Gerrit Michael Becker, Bad Homburg (DE)

(73) Assignee: BLUEFLIGHT INC., Brighton, MI (US)

( * ) Notice: Subject to any disclaimer, the term of this patent is extended or adjusted under 35 U.S.C. 154(b) by 0 days.

(21) Appl. No.: 16/640,347

(22) PCT Filed: Apr. 17, 2019

(86) PCT No.: PCT/GB2019/051100
§ 371 (c)(1),
(2) Date: Feb. 19, 2020

(87) PCT Pub. No.: WO2019/202325
PCT Pub. Date: Oct. 24, 2019

(65) Prior Publication Data
US 2020/0354049 A1    Nov. 12, 2020

(30) Foreign Application Priority Data

Apr. 17, 2018  (GB) ...................................... 1806277

(51) Int. Cl.
*B64C 29/00* (2006.01)
*B64C 3/32* (2006.01)
(Continued)

(52) U.S. Cl.
CPC ........ *B64C 29/0033* (2013.01); *B64C 1/1407* (2013.01); *B64C 3/32* (2013.01);
(Continued)

(58) Field of Classification Search
CPC ....... B64C 29/0033; B64C 39/08; B64C 3/32; B64C 5/08; B64C 39/06; B64C 39/062; B64C 39/068
See application file for complete search history.

(56) References Cited

U.S. PATENT DOCUMENTS 8,800,912 B2   8/2014   Olive
9,085,355 B2   7/2015   DeLorean
(Continued)

FOREIGN PATENT DOCUMENTS

WO     WO-2015019255 A1 *   2/2015   ........... B64C 39/068

OTHER PUBLICATIONS

International Search Report dated Oct. 24, 2019 for PCT/GB2019/051100 (priority application).

*Primary Examiner* — Timothy D Collins
*Assistant Examiner* — Terri L Filosi
(74) *Attorney, Agent, or Firm* — Bajwa IP Law Firm; Haris Zaheer Bajwa

(57) ABSTRACT

Methods, apparatus, systems and a vertical take-off and landing (VTOL) vehicle are provided. The VTOL vehicle includes: a fuselage having longitudinally a front section, a central section and a rear section; a first lifting surface comprising two wings respectively secured to opposite sides of the rear section of the fuselage; a second lifting surface comprising two wings respectively secured to opposite sides of the front section of the fuselage; where each wing comprises at least one engine module, each of the engine modules being pivotally coupled to the wing and each engine module being independently controlled for transitioning between a vertical mode of flight and a horizontal mode of flight.

12 Claims, 29 Drawing Sheets

(51) Int. Cl.

| | |
|---|---|
| *B64C 5/08* | (2006.01) |
| *B64C 39/08* | (2006.01) |
| *B64C 1/14* | (2006.01) |
| *B64D 27/02* | (2006.01) |
| *B64D 27/26* | (2006.01) |
| *B64D 31/04* | (2006.01) |
| *B64D 31/06* | (2006.01) |
| *B64D 31/14* | (2006.01) |
| *G05D 1/00* | (2006.01) |
| *G05D 1/08* | (2006.01) |
| *G05D 1/10* | (2006.01) |

(52) U.S. Cl.
CPC ................ *B64C 5/08* (2013.01); *B64C 39/08* (2013.01); *B64D 27/02* (2013.01); *B64D 27/26* (2013.01); *B64D 31/04* (2013.01); *B64D 31/06* (2013.01); *B64D 31/14* (2013.01); *G05D 1/0088* (2013.01); *G05D 1/0858* (2013.01); *G05D 1/102* (2013.01)

(56) References Cited

U.S. PATENT DOCUMENTS

| | | | |
|---|---|---|---|
| 10,351,234 B1* | 7/2019 | Dennis | B64C 13/04 |
| 11,208,197 B2* | 12/2021 | Marot | F16M 11/123 |
| 11,208,203 B2* | 12/2021 | Parks | B64C 39/12 |
| 2003/0080242 A1* | 5/2003 | Kawai | F02K 3/025 |
| | | | 244/12.4 |
| 2022/0081108 A1* | 3/2022 | Mikic | B64C 3/10 |

\* cited by examiner

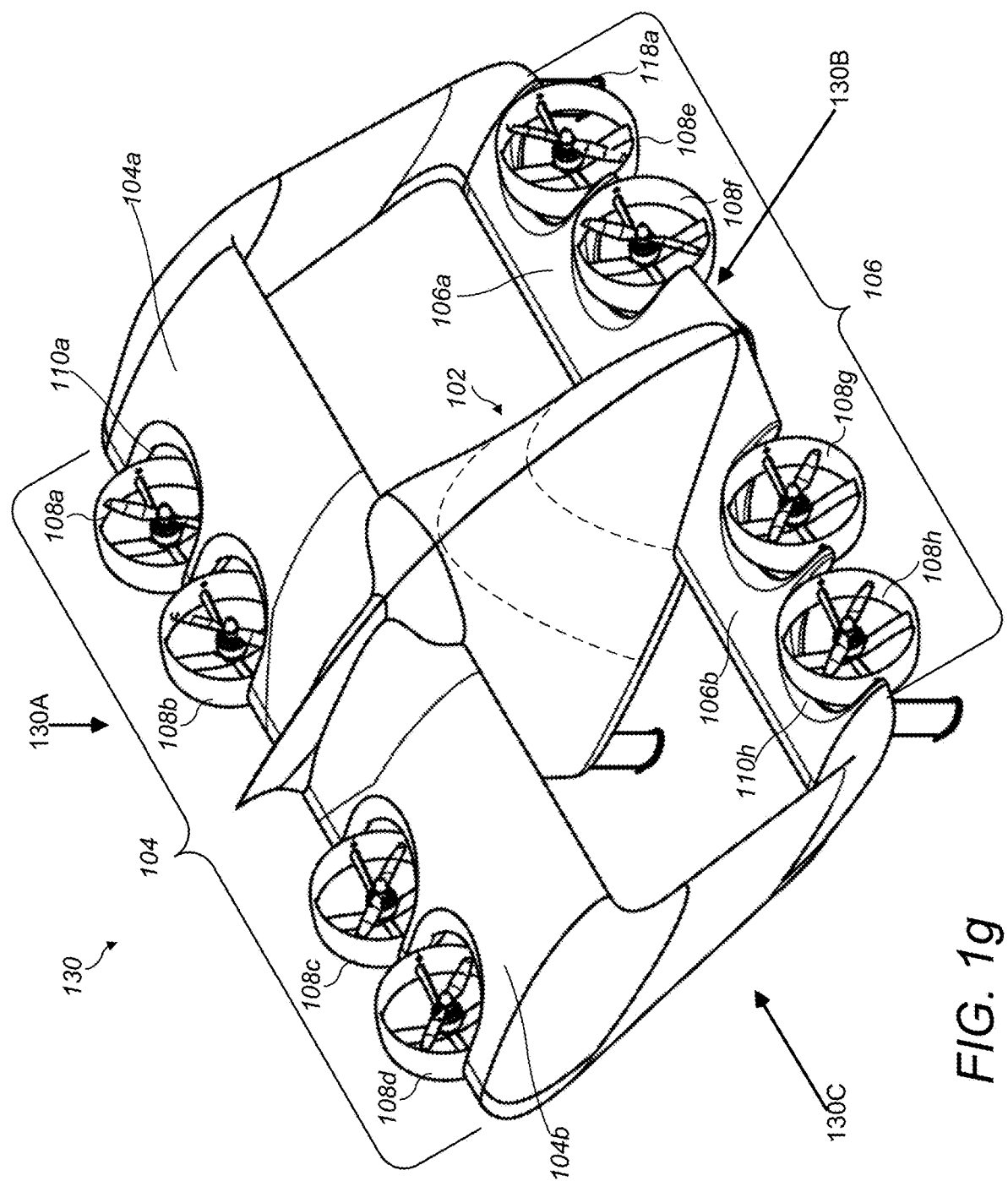

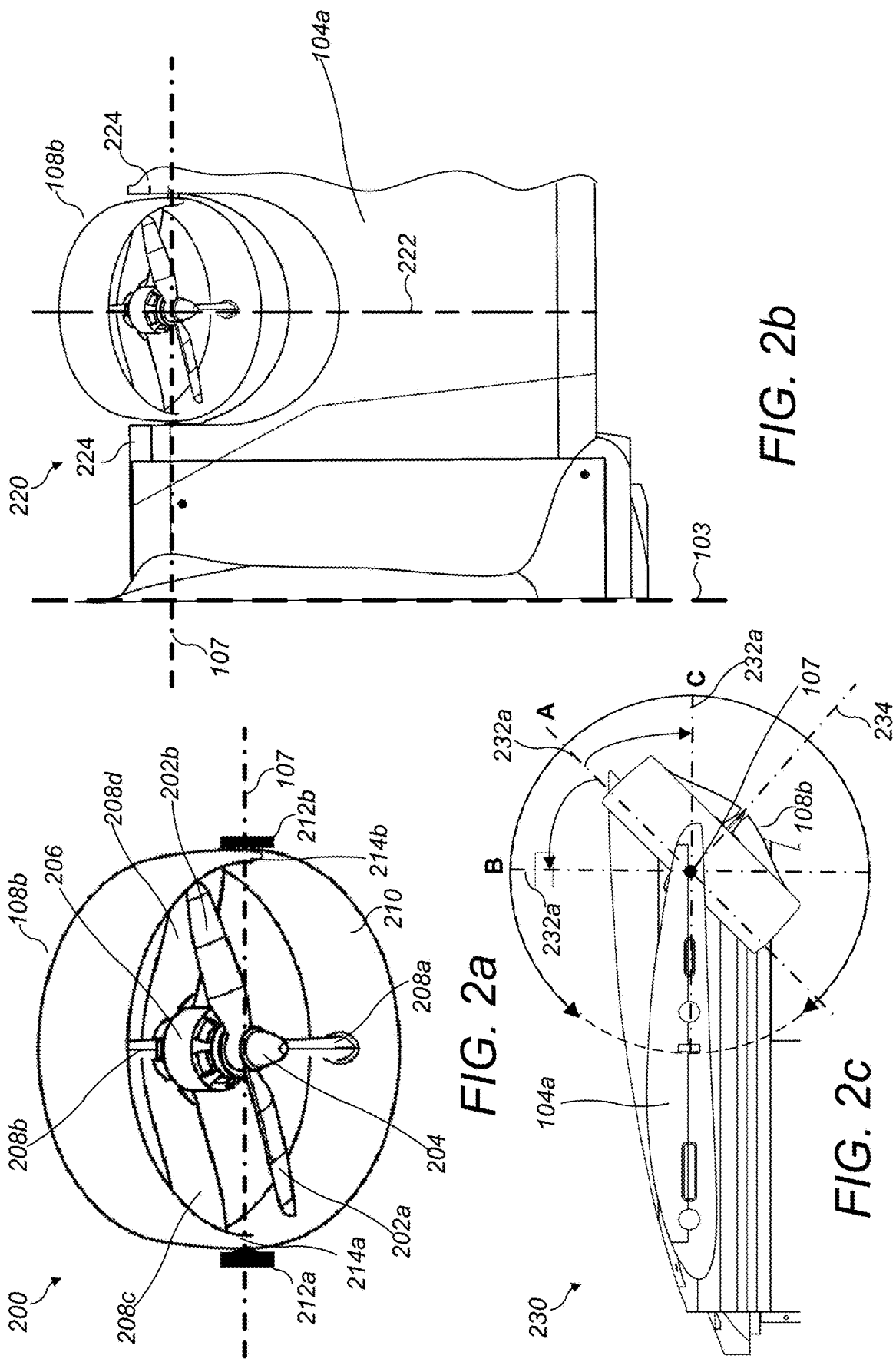

VERTICAL TAKE-OFF AND LANDING VEHICLE

PRIORITY INFORMATION

This application claims the benefit of priority from PCT Application No. PCT/GB2019/051100, filed on Apr. 17, 2019, and entitled "VERTICAL TAKE-OFF AND LANDING VEHICLE," which is incorporated herein by reference in its entirety.

TECHNICAL FIELD

The present application relates to a vehicle, system(s) and method(s) for a vertical take-off and landing (VTOL) vehicle such as an autonomous or remote controlled aircraft with VTOL capabilities achieved through tilting engine modules for payload applications such as cargo and/or passenger transport.

BACKGROUND

Existing technology for the transport of cargo and/or passengers includes land vehicles and/or air vehicles or aircraft. Land vehicles may include, by way of example only but not limited to, bikes, cars, vans, buses and/or trucks. Air vehicles or aircraft may include aeroplanes, helicopters, and conventional unmanned areal vehicles (UAVs) including quadcopters and/or octocopters and the like.

Although land vehicles can constitute a relatively cost efficient solution for the transport of cargo, they are limited in terms of speed (e.g. via traffic, indirect roads, speed restrictions) and accessibility (e.g. remote destinations, offshore). They are also subject to drivers with their own limitations unless an autonomous system is introduced.

Although air vehicles may have VTOL capabilities (e.g. helicopters) with similar payloads to cars and/or vans, they are very expensive to operate, require specially trained pilots to operate, generally require complex infrastructure (e.g. heliports required due to size of vehicles, access to fuel), and leave a high noise footprint. On the other hand, conventional UAVs are restricted with regards to speed and endurance due to the fact that the lift is solely generated by rotors which are energy intensive.

There is a desire for a VTOL vehicle or aircraft that overcomes the complexities and problems of current VTOL vehicles/aircraft.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides a VTOL vehicle or aircraft that is configured to transition from a vertical take-off into a horizontal mode of flight or from a horizontal mode of flight to a vertical landing using pivotally mounted engine modules mounted on the lifting surfaces of the vehicle, where the lifting surfaces provide the primary lift when the VTOL vehicle is in the horizontal mode of flight.

In a first aspect, the present disclosure provides a VTOL vehicle or aircraft including: a fuselage having longitudinally a front section, a central section and a rear section; a first lifting surface comprising two wings respectively secured to opposite sides of the rear section of the fuselage; a second lifting surface comprising two wings respectively secured to opposite sides of the front section of the fuselage; where each wing comprises at least one engine module, each of the engine modules being pivotally coupled to the wing and each engine module being independently controlled for transitioning the VTOL vehicle between a vertical mode of flight and a horizontal mode of flight.

Preferably, the first lifting surface and second lifting surface each provide an amount of lift when the VTOL vehicle is in the horizontal mode of flight that is dependent on the centre of gravity of the VTOL and centre of lift of the engine modules. Both the first lifting surface and the second lifting surface provide the necessary lift, when engine modules are operating with thrust directed substantially parallel to the longitudinal axis of the fuselage, required to keep the VTOL vehicle airborne during the horizontal mode of flight.

Preferably, each of the wings have cut-outs along the trailing edge of the wing, each cut-out for receiving an engine module pivotable along a tilting axis substantially perpendicular to the longitudinal axis of the fuselage.

Preferably, each engine module is pivotable around a pivot axis substantially perpendicular to the longitudinal axis of the fuselage, wherein each engine module is capable of producing thrust along the wing chord of a corresponding wing for maintaining the horizontal mode of flight when pivoted to a first position and is capable of producing thrust perpendicular to wing plane when pivoted to a second position for maintaining a vertical mode of flight.

Preferably, each of the wings have cut-outs along the leading edge of the wing, each cut-out for receiving an engine module pivotable about a tilting axis substantially perpendicular to the longitudinal axis of the fuselage.

Preferably, each of the wings of the first lifting surface have cut-outs along the trailing edge of the wing, each cut-out for receiving an engine module pivotable about a tilting axis substantially perpendicular to the longitudinal axis of the fuselage.

Preferably, each of the wings of the first lifting surface have at least one support strut along the trailing edge of the wing, each support strut for supporting and receiving one or more engine modules pivotable about a tilting axis substantially perpendicular to the longitudinal axis of the fuselage.

Preferably, each of the wings of the second lifting surface have cut-outs along the leading edge of the wing, each cut-out for receiving an engine module pivotable about a tilting axis substantially perpendicular to the longitudinal axis of the fuselage.

Preferably, each of the wings of the second lifting surface have at least one support strut along the leading edge of the wing, each support strut for supporting and receiving an engine module pivotable about a tilting axis substantially perpendicular to the longitudinal axis of the fuselage.

Preferably, each of the wings of the first lifting surface have cut-outs along the trailing edge of the wing, each cut-out for receiving an engine module pivotable about a tilting axis substantially perpendicular to the longitudinal axis of the fuselage; and each of the wings of the second lifting surface have cut-outs along the leading edge of the wing, each cut-out for receiving an engine module pivotable about a tilting axis substantially perpendicular to the longitudinal axis of the fuselage.

Preferably, each of the wings of the first lifting surface have at least one support strut along the trailing edge of the wing, each support strut for supporting and receiving an engine module pivotable about a tilting axis substantially perpendicular to the longitudinal axis of the fuselage; and each of the wings of the second lifting surface have at least one support strut along the leading edge of the wing, each support strut for supporting and receiving an engine module pivotable along a tilting axis substantially perpendicular to the longitudinal axis of the fuselage.

Preferably, each cut-out along the trailing edge of the wing for receiving an engine module is substantially in the vicinity of the trailing edge of the wing.

Preferably, each cut-out along the leading edge of the wing for receiving an engine module is substantially in the vicinity of the leading edge of the wing.

In a second aspect, the present disclosure provides a vertical take-off and landing, VTOL, vehicle comprising: a fuselage having longitudinally a front section, a central section and a rear section; a first lifting surface comprising two wings respectively secured to opposite sides of the rear section of the fuselage; a second lifting surface comprising two wings respectively secured to opposite sides of the front section of the fuselage; and at least one first support strut coupled to a rear portion of the rear section for supporting a first set of engine modules; at least one second support strut coupled to a front portion of the front section for supporting second set of engine modules; wherein each of the engine modules of the sets of engine modules being pivotally coupled to corresponding support struts and each engine module being independently controlled for transitioning between a vertical mode of flight and a horizontal mode of flight.

Preferably, the at least one first support strut connected to the rear portion of the fuselage for supporting the first set of engine modules, each engine module pivotable about a tilting axis substantially perpendicular to the longitudinal axis of the fuselage.

Preferably, at least one further support strut connected along the trailing edge of the wing, the at least one further support strut for supporting the one or more engine modules of the first set of engine modules, the one or more engine modules pivotable about a tilting axis substantially perpendicular to the longitudinal axis of the fuselage.

Preferably, the at least one second support strut connected to the front portion of the fuselage for supporting one or more engine modules of the second set of engine modules, the one or more engine modules pivotable about a tilting axis substantially perpendicular to the longitudinal axis of the fuselage.

Preferably, at least one further support strut connected along the leading edge of the wing, the at least one further support strut for supporting the one or more engine modules of the second set of engine modules, the one or more engine modules pivotable about a tilting axis substantially perpendicular to the longitudinal axis of the fuselage.

Preferably, the first set of engine modules comprises one or more engine modules associated with a first wing of the first lifting surface and one or more engine modules associated with a second wing of the first lifting surface; and wherein the second set of engine modules comprises one or more engine modules associated with a first wing of the second lifting surface and one or more engine modules associated with a second wing of the second lifting surface.

Preferably in the first or second aspects, the tilt or pivot axes of the corresponding engine modules are parallel and located in the vicinity of the leading edges of the corresponding wing.

Preferably in the first or second aspects, each engine module comprises a plurality of rotors about a centre axis of the engine module, wherein the centre axis is substantially perpendicular to the tilting axis.

Preferably in the first or second aspects, each of the wings have an end-tip distal from the end secured to the fuselage, the VTOL vehicle further comprising: a first stabiliser connecting the end-tip of a first wing of the first lifting surface secured to a first side of the fuselage with the end-tip of a first wing of the second lifting surface secured to the first side of the fuselage; and a second stabiliser connecting the end-tip of a second wing of the first lifting surface secured to a second side of the fuselage opposite the first side with the end-tip of a second wing of the second lifting surface secured to the second side of the fuselage.

Preferably in the first or second aspects, the first lifting surface is positioned in a staggered spaced apart configuration with respect to the second lifting surface. Preferably in the first or second aspects, the staggered spaced apart configuration comprises the first lifting surface being secured to an upper portion of the fuselage and the second lifting surface being secured to a lower portion of the fuselage. Preferably in the first or second aspects, the first lifting surface, the second lifting surface, the first and second stabilisers for a box wing configuration. As an option, the first lifting surface has a wing span that is substantially similar to the wing span of the second lifting surface. As an option, when the VTOL vehicle is viewed from the rear or from the front in the direction of the longitudinal axis of the fuselage, the first lifting surface, second lifting surface, first stabiliser, and second stabiliser form substantially, by way of example only but is not limited to, a trapezoidal and/or rectangular form/shape. As another option, the first and second lifting surfaces and first and second stabilisers form substantially, by way of example only but is not limited to, a trapezoidal form/shape, where the first lifting surface has a longer wing span to the second lifting surface.

Preferably in the first or second aspects, the VTOL vehicle further including at least one door pivotally secured to an aft portion of the rear section of the fuselage. Preferably, the VTOL vehicle further includes at least one door pivotally and/or slideably secured to at least one of the first and second sides of the fuselage. Preferably, the VTOL vehicle further includes at least one door pivotally secured to at least an upper portion of the fuselage.

Preferably in the first or second aspects, each of the engine modules comprise one from the group of: an electric ducted fan; electric ducted rotor; electric fan; electric rotor; electric jet engines; gas turbines; internal combustion engine with fans or rotors; or any other power plant configurable for transitioning the VTOL vehicle between the vertical mode of flight and the horizontal mode of flight.

Preferably in the first or second aspects, the speed, position, direction and orientation of the VTOL vehicle is only controlled by one or more of the pivotable engine modules.

Preferably in the first or second aspects, each of the engine modules includes a tilt mechanism configured for independently pivoting said each engine module about a pivot axis perpendicular to the longitudinal axis of the fuselage, where the pivot axes of the engine modules are parallel and located in the vicinity of the trailing edges of the corresponding wing.

Preferably in the first or second aspects, the VTOL vehicle includes a tilt mechanism for each of the engine modules, each tilt mechanism is configured for independently pivoting said each engine module about a pivot axis perpendicular to the longitudinal axis of the fuselage, where the pivot axes of the engine modules are parallel and located in the vicinity of the trailing edges of the corresponding wing. Preferably, each engine module is independently controlled by at least tilting and/or generating thrust using, by way of example only but not limited to, at least the tilt mechanism and/or rotors speed/RPM/thrust.

Preferably in the first or second aspects, the VTOL vehicle further including a flight controller device coupled to the multiple engine modules for controlling position, speed and attitude of the VTOL vehicle.

Preferably in the first or second aspects, the VTOL vehicle further including a user interface device coupled to the flight controller, wherein the flight controller is configured for controlling one or more of the engine modules in response to a user position, speed or directional input from the user interface.

Preferably in the first or second aspects, the VTOL vehicle further including an autonomous interface device coupled the flight controller, the autonomous interface communicatively coupled to a operations centre, wherein the autonomous interface is configured for autonomously directing the flight controller in response to data representative of commands or a mission plan from the operations control centre.

Preferably in the first or second aspects, the VTOL vehicle is configured for: carrying one or more light weight packages less than 250 kilograms; carrying one or more heavy weight packages greater than 250 kilograms; carrying one or more passengers; carrying a plurality of passengers.

Preferably in the first or second aspects, the fuselage, the first and second lifting surfaces are based on a monocoque construction.

According to a third aspect, the present disclosure provides a method of obtaining a VTOL vehicle according to the first aspect, combinations and modifications thereof, and/or as described herein, where at least the fuselage, the first and second lifting surfaces are substantially 3-D printed.

According to a fourth aspect, the present disclosure provides a method for controlling a VTOL vehicle according to according to the first aspect, combinations and modifications thereof, and/or as described herein, the method including: receiving control input comprising data representative of at least one from the group of: speed, direction, orientation, position, flight and attitude in relation to the VTOL vehicle; and controlling the engine modules independently to change the orientation or flight of the VTOL vehicle in response to the received control input.

Preferably, controlling one or more engine modules further comprises controlling the multiple engine modules independently based on one or more from the group of: revolutions per minute of rotors of an engine module; rotor blade pitch of an engine module; torque differentials acting on each engine module; tilting or pivoting of the engine modules for generating thrust vectors for changing speed, direction or position of the VTOL vehicle.

Preferably, the method further includes: controlling the rotation of rotors of each engine module on a first wing of a first lifting surface in an opposite direction to any adjacent engine module on the first wing; controlling the rotation of rotors of each engine module on a second wing of the first lifting surface in an opposite direction to the rotation of rotors of a correspondingly positioned engine module on the first wing.

Preferably, the method further includes controlling the rotation of rotors of each engine module of a second lifting surface in an opposite to a correspondingly positioned engine module on the first lifting surface.

According to a fifth aspect, the present disclosure provides a system including: a VTOL vehicle according to the first aspect, combinations and modifications thereof, and/or as described herein; an operations centre in communication with the VTOL vehicle, the operations centre configured for sending commands to the VTOL vehicle during operation; where the VTOL vehicle autonomously operates according to the commands.

According to a sixth aspect, the present disclosure provides a computer-readable medium including data or instruction code, which when executed on one or more processor(s), causes the one or more processor(s) to implement the method according to the third aspect, combinations and modifications thereof, and/or as described herein.

According to a seventh aspect, the present disclosure provides an apparatus including a processor unit and a memory unit, the processor unit connected to the memory unit, the memory unit including a computer-readable medium comprising data or instruction code, which when executed on the processor unit, causes the processor unit to implement the method according to the third aspect, combinations thereof, modifications thereof and/or as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 1g is a schematic diagram illustrating a perspective view from the front of another example VTOL vehicle according to the invention;

FIG. 2a is a schematic diagram illustrating a plan view an engine module of the example VTOL vehicle according to the invention;

FIG. 2b is a schematic diagram illustrating a plan view of a wing portion with pivotally mounted engine module of the example VTOL vehicle according to the invention;

FIG. 2c is a schematic diagram illustrating a side view cross-section of a wing portion with pivotally mounted engine module of the example VTOL vehicle according to the invention;

Figure 1A:
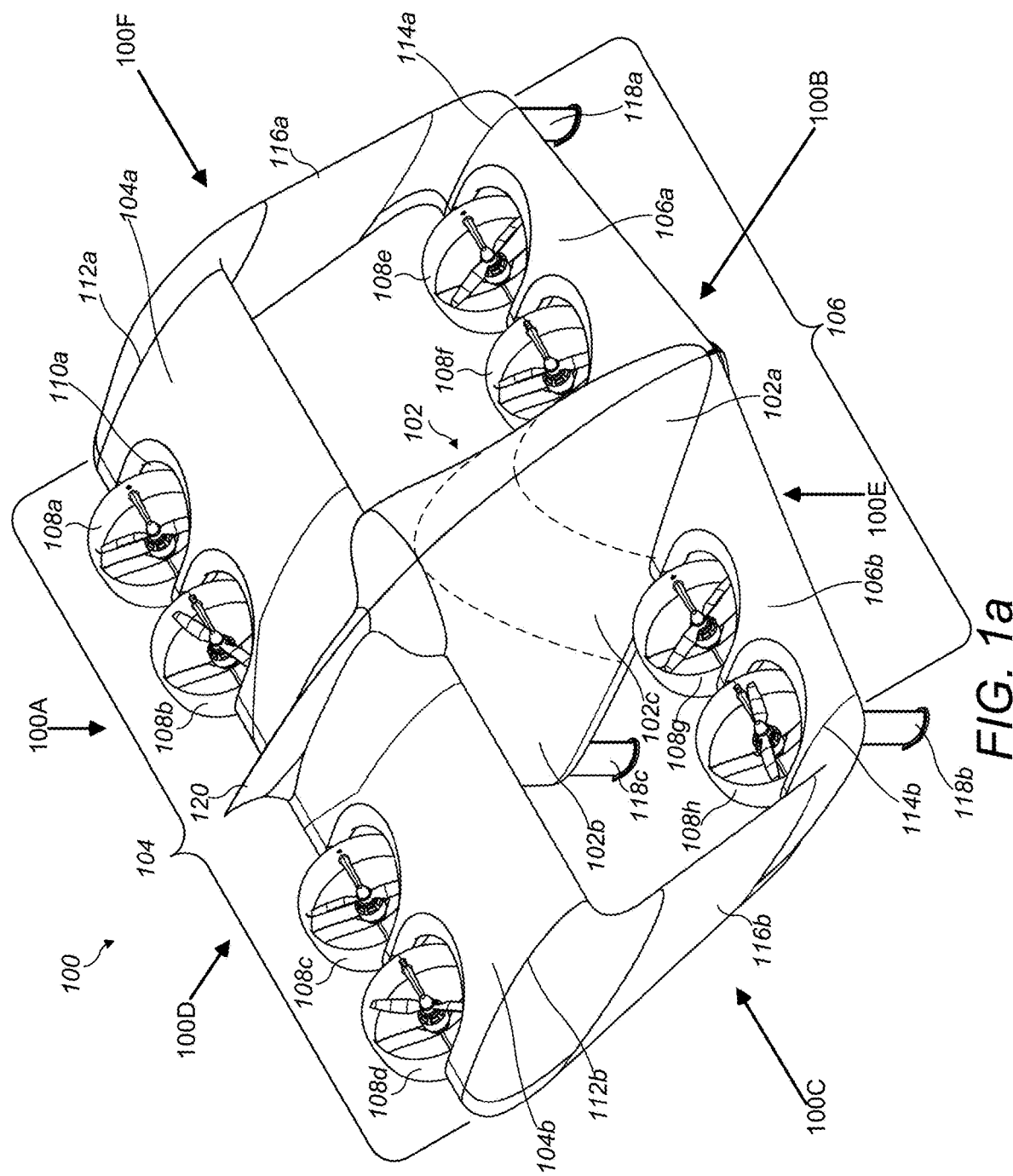
FIG. 1a is a schematic diagram illustrating a perspective view from the front of an example VTOL vehicle according to the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The inventors propose a hybrid VTOL vehicle or aircraft that is configured to transition from a vertical take-off into a horizontal mode of flight or from a horizontal mode of flight to a vertical landing using pivotally mounted engine modules mounted on the lifting surfaces of the vehicle, where the lifting surfaces provide the primary lift when the VTOL vehicle is in the horizontal mode of flight. This is achieved by the VTOL vehicle having a first lifting surface including two wings (or aerofoils) respectively secured to opposite sides of a rear section of a fuselage of the VTOL vehicle, a second lifting surface including two wings (or aerofoils) respectively secured to opposite sides of a front section of the fuselage. Each wing includes at least one engine module, which provides thrust when the VTOL vehicle is in operation, where each engine module is pivotally coupled or mounted to the wing. The engine modules may each be independently controlled for transitioning the VTOL vehicle between a vertical mode of flight and a horizontal mode of flight and for controlling the orientation and flight or flight path of the VTOL vehicle. Alternatively or additionally, groups of engine modules on each wing of a lifting surface may be controlled independent of a group of engine modules on another wing of a lifting surface for transitioning the VTOL vehicle between a vertical mode of flight and a horizontal mode of flight and for controlling the orientation and flight/flight path of the VTOL vehicle.

The wings of the VTOL vehicle may be configured to have no moving flight control surfaces such as, by way of example only but not limited to, ailerons, rudders, elevators and the like that are common on most aircraft and/or helicopters and other conventional VTOL aircraft. Rather, the VTOL vehicle may be controlled only by the pivotable or tiltable engine modules, which provide thrust, in which each engine module may be independently controlled and/or groups of engine modules on each wing of the VTOL vehicle may be independently controlled. The VTOL vehicle may be configured as the application demands to be based on, by way of example only but is not limited to, at least one from the group of: a fully autonomous VTOL vehicle, a remote controlled VTOL vehicle, semi-autonomous VTOL vehicle with optional interfaces for a pilot or for remote control, and/or a VTOL vehicle with control interfaces allowing manual piloting; and/or any combination thereof as the application demands.

For example, the VTOL vehicle may have a complete absence of aerodynamic control surfaces such as, by way of example only but not limited to, ailerons, rudders and/or elevators, in which the VTOL vehicle is controlled using the engine modules through, by way of example only but is not limited to, a combination of varying motor RPM or blade pitch and the resulting torque differentials acting on the motors and creating a change in orientation/flight direction of the vehicle, and tilting of the rotors to create thrust vectors that change the orientation/flight direction of the vehicle The VTOL vehicle according to the invention has numerous advantages over other land vehicles and/or other conventional VTOL aircraft (e.g. helicopters and conventional UAVs). For example, compared with land vehicles, the VTOL vehicle can travel at a faster speed at a comparable cost to land transport, whilst avoiding the required infrastructure and cost penalties of other conventional VTOL aircraft (e.g. helicopters or UAVs). The VTOL vehicle also has improved accessibility to remote and/or off-shore locations. The VTOL vehicle provides further advantages over conventional VTOL aircraft such as, by way of example only but not limited to, helicopters. For example, compared to helicopters and other light aircraft, the VTOL vehicle provides similar cargo and passenger lifting and transport capabilities at a reduced complexity, lower cost, better manoeuvrability, lower noise footprint, driverless (no pilot) when operating autonomously, less stringent infrastructure requirements smaller footprint. For example, compared with conventional UAVs, the VTOL vehicle according to the invention has the capability to travel at higher speeds with lower power consumption, which in effect increases the range and provides better accessibility compared to other VTOL due to compactness.

The VTOL vehicle may be constructed based on a monocoque construction in which only one or two main parts (e.g. lifting surfaces and fuselage) need to be secured or fitted together. The advantages of a monocoque design include improved strength to weight ratios, light-weight construction whilst retaining structural strength and integrity for a range of operations and designs, and reduce cost compared with conventional aerostructures/airframes and manufacturing techniques. The VTOL vehicle may be manufactured and constructed based on 3D printing techniques and monocoque construction techniques.

The lifting surfaces of the VTOL vehicle may be joined or coupled together via stabilisers and/or pylons based on a box-wing or staggered doppeldecker configuration, which provides the advantage of improved aerodynamic efficiency, stability, structural integrity and control as compared with conventional aircraft and/or other VTOL aircraft with a single lifting surface.

The VTOL vehicle may be an electric powered autonomous or semi-autonomous aerial vehicle with VTOL capabilities for cargo and passenger transport. Each engine module of the VTOL vehicle according to the invention may include, by way of example only but is not limited to, one or more from the group of: an electric ducted fan; electric ducted rotor; electric fan; electric rotor; electric jet engines; or any other power plant/thrust mechanism configurable for transitioning the VTOL vehicle between the vertical mode of flight and the horizontal mode of flight.

The engine module(s) of the VTOL vehicle may be connected to an electrical power system, which may be powered by means of power storage devices or other electrical sources. For example, electrical sources for providing electrical power to the engine modules may include, by way of example only but is not limited to, one or more or a combination of: one or more electrical storage device(s); one or more battery(ies); one or more capacitor(s); one or more solar panel(s); one or more fuel cell(s); one or more internal combustion engine(s); one or more gas turbine(s); and/or combination(s) thereof. For example, the power storage devices may be exchanged or recharged on the ground or in the air via remote electrical power transmission. In another example, the engine modules may be powered by one or more batteries or a bank of batteries, or in a hybrid configuration including batteries and/or internal combustion engine and the like. In a further example, the electrical source may be an electrical storage device or bank of batteries that may be charged from an external electrical power transmission grid prior to the VTOL vehicle being used; once used, the VTOL vehicle may be recharged via the electricity grid or the used batteries and/or power storage devices exchanged for charged batteries/power storage devices. In another example, the generation of electrical power may be based on internal combustion engines or gas turbines, which may be used to charge a bank of batteries and/or provide electric power directly to the engine modules as the need arises. Although several electrical sources have been described, this is by way of example only and the invention is not so limited, it is to be appreciated by the skilled person that any other suitable power source and/or even a combination of the above-mentioned electrical sources and/or any other suitable power source may be used to power the engine modules.

Although the VTOL vehicle has been described as being powered by an electrical source, this is by way of example only, it is to be appreciated by the skilled person that alternative power plants or power sources may be used to power the engine modules. For example, each engine module may include, by way of example only but is not limited to, one or more from the group of: an internal combustion engine configured to power a ducted fan or a ducted rotor; or a gas turbine configured to power a ducted fan, ducted rotor or a jet engine; or any other engine module that includes a power plant/thrust mechanism configurable for transitioning the VTOL vehicle between the vertical mode of flight and the horizontal mode of flight.

The VTOL vehicle may include, by way of example only but is not limited to, one or more sensors for use in autonomous control, semi-autonomous/remote control, and/or providing assistance to a pilot or remote controller. A sensor may comprise or represent any type of device, module, equipment, or subsystem capable of detecting events or changes in its environment and providing information to other electronics or devices such as, by way of example only, a computing device, processor or system. Sensors may provide data for assisting with the control and operation of the VTOL vehicle when operating autonomously, semi-autonomously, remote controlled, and/or piloted by a human operator. Examples of sensors according to the invention may include, by way of example only but is not limited to, one or more of accelerometer(s); gyroscope(s); range sensor(s) for estimating distance to obstacles (e.g. stereoscopic cameras, light detection and ranging (LIDAR), sonar, radar, ultrasound sensors, and the like); altimeters (barometric devices); computer vision systems; relative motion sensor(s) for detecting position and motion relative to ground or other objects (e.g. visual camera); magnetometers; global positioning system (GPS) sensors or receivers; speed sensors; level sensors; airspeed sensors; position control means using electromagnetic waves between vehicle and ground stations (e.g. radio or telecommunications systems); temperature sensors; infra-red sensors; night vision sensors and the like; weather radar; and/or any other sensor or sensor equipment suitable for assisting the control and/or operation of the VTOL vehicle during operation.

The VTOL vehicle according to the invention may be configured to be instructed and/or remotely controlled through an operations control centre (OCC), which is in communication with the VTOL vehicle. The OCC may control one or more VTOL vehicles at the same time, for example, the OCC may control several vehicles at the same time. For example, the communication connection may be maintained between the VTOL vehicle and the OCC may include one or more communication techniques or combinations thereof based on, by way of example only but is not limited to, electromagnetic waves; free-space optical communications; radio telemetry communications/devices; radio links; mobile communication standards; telecommunication systems or standards based on, by way of example only but not limited to, one or more of second generation to fourth generation (2G-4G) communications/standards, long-term evolution or LTE-Advanced communications/standards, fifth generation (5G) communications/standards, any future mobile and/or telecommunications networks and/or standards; satellite communication systems, encrypted communication systems and the like.

The VTOL vehicle may be configured to have one or more or a multiple of communication devices or communication interfaces to ensure that s communication connection between the VTOL vehicle and the OCC and/or other parties can be maintained or regularly maintained. For example, one or more different communication devices may be required depending, by way of example only but is not limited to, geography, mission, security requirements, regulation, availability of systems and the like as the application demands.

The communication connection (e.g. radio link) may be encrypted and be configured to provide protection from jamming. For example, the VTOL vehicle may use one or more communication interfaces based on, by way of example only but is not limited to, one or more of a) a radio link; b) an LTE mobile interface; c) a 5G mobile interface; and d) a satellite interface; or any other communication interface depending on the application. These communication interfaces may be configured to have a medium level of encryption and protection from jamming and will offer various ranges of coverage depending on the application. The communication interfaces b) c) and d) may be encrypted within a virtual private network. Control and monitoring the status of the VTOL vehicle may be through a secure cloud network based application, subject to regulatory requirements.

Depending on network coverage, communication interfaces b) and c) can offer a larger range than communication interface a). Furthermore, communication interfaces b) and c) provide an improved secure solution with typically increased bandwidth compared with a radio link, but may have a relatively higher cost due to mobile operator charges. Communication interface d) (e.g. satellite) offers even higher security/encryption with a large coverage area, where it is available in many places with practically unlimited range, as long as a satellite connection exists or weather permits. However, satellites can be an expensive solution in terms of cost, but is useful for extreme remote locations or off-shore locations where range is of importance and/or locations out of range of communication interfaces a), b) and c).

The aforementioned characteristics of the VTOL vehicle according to the invention and as described, by way of example only but is not limited to, herein provide the following advantages. For example, the VTOL vehicle provides fully vertical take-off and landing capabilities in which the VTOL vehicle may take-off and land on any location depending on the dimensions of the VTOL vehicle. Take-off and landing may be from, by way of example only but is not limited to, footpaths, driveways, roads, helipads, runways, water such as lakes or the sea, platforms, off-shore platforms such as, by way of example only but is not limited to, ships and/or oil/gas platforms. The VTOL vehicle according to the invention reduces the need or requires no special infrastructure such as, by way of example only but is not limited to, helipads, winches, catapults, or runways unlike other conventional VTOL vehicles.

The VTOL vehicle design according to the invention provides the advantage of being able to be constructed at different scales depending on the application (e.g. small parcel/spare parts delivery, heavy parcel/spare parts delivery, passenger transport and the like). The VTOL vehicle may be constructed to practical sizes/geometric dimensions to enable better accessibility of the VTOL vehicle to urban locations such as, by way of example only but not limited to, footpaths, driveways, roads, car parks, malls or shopping centre car-parks, parks and nearby fields, school and/or fields, or any suitable space that may accommodate the dimensions/size/geometric dimensions of the VTOL vehicle as the application demands.

The VTOL vehicle according to the invention provides the advantages of a stable and controlled flight throughout all phases of a flight mission from, by way of example only but not limited to, take-off, hover, flight from a first location to a second location, final approach, hover and landing. The VTOL vehicle may also include several layers of redundancy of hardware and/or software for increased safety. When the VTOL vehicle uses an electric source for powering the engine modules, the VTOL vehicle may provide an economical operation relative to alternative designs and modes of transport such as, by way of example only but not limited to, helicopters and/or other VTOL aircraft. The VTOL vehicle according to the invention provides an efficient mode of transport giving superior performance in terms of, by way of example only but is not limited to, range, speed, and/or payload when compared to other equivalently sized or dimensioned conventional VTOL vehicles and/or UAVs such as, by way of example only but not limited to, drones, multicopter and other conventional drone or UAV designs.

Figure 1B:
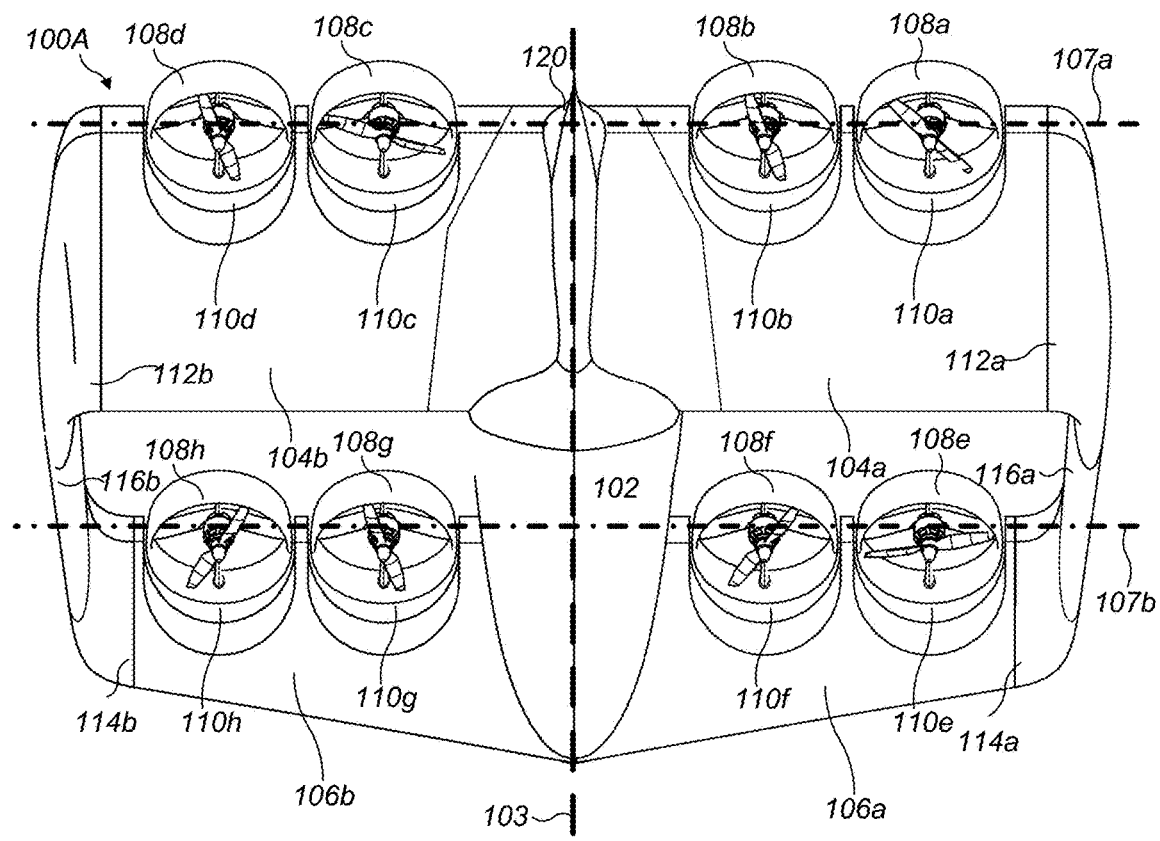
FIG. 1b is a schematic diagram illustrating a plan view (top view) viewed from arrow 100A of FIG. 1a of the example VTOL vehicle of FIG. 1a according to the invention.
Figure 1C:
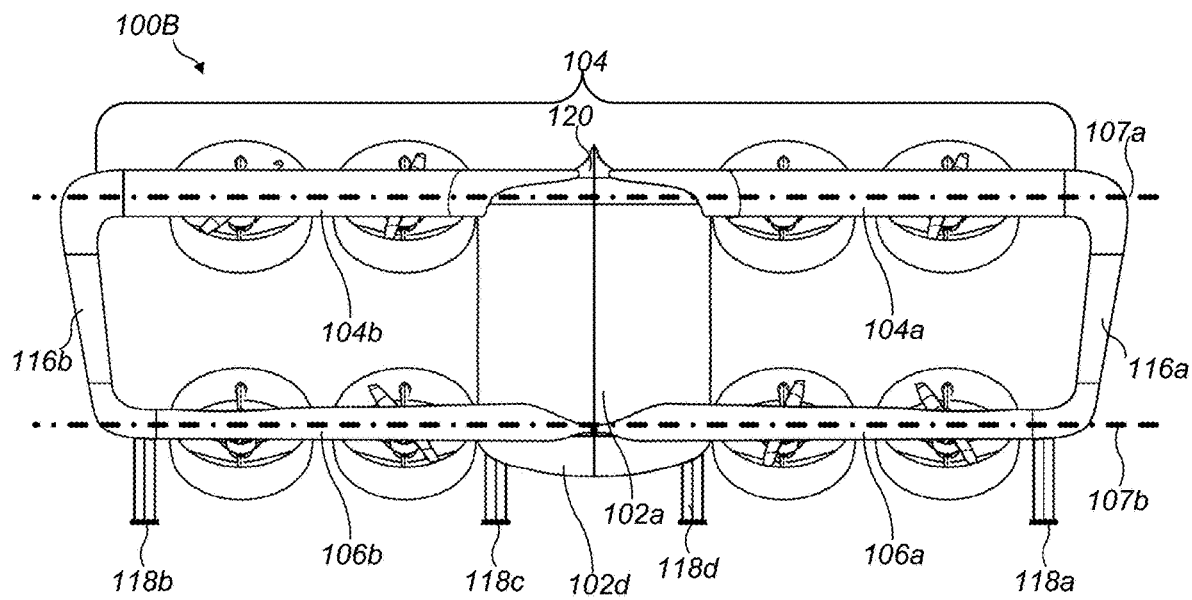
FIG. 1c is a schematic diagram illustrating a front view viewed from arrow 100B of FIG. 1a of the example VTOL vehicle of FIG. 1a according to the invention.
Figure 1D:
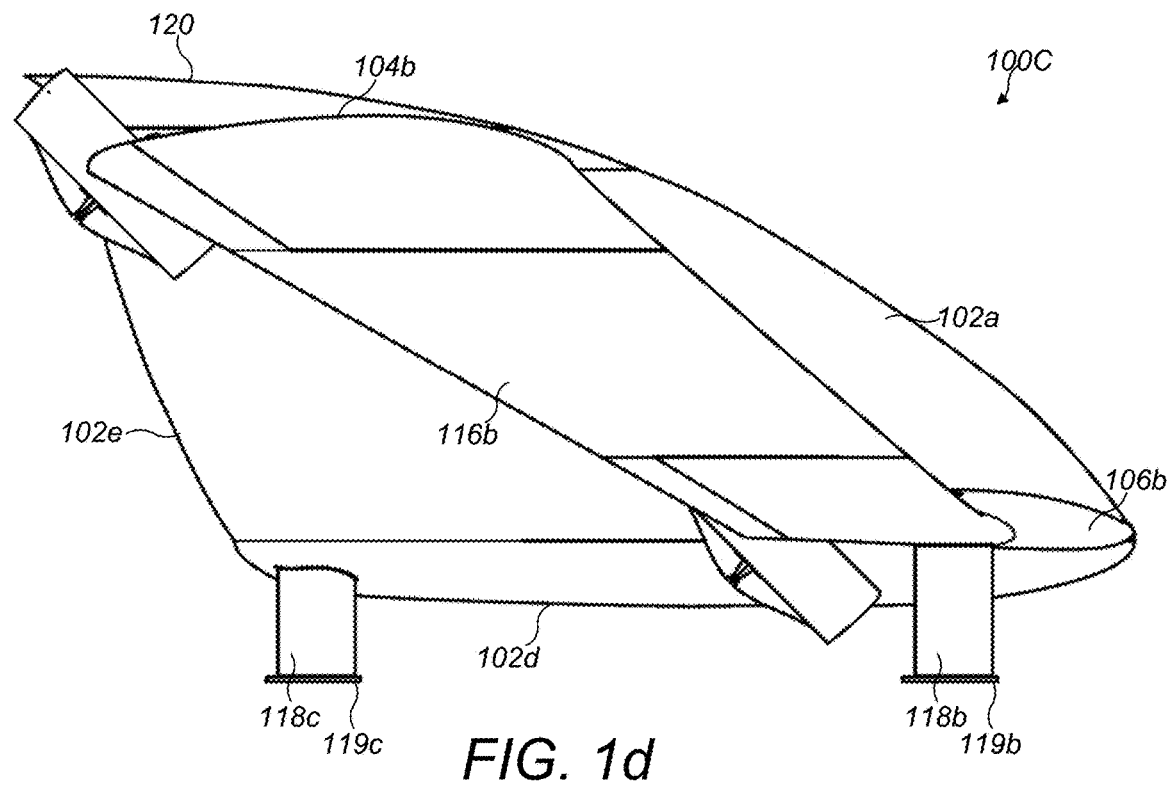
FIG. 1d is a schematic diagram illustrating a side view viewed from arrow 100C of FIG. 1a of the example VTOL vehicle of FIG. 1a according to the invention.
Figure 1E:
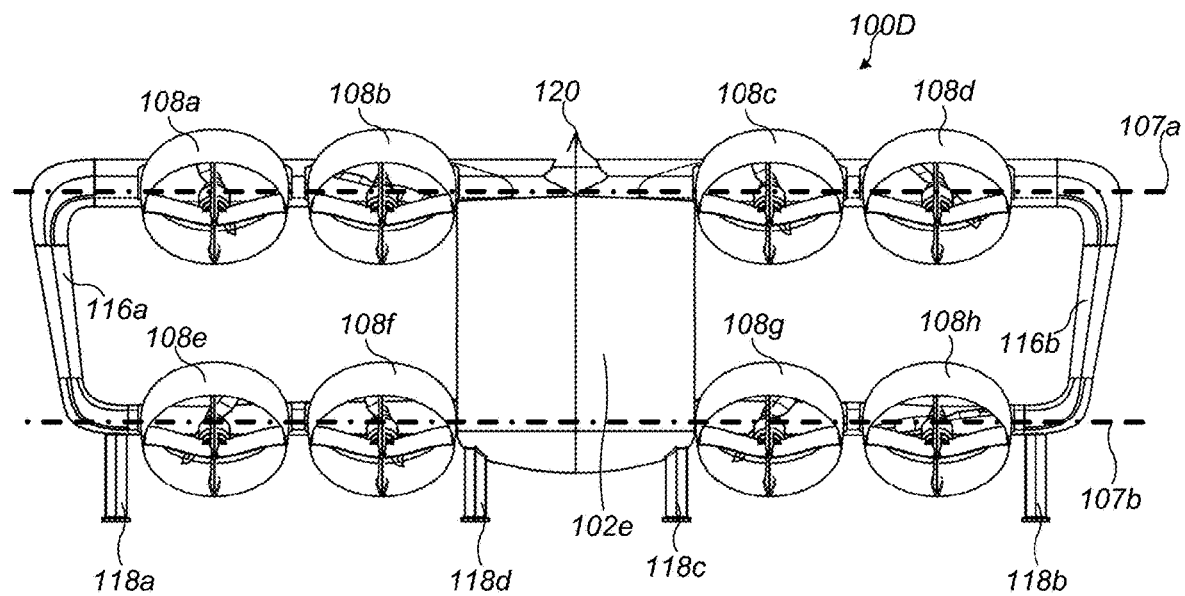
FIG. 1e is another schematic diagram of a rear view (back view) viewed from arrow 100D of FIG. 1a of the example VTOL vehicle of FIG. 1a according to the invention.
Figure 1F:
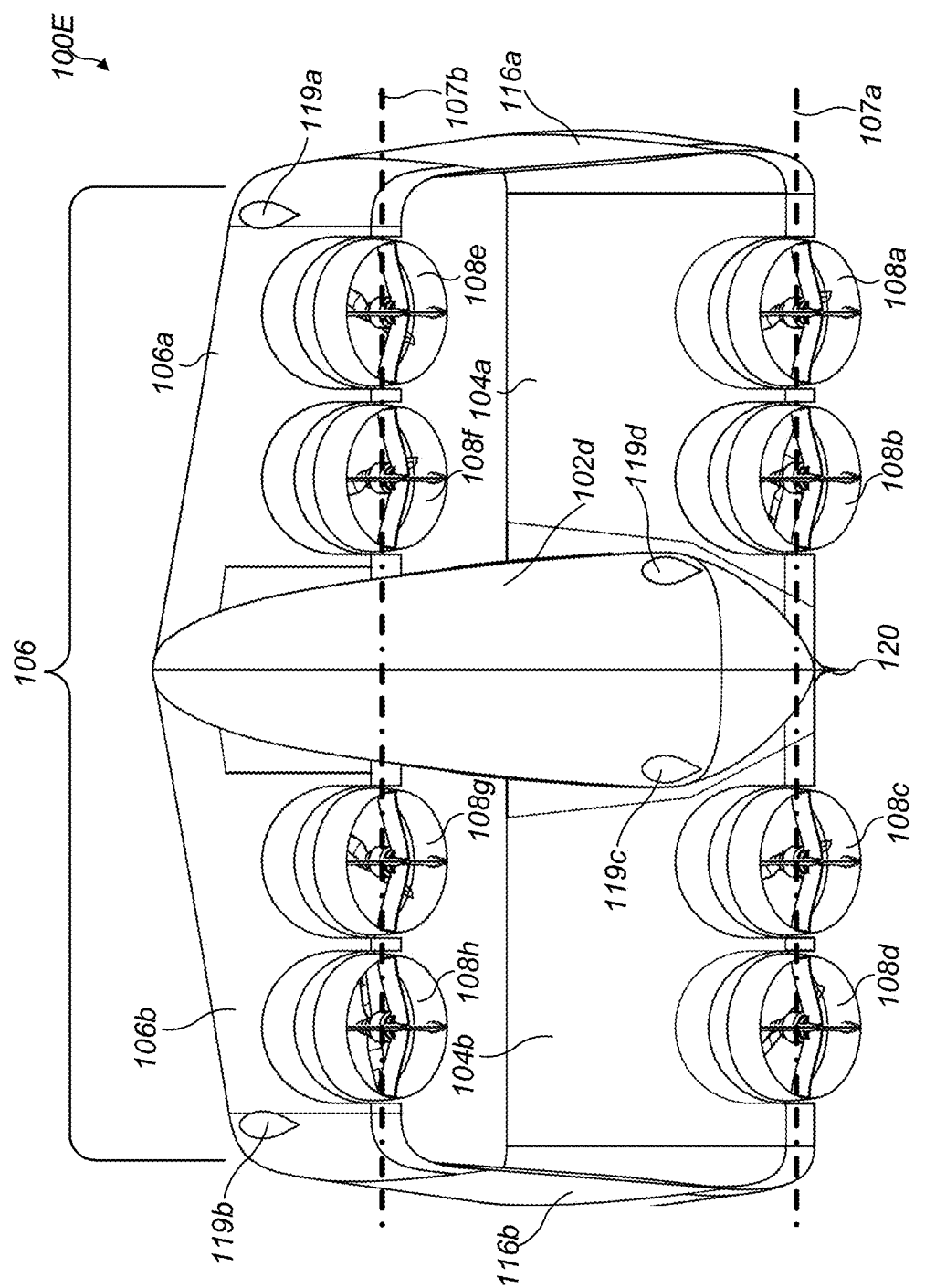
FIG. 1f is a schematic diagram of a base plan view (base view) viewed from arrow 100E of FIG. 1a of the example VTOL vehicle of FIG. 1a according to the invention.

FIG. 1a is a schematic diagram illustrating a perspective view from the front of an example VTOL vehicle or aircraft 100 according to the invention. FIG. 1b is a schematic diagram illustrating a plan view 100A of the example VTOL vehicle 100 of FIG. 1a as viewed from arrow 100A in FIG. 1a. FIG. 1c is a schematic diagram illustrating a front view 100B of the example VTOL vehicle 100 of FIG. 1a as viewed from arrow 100B in FIG. 1a. FIG. 1d is a schematic diagram illustrating a side view 100C of the example VTOL vehicle 100 of FIG. 1a as viewed from arrow 100C of FIG. 1a. FIG. 1e is a schematic diagram illustrating a rear view 100D of the example VTOL vehicle 100 of FIG. 1a as viewed from arrow 100D of FIG. 1a. FIG. 1f is a schematic diagram illustrating a base plan view 100E of the base 102d of the example VTOL vehicle 100 of FIG. 1a as viewed from arrow 100E of FIG. 1a. The following description may be read in light of FIGS. 1a-1f, which will be referred to when the need arises.

Referring to FIG. 1a, the VTOL vehicle 100 includes a fuselage 102 having longitudinally a front section 102a and a rear section 102b. The front section 102a and rear section 102b of the fuselage may have, by way of example only but is not limited to, a central section 102c there between. The plan view 100B of FIG. 1b illustrates a longitudinal axis 103 of the fuselage 102. As seen in FIG. 1a, the VTOL vehicle 100 has a first lifting surface 104 and a second lifting surface 106. The first lifting surface 104 is coupled to at least a portion of the rear section 102b of the fuselage 102. The second lifting surface is coupled to at least a portion of the front section 102a of the fuselage 102. In this example, the first lifting surface 104 includes two wings 104a and 104b (or aerofoils) that are respectively secured to opposite sides of the rear section 102b of the fuselage 102. The two wings 104a and 104b are mirror images of each other and of the same dimensions. The second lifting surface 106 includes two wings 106a and 106b respectively secured to opposite sides of the front section 102a of the fuselage 100. The two wings 106a and 106b are mirror images of each other and of the same dimensions.

Each of the wings 104a-104b and 106a-106b of the first and second lifting surfaces 104 and 106, respectively, have a wing-tip 112a-112b and 114a-114b (or an end-tip) that is distal or at the opposite end of the wing 104a-104b and 106a-106b from the end of the corresponding wing 104a-104b or 106a-106b that is secured to the fuselage 102. For example, wing 104a of first lifting surface 104 has a wing-tip 112a that is at a distal end of the wing 104a from the end of the wing 104a that is joined, secured or fixed/coupled or connects the wing 104a to the fuselage 102. Similarly, wing 106a of second lifting surface 106 has a wing-tip 114a that is at a distal end of the wing 106a from the end of the wing 106a that is joined, secured or fixed/coupled or connects the wing 106a to the fuselage 102. Similar comments may be made for wings 104b and 106b of the first and second lifting surfaces 104 and 106.

It is noted that each of the wings 104a-106b of the lifting surfaces 104 and 106 have at least one wing chord that is substantially parallel to a longitudinal axis 103 of the fuselage 102 as shown in FIG. 1b; usually wing chords are parallel to the flight direction and in effect with the longitudinal axis 103 of the fuselage 102. Generally the flight direction is parallel to the longitudinal axis 103. Alternatively or additionally, the wings 104a-106b of the lifting surfaces 104 and 106 may be oriented and secured to the fuselage 102 such that a first plane parallel to the longitudinal axis 103 of the fuselage 102, where the first plane intersects a first point of wing-tip 112a of wing 104a and also intersects a corresponding (or mirrored) second point of wing-tip 112b of wing 104b, is parallel to a second plane, where the second plane is also parallel to the longitudinal axis 103 of the fuselage 102 and intersects a first point of wing-tip 114a of wing 106a and also intersects a corresponding (or mirrored) second point of wing-tip 114b of wing 106b.

In the current example, although the wings 104a-104b and wings 106a-106b of the example VTOL vehicle 100 have, by way of example only but is not limited to, no dihedral angle, it is to be appreciated by the skilled person that the wings 106a-106b of the second lifting surface 106 may have a dihedral angle that may increase the aerodynamic stability around the roll axis, or around the longitudinal axis 103 of the fuselage. Furthermore, it is to be appreciated by the skilled person that the wings 104a-104b of the first lifting surface 104 may also have a dihedral angle that may further increase the aerodynamic stability around the roll axis, or around the longitudinal axis 103 of the fuselage 102. However, if the VTOL vehicle 100 has too much stability as the application demands, then either the wings 104a-104b and/or the wings 106a-106b may be configured to have an anhedral angle. The skilled person would appreciate that other wing configurations such as, by way of example only but not limited to, flat wing, dihedral angled wing, anhedral angled wing, polyhedral wing, gull wing, inverted gull wing, upward cranked tips, downward cranked tips and any other wing configuration and/or combinations thereof, modifications thereof, and/or as desired as the application demands.

In the current example, the wings 104a-104b of the VTOL vehicle 100 form a rectangular shaped wing planform when viewed from arrow 100A of FIG. 1a and illustrated in FIG. 1b. Furthermore, the wings 106a-106b of the VTOL vehicle 100 form a slight cropped delta shaped wing planform when viewed from arrow 100A of FIG. 1a and illustrated in FIG. 1b. The delta shape planform of wings 106a-106b may increase the aerodynamic stability around yaw axis and pitch axis of the VTOL vehicle 100. Although the wings 104a-104b and the wings 106a-106b have, by way of example but is not limited to, the above-mentioned shaped planforms, it is to be appreciated by the skilled person that the wings 104a-104b and the wings 106a-106b are not so limited and that other shaped planforms may be applied and used without loss of generality and as the application demands.

In the current example, the wings 104a-104b and the wings 106a-106b of the VTOL vehicle 100 both have a straight wing sweep when viewed from arrow 100A of FIG. 1a and illustrated in FIG. 1b. Although the wings 104a-104b and the wings 106a-106b of the VTOL vehicle 100 both have, by way of example only but are not limited to, a straight wing sweep, it is to be appreciated by the skilled person that wings 104a-104b and/or the wings 106a-106b may be configured to have other or different types of wing sweeps such as, by way of example only but not limited to, one or more or combinations of straight, swept back, or forward swept or any other type of wing sweep as the application demands.

Each of the two wings 104a and 104b of the first lifting surface 104 further includes at least one engine module 108a and 108d pivotally mounted or coupled to wings 104a and 104b, respectively. In this example, wing 104a of the first lifting surface 104 has two engine modules 108a and 108b pivotally mounted to wing 104a. Wing 104b of the first lifting surface also has two engine modules 108c and 108d pivotally mounted to wing 104b. Similarly, each of the two wings 106a and 106b of the second lifting surface 106 further includes at least one engine module 108e and 108h pivotally mounted or coupled to wings 106a and 106b, respectively. In this example, wing 106a of the second lifting surface 106 has two engine modules 108e and 108f pivotally mounted to wing 106a. Wing 106b of the second lifting surface also has two engine modules 108g and 108h pivotally mounted to wing 106b.

Although the present example describes a VTOL vehicle 100 with, by way of example only but is not limited to, eight engine modules 108a-108h in which two of the engine modules 108a-108h are pivotally mounted on each of the wings 104a-106b, it is to be appreciated by the skilled person that each wing of the VTOL vehicle 100 may include at least one engine module, or two or more engine modules, or a plurality of engine modules on each wing of the VTOL vehicle 100 as the application demands. In addition, although the present example describes having, by way of example only but is not limited to, having an equal number of engine modules on each of the wings 104a-106b, it is to be appreciated by the skilled person that each set of wings 104a-104b of the first lifting surface 104 may have an equal number of engine modules, and that each set of wings 106a-106b of the second lifting surface 106 may have another equal number of engine modules, but that the number of engine modules mounted on the first lifting surface 104 does not necessarily need to be equal to the number of engine modules mounted on the second lifting surface 106.

Furthermore, although the present example assumes the engine modules, by way of example only but is not limited to, have a substantially equal size thrust capabilities, it is to be appreciated by the skilled person that each engine module of the plurality of engine modules on each set of wings 104a-104b or each set of wings 106a-106b may have unequal or differently sized thrust capabilities as the application demands. The skilled person would appreciate that the control of the VTOL vehicle 100 may be adapted accordingly to take into account engine modules having unequal or differently sized thrust capabilities as the application demands.

Referring back to the present example of FIGS. 1a-1f, each of the engine modules 108a-108h may include, by way of example only but is not limited to, at least one from the group of: an electric ducted fan; electric ducted rotor; electric fan; electric rotor; electric jet engines; gas turbines; internal combustion engine with fans or rotors and the like; or any other power plant configurable for transitioning the VTOL vehicle between the vertical mode of flight and the horizontal mode of flight and/or maintaining the vertical mode of flight and/or maintaining the horizontal mode of flight. In this example, each of the engine modules 108a-108h is based on an electric ducted rotor.

Each of the engine modules 108a-108h may be connected to a suitable power source or electrical power system such as, by way of example only but is not limited to, one or more or a combination of: power storage devices, electrical sources for providing electrical power, one or more electrical storage device(s); one or more battery(ies); one or more capacitor(s); one or more solar panel(s); one or more fuel cell(s); one or more internal combustion engine(s); one or more gas turbine(s); any other suitable electrical power source for use in powering one or more engine modules to enable, when VTOL vehicle is in use, the engine modules to provide enough thrust or a thrust vector for the VTOL vehicle 100 to enter and/or transition from between a vertical mode of flight and/or a horizontal mode of flight; and/or combination(s) thereof. The power source for each of the engine modules 108a-108h may be located on the VTOL vehicle 100 as the application demands and, if necessary, according to regulatory standards/policies. For example, the power source(s) for the engine modules 108a-108h may be located, by way of example only but is not limited to, within the wings 104a-106b, fuselage 102, in base 102d of the fuselage 102 and/or any other suitable location on the VTOL vehicle 100.

Each of the engine modules 108a-108h are pivotally mounted to a corresponding one of the wings 104a-106b and pivots around a tilting axis 107a or 107b perpendicular to a longitudinal axis 103 of the fuselage 102 as illustrated in FIGS. 1b and 1c. As illustrated in FIG. 1b or f, the tilting axes 107a and 107b are also substantially parallel to the plan view 110A of the VTOL vehicle 100. Although the tilting axis 107a or 107b for each engine module is described, by way of example only but is not limited to, being substantially parallel to the plan view 110A of VTOL vehicle 100, it is to be appreciated by the skilled person that the tilting axis for one or more of the engine modules 108a-108h may be in line with the wing plane of the wing 104a-106b the one or more engine modules 108a-108h are pivotally mounted and/or any other suitable orientation or plane as the application demands.

Furthermore, each of the engine modules 108a-108h may be oriented such that the tilting axis 107a or 107b of each of the engine modules 108a-108h is substantially perpendicular to a wing chord line of the corresponding wing 104a-106b located in the vicinity of each of the engine modules 108a-108h are pivotally mounted. The wing chord or chord of a wing may be determined by measuring the distance between the leading edge and trailing edge of the wing in the direction of the airflow or expected airflow over the wing. The wing chord line may be an imaginary line drawn from a particular location on the leading edge towards the trailing edge of the wing in the direction of airflow or expected airflow over the wing.

In the present example of VTOL vehicle 100, each of the engine modules 108a-108h includes at least one rotor comprising at least two rotor blades coupled to a drive shaft which is driven, by way of example only but is not limited to, an electric motor. Thus, the drive shaft/electric motor of each of the engine modules 108a-108h may be considered the centre of the engine module. Each of the engine modules 108a-108h may be oriented such that the tilting axis 107a or 107b of each of the engine modules 108a-108h is perpendicular to a wing chord line that passes through the centre of the corresponding one of the engine modules 108a-108h.

In this example, a first set of engine modules 108a-108d of the first lifting surface pivot around tilting axis 107a. A second set of engine modules 108e-108h of the second lifting surface pivot around tilting axis 107b. Although this example illustrates the tilting axis 107a for each engine module in the set of engine modules 108a-108d is shown to be, by way of example only but is not limited to, the same tilting axis 107a, it is to be appreciated by the skilled person that each engine module in the set of engine modules 108a-108d may be positioned to pivot around a separate or different tilting axis in which each tilting axis may be substantially perpendicular to the longitudinal axis of the fuselage but spaced apart from one or more tilting axes of one or more other engine modules of the same lifting surface.

For example, the wings 104a and 104b of the first lifting surface 104 may have a swept back or swept forward configuration. In such a case, each of the engine modules 108a-108b of wing 104a of the first lifting surface 104 is pivotally mounted or coupled to the wing 104a and configured to pivot around a different tilting axis that is positioned or spaced apart from the tilting axis of the other engine module 108b or 108a. Each of the engine modules 108c-108d of wing 104b of the first lifting surface 104 is pivotally mounted or coupled to the wing 104b and configured to pivot around a different tilting axis that is positioned or spaced apart from the tilting axis of the other engine module 108d or 108c.

Each of the engine modules 108a or 108b of wing 104a of the first lifting surface 104 may be coupled to a tilt mechanism including one or more actuators (not shown). Each tilt mechanism may be configured to pivot the engine module 108a around the corresponding tilting axis of that engine module. In this example, the engine modules 108a and 108b are configured to pivot around tilting axis 107a, thus one or more tilt mechanisms may be configured to tilt or pivot engine module 108a and/or engine module 108b as desired. Similarly, each of the engine modules 108c or 108d of wing 104b of the first lifting surface 104 may be coupled to one or more tilt mechanisms (not shown). Each tilt mechanism may be configured to pivot the engine module 108c and/or 108d around the corresponding tilting axis 107a of that engine module. In this example, the engine modules 108c and 108d are configured to pivot around tilting axis 107a, thus the one or more tilt mechanisms may be configured to tilt or pivot engine module 108c and/or engine module 108d as desired.

Similarly, each of the engine modules 108e or 108f of wing 106a of the second lifting surface 106 may be coupled to one or more tilt mechanisms (not shown). Alternatively or additionally, two or more engine modules or several engine modules could also be tilted by on actuator and/or tilt mechanism. Each tilt mechanism may be configured to pivot the corresponding engine module 108e and/or 108f around the corresponding tilting axis of that engine module 108e and/or 108f. In this example, the engine modules 108e and 108f are configured to pivot around tilting axis 107b, thus one or more tilt mechanisms may be configured to tilt or pivot engine module 108e and/or engine module 108e as desired. Similarly, each of the engine modules 108g or 108h of wing 106b of the second lifting surface 106 may be coupled to one or more other tilt mechanisms (not shown).

Each tilt mechanism may be configured to pivot the engine module 108g or 108h around the corresponding tilting axis of that engine module 108g or 108h. In this example, the engine modules 108g and 108h are each configured to pivot around tilting axis 107b, thus the one or more tilt mechanisms may be configured to tilt or pivot engine module 108g and/or engine module 108h as desired.

As described and illustrated in FIGS. 1b, 1c, 1e and 1f, each of the engine modules 108a-108h is pivotable around a tilt axis 107a or 107b (or pivot axis) that is substantially perpendicular to the longitudinal axis 103 of the fuselage 102. The pivot angle or tilt angle of each engine module may be adjusted from at least one or more vertical mode position(s) associated with the vertical mode of flight to at least one or more flight mode positions associated with the horizontal model of flight. Each of the engine modules 108a-108h may be configured to be capable, when the VTOL vehicle 100 is in operation or use, of producing a thrust (or thrust vector) in the direction of airflow in line with a wing chord of a corresponding wing 104a-106b for maintaining or operating in the horizontal mode of flight when pivoted to at least one of the flight mode position(s). Each of the engine modules 108a-108h may also be configured to be capable, when the VTOL vehicle 100 is in operation or use, of producing a thrust (or thrust vector) perpendicular to a wing plane (or a plane substantially parallel to the corresponding lifting surface or wing surface) or substantially perpendicular to the wing chord when pivoted to at least one or more vertical mode positions for maintaining or operating in the vertical mode of flight (e.g. to maintain a hover or a vertical mode of flight during landing).

In another example, the each of the engine module(s) 108a-108h may be pivotable between at least a first position lying within the wing plane of the corresponding wing and at least a second position lying substantially in a plane perpendicular to the wing plane, where each of the engine module(s) 108a-108h is capable of producing thrust substantially perpendicular to the wing plane when in the at least one first position (e.g. a vertical mode position) and is capable of producing thrust substantially parallel to the wing plane when in the at least one second position (e.g. a flight mode position).

The engine modules 108a-108h of the VTOL vehicle 100 are thus configured for transitioning the VTOL vehicle 100 between a vertical mode of flight and a horizontal mode of flight. The vertical mode of flight may be defined to occur when the engine modules 108a-108h of the VTOL vehicle 100, when in use, are suitably pivoted to a vertical mode position and controlled to substantially produce the required thrust necessary to allow the VTOL vehicle 100 to, by way of example only but not limited to, vertically take-off, keep aloft and/or maintain a hover, and/or controlling a vertical landing without any assistance from the wings 104a-106b of the lifting surfaces 104 or 106 of the VTOL vehicle 100. Essentially, the wings 104a-106b do not provide any lifting force capable of keeping the VTOL vehicle aloft 100 when the VTOL vehicle is in a vertical mode of flight. The horizontal mode of flight may be defined to occur when the engine modules 108a-108h of the VTOL vehicle 100, when in use, are suitably pivoted from a vertical mode position to a flight mode position and controlled to substantially produce the required thrust necessary ensure the wings 104a-106b of the lifting surfaces 104 or 106 of the VTOL vehicle 100 substantially produce the required lifting force necessary to keep the VTOL vehicle 100 aloft or on a particular flight path and/or orientation etc. The VTOL vehicle 100 may transition from a vertical mode of flight to a horizontal mode of flight by controlling the change in tilt angle or pivot and also the change in thrust output from each of the engine modules 108a-108h until the wings 104a-106b of the lifting surfaces 104 and 106 have sufficient or more airflow for keep the VTOL vehicle 100 at least aloft.

During the transition from the vertical mode of flight to the horizontal mode of flight the engine modules 108a-108h, and as the engine modules 108a-108h are pivoted from one of the vertical mode positions to one of the horizontal mode positions, the engine modules 108a-108h and the lifting surfaces 104 and 106 being to share the lifting forces required to keep the VTOL vehicle 100 aloft or on a particular flight path or flight orientation. Initially, the engine modules 108a-108h take most of the burden of generating the required thrust to keep the VTOL vehicle 100 aloft or airborne. However, as the engine modules 108a-108h pivot further towards at least one of the horizontal flight positions, the wings 104a-106b of the lifting surfaces 104 and 106 start to generate sufficient lifting force to keep the VTOL vehicle aloft and allow the VTOL vehicle 100 to follow a flight path or orientation, with the engine modules 108a-108h only providing the necessary forward motion and/or changes in orientation, direction, position and the like.

In this example, the engine modules 108a-108h of VTOL vehicle 100 may be configured to be independently controlled (e.g. by a flight control system or apparatus) for transitioning between the vertical mode of flight and the horizontal mode of flight. This provides the advantage of improved manoeuvrability and a smoother flight when operating the VTOL vehicle 100. Alternatively or additionally, groups of engine modules on each of the wings 104a-106b may be jointly controlled and independently controlled in relation to other groups of engine modules on other wings 104a-106b.

In the example VTOL vehicle of FIGS. 1a-1f, each of the engine modules 108a-108h are configured to be pivotable about a tilt axes 107a and/or 107b and are mounted in the vicinity of the trailing edge of the corresponding wing 104a-106b. The tilt axis 107a and 107b for each engine module 108a-108h may be perpendicular to the longitudinal axis 103 of the fuselage 102 and/or a wing chord line in the vicinity of each of the corresponding engine modules 108a-108h. For example, the wing chord line may passes through the centre of the corresponding engine module (e.g. through the centre of the drive shaft coupled to two or more rotor blades of a rotor based engine module). Thus, when in the horizontal mode of flight, when the VTOL vehicle 100 is in operation, each engine module 108a-108h is pivoted such that the airflow over the wings 104a-106b is substantially in the direction of thrust of at least one or more of the engine modules 108a-108h. Each of the engine modules 108a-108h may include a tilt mechanism (not shown) configured for independently pivoting each of the engine modules 108a-108h about the tilt axis or pivot axis 107a or 107b to allow the VTOL vehicle 100 to transition from a vertical mode of flight to a horizontal mode of flight. The tilt mechanism (not shown) may be configured for independently pivoting said each of the engine modules 108a-108h about the tilt axis 107a or 107b of the corresponding engine module.

The wings 104a-106b of the VTOL vehicle 100 are configured to have no moving flight control surfaces such as, by way of example only but not limited to, ailerons, rudders, elevators and the like that are common on most aircraft and/or helicopters and other conventional VTOL aircraft. Instead, the VTOL vehicle 100 may be controlled only by the pivotable or tiltable engine modules 108a-108h, which provide thrust, in which each of the engine modules 108a-108h may be independently controlled and/or groups of engine modules on each of the wings 104a-106b of the VTOL vehicle 100 may be independently controlled. Furthermore, due to their design and configuration, two or more engine modules may be configured to be used to control the aircraft when the motors of the engine modules are not operating (e.g. due to a possible malfunction), but when the tilt mechanisms of these engine modules are functional. Depending on the location of the non-operational engine modules, such engine modules may be temporarily used (e.g. in an emergency due to a malfunction on two or more engine modules) as aileron(s)/rudder(s) by activating the tilt mechanisms and/or feathering the rotor blades etc.

The VTOL vehicle 100 in which each of the engine modules 108a-108h are independently controllable provides the advantages of improved stability and manoeuvrability during the vertical modes of flight, transitioning between vertical modes of flight and horizontal modes of flight, and/or in the horizontal modes of flight. Grouping the engine modules 108a-108h into sets of engine modules in which each set of engine modules is controlled in unison may provide the advantage of reduced complexity and possible weight savings in relation to the reduced number of tilt mechanism, but at a cost of reduced stability and manoeuvrability when compared to a VTOL vehicle 100 in which each of the engine modules 108a-108h are independently controlled. However, it is to be appreciated by the skilled person that the engine modules or groups of engine modules may be independently controlled as the application demands.

The VTOL vehicle 100 may be configured as the application demands to be based on, by way of example only but is not limited to, at least one from the group of: a fully autonomous VTOL vehicle, a remote controlled VTOL vehicle, semi-autonomous VTOL vehicle with optional use and/or communication interfaces for a pilot or for remote control, and/or a VTOL vehicle with control user interfaces allowing manual piloting; and/or any combination thereof as the application demands.

In order to control the thrust and pivoting of the engine modules 108a-108h, the VTOL vehicle 100 may include an on-board flight control system that may include a flight controller device (not shown) coupled to or connected to the pivotable engine modules 108a-108h. The flight controller device may be configured to control the pivot and thrust of each of the engine modules 108a-108h independently, and/or control the pivot and thrust of a set of engine modules of the engine modules 108a-108h in unison. The flight controller device may be configured to control, by way of example only but is not limited to, the motor RPM and/or tilt mechanisms of each of the engine modules 108a-108h to give the VTOL vehicle 100 the desired, by way of example only but not limited to, attitude, orientation, speed and altitude. The flight controller device may receive instructions to control the engine modules through inputs by a human user, or an autonomous device or a machine/autopilot either on board the VTOL vehicle 100 and/or remotely.

For example, the flight controller device may be configured to control, by way of example only but is not limited to, one or more of the modes of flight operation of the VTOL vehicle 100 (e.g. vertical mode of flight and/or horizontal mode of flight and transitioning there between), speed, position, direction, orientation and/or flight path of the VTOL vehicle 100 and other aspects of the VTOL vehicle 100 as the application demands.

Thus a flight control system may include the flight controller device, one or more power sources, and the engine modules 108a-108h of the VTOL vehicle, in which the flight controller device couples the power source(s) with the engine modules 108a-108h for controlling, by way of example only but not limited to, the mode of operation of the VTOL vehicle 100, flight path, position, orientation, speed and attitude of the VTOL vehicle 100 and the like.

Additionally or alternatively, the flight control system may further include a user interface device (not shown) coupled to the flight controller, where the flight controller is configured for controlling one or more of the engine modules 108a-108h in response to a user position, speed or directional input from the user interface. The user interface device may comprise or represent any one or more devices that is configured to receive user input in relation to controlling the VTOL vehicle 100. Examples of user interface device according to the invention may include, by way of example only but is not limited to, one or more or a combination of a touch screen device(s), keyboard(s), control panel(s), control console(s), joy stick, pedals, steering wheel and any other device allowing a user to control the flight path and/or direction, take-off and landing of the VTOL vehicle 100 and the like. The user interface device allows a human pilot within the VTOL vehicle 100 to pilot the VTOL vehicle with the assistance of the flight controller, which manages and controls the multiple engine modules 108a-108h to implement the desired user input received from the user interface device. Thus, a user of the VTOL vehicle 100 does not need to understand or know how to control, by way of example only but not limited to, the thrust, RPM, or pivot of each of the individual engine modules 108a-108h in order to pilot the VTOL vehicle 100. Rather, the user uses the user interface device to input the desired flight path, direction, orientation, speed, attitude, hover, take-off and landing and other inputs of the VTOL vehicle 100.

Additionally or alternatively to the user interface device, the flight control system may further include an autonomous interface device coupled the flight controller. The autonomous interface may include or be coupled to one or more communication interfaces for communicating with a remote operations centre. The autonomous interface is configured for interpreting mission or session instructions/commands from the remote operations centre, and based on the mission instructions/commands to autonomously direct the flight controller device to operate the VTOL vehicle 100 in accordance with the mission instructions/commands received from the remote operations control centre.

For example, the mission instructions or commands may be to direct the VTOL vehicle 100, which has landed at a location A, to fly to location B to pick up a payload comprising a spare part for delivery a location C at a certain time. Thus, the mission instructions may include, by way of example only but not limited to, data representative of the necessary geographic, weather, and time information and other instructions or information to enable the VTOL vehicle 100 to autonomously take-off from location A, transition from a vertical mode of flight to a horizontal mode of flight and navigate to location B, transition from a horizontal mode of flight to a vertical mode of flight and land at location B for receiving the spare part and/or recharging the VTOL vehicle 100. Once the spare part is loaded and, if necessary, the VTOL vehicle 100 is recharged, the VTOL vehicle 100 may autonomously continue the mission and autonomously takes-off from location B, transitions from a vertical mode of flight to a horizontal mode of flight and navigates to location C, transitions from a horizontal mode of flight to a vertical mode of flight and lands at location C for delivering the spare part. The VTOL vehicle 100 may autonomously return to location A or any other location as directed by the remove operations centre. In another example, instead of spare parts the payload may instead be one or more passengers that require transport from location B to location C.

Additionally, the VTOL vehicle 100 may further include a sensor suite or a set of sensor(s), which are also connected to the flight control system. Each of the sensor(s) provides data representative of a sensor signal for use by the flight controller to control the operation and/or flight of the VTOL vehicle 100. The set of sensors may provide data for assisting with the control and operation of the VTOL vehicle 100 when operating autonomously, semi-autonomously, remote controlled, and/or piloted by a human operator/user. Examples of sensors for use with the VTOL vehicle 100 may include, by way of example only but is not limited to, one or more of accelerometer(s); gyroscope(s); range sensor(s) for estimating distance to obstacles (e.g. stereoscopic cameras, light detection and ranging (LIDAR), sonar, radar, ultrasound sensors, and the like); altimeters; computer vision systems; relative motion sensor(s) for detecting position and motion relative to ground or other objects (e.g. visual camera); magnetometers; global positioning system (GPS) sensors or receivers; speed sensors; level sensors; airspeed sensors; position control means using electromagnetic waves between vehicle and ground stations (e.g. radio or telecommunications systems); temperature sensors; infrared sensors; night vision sensors and the like; weather radar; and/or any other sensor or sensor equipment suitable for assisting the control and/or operation of the VTOL vehicle during operation.

In operation, the flight controller may receive the a control input that may include data representative of at least one from the group of: speed, direction, orientation, position, flight and attitude in relation to the VTOL vehicle. The flight controller may also receive sensor data from the set of sensor(s) for assisting the flight controller in operating the VTOL vehicle 100. The control input may be user input data from a user interface device and/or autonomous data from an autonomous device as described herein. For example, the flight controller may receive autonomous data from the autonomous control device associated with mission/operation instructions. The flight controller may receive user input data from a user input interface. The flight controller may perform a comparison of the current status of the VTOL vehicle 100 (e.g. flight path, orientation, attitude, speed, direction, position in space and time and the like) and the desired status of the VTOL vehicle 100 as defined at least by one or more of the control input, sensor data, user input data, autonomous data and the like. The flight controller may use the comparison and the control input data, user input data, the sensor data and/or the autonomous data to, by way of example only but not limited to, control the thrust and/or pivot orientation of each of the engine modules 108a-108h independently and to change the current status (e.g. orientation and/or flight path) of the VTOL vehicle 100 towards the desired status in response to the received control input, received sensor data, received user input (if any) and/or the received autonomous data (if any).

The flight controller device may control one or more of the engine modules 108a-108h independently based on one or more engine module operations from the group of: revolutions per minute of rotors of an engine module; rotor blade pitch of an engine module; torque differentials acting on each engine module; independently tilting or pivoting of each of the engine modules 108a-108h for generating thrust vectors for changing speed, direction or position of the VTOL vehicle; and/or any other engine module operation that may be used to control the flight path and/or orientation and the like of the VTOL vehicle 100. These engine module operations may be used by the flight controller to adjust the VTOL vehicle 100 according to a coordinate system with respect to the VTOL vehicle 100.

For example, a 3-dimensional coordinate system may be defined by an x-axis, a y-axis and a z-axis. The x-axis is defined to be parallel to the longitudinal axis 103 of the fuselage of the VTOL vehicle 100. The y-axis is defined to be perpendicular to the x-axis and substantially parallel to the tilting axis of the engine modules 108a-108h and/or substantially parallel to plane or line intersecting the distal ends of the wingtips 112a-112b and/or 114a-114b of the wings 104a-104b and/or wings 106a-106b, respectively. The z-axis may be defined to be perpendicular to the x-axis and the y-axis. Thus, toward the wing plane with respect to the a n x-direction, y direction, z-direction. The flight controller may only use the above-mentioned engine module operations to control the orientation and flight of the VTOL vehicle 100. Thus, a certain combination of engine module operations may be used to direct the VTOL vehicle 100 along, by way of example only but not limited to, the x-axis, the y-axis, and/or the z-axis and/or direct the VTOL vehicle 100 around, by way of example only but not limited to, the x-axis (e.g. a roll), the y-axis (e.g. a pitch or pivot), and/or around the z-axis (e.g. a yaw).

The flight controller may be further configured to also efficiently control the rotation of the rotors of each of the engine modules 108a-108h. For example, the flight controller may be configured to control the rotation of rotors of one of the engine modules 108a-108b pivotally mounted on the first wing 104a of the first lifting surface 104 in an opposite direction to any adjacent engine module on the first wing 104a of the first lifting surface 104. The flight controller may further control the rotation of the rotors of each of the engine modules 108c-108d on a second wing 104b of the first lifting surface 104 in an opposite direction to the rotation of rotors of a correspondingly positioned or mirror positioned engine module 108a-108b, respectively, on the first wing 104a of the lifting surface 104. For example, the rotors of the engine module 108a on the first wing 104a of the first lifting surface 104 may have an opposite rotation to the engine module 108b on the first wing 104a of the first lifting surface. Furthermore, the rotors of the engine module 108d mounted on the second wing 104b of the first lifting surface 104 have an opposite rotation to the rotors of the engine module 108a mounted on the first wing 104a of the first lifting surface 104. These engine modules 108a and 108d are correspondingly positioned or mirror image positioned engine modules. Similarly, the rotors of the engine module 108c mounted on the second wing 104b of the first lifting surface 104 have an opposite rotation to the rotors of the engine module 108b mounted on the first wing 104a of the first lifting surface 104. These engine modules 108b and 108c are correspondingly positioned or mirror image positioned engine modules.

In addition, the flight controller may further control the rotors of each of the engine modules 108e-108h mounted of the second lifting surface 106 in an opposite rotation to the rotors of one of the correspondingly positioned engine modules 108a-108d mounted on the first lifting surface 104. For example, the rotors of the engine module 108e of the second lifting surface 106 may be controlled to have an opposite rotation to the rotors of the engine module 108a of the first lifting surface 104. The rotors of the engine module 108f of the second lifting surface 106 may be controlled to have an opposite rotation to the rotors of the engine module 108b of the first lifting surface 104. The rotors of the engine module 108g of the second lifting surface 106 may be controlled to have an opposite rotation to the rotors of the engine module 108c of the first lifting surface 104. The rotors of the engine module 108h of the second lifting surface 106 may be controlled to have an opposite rotation to the rotors of the engine module 108d of the first lifting surface 104. This enhances the efficiency and stability of the VTOL vehicle 100 when in vertical mode of flight, when transitioning between a vertical mode of flight and a horizontal mode of flight, and when in a horizontal mode of flight.

The flight system of the VTOL vehicle 100 may be implemented as one or more apparatus or computing devices, in which each apparatus and/or each computing device may include a processor unit, a memory unit and/or a communication interface, the processor unit connected to the memory unit and/or the communication interface. The memory unit may include a computer-readable medium with data or instruction code, which when executed on the processor unit, causes the processor unit to implement the functionality of the flight controller as described herein and/or modifications thereof. The apparatus or computing device may be further configured to implement the functionality of the autonomous device, the user interface and/or the sensor suite or interface with the sensor suite as described herein and/or modifications thereof.

The wings 104a-104b and 106a-106b of the first lifting surface 104 and second lifting surface 106, respectively, each provide an amount of lift when the VTOL vehicle 100 is in the horizontal mode of flight that is dependent on the centre of gravity of the VTOL vehicle 100 and centre of lift of generated by the engine modules 108a-108d of the first lifting surface 104 and the engine modules 108e-108h of the second lifting surface 106. As shown in FIGS. 1a and 1 b, the wings 104a-104b and 106a-106b of the first and second lifting surfaces 104 and 106, respectively, have cut-outs 110a-110h in the vicinity of the trailing edges of the wings 104a-106b for receiving one of the engine modules 108a-108h. Each engine module being mounted to a corresponding wing 104a-106b and pivotable along a tilting axis 107a or 107b that is perpendicular to the longitudinal axis 103 of the fuselage 102.

The positioning of the engine modules 108a-108h in the vicinity of the trailing edges of the wings 104a-106b of VTOL vehicle 100 means that the centre of gravity of the VTOL vehicle 100 is located in a way to maximise thrust and ensure safe operation from the motors of the engine modules 108a-108h during take-off, hover and landing. This impacts the required lift generated from the wings 104a-106b since the centre of lift of the wings 104a-106b is not co-located with the centre of lift of the motors of the engine modules 108a-108h. Assuming all motors of the engine modules 108a-108h generate a similar amount of lift (or thrust) during hover, this can result in less lift generated from the front wings 106a-106b than the rear wings 104a-104b when the motors of the engine modules 108a-108h are located towards or in the vicinity of the trailing edges of the wings 104a-106b.

Although it is preferred in this example that each engine module is mounted to a corresponding wing 104a-106b in the vicinity of, by way of example only but is not limited to, the trailing edge of the corresponding wing 104a-106b, it is to be appreciated by the skilled person that one or more of the engine modules 108a-108h may be mounted in the vicinity of other portions or parts of the structure of the corresponding wing 104a-106b such as, by way of example only but not limited to, in the vicinity of the leading edge of the corresponding wing 104a-106b, in the vicinity of the middle of the corresponding wing 104a-106b, and/or mounted to any other position or location of the corresponding wing 104a-106b or as the application demands. Furthermore, one or more further engine modules (not shown) may be pivotally mounted by pylons or struts to the fuselage 102 of the VTOL vehicle. These further engine modules may be static and/or retractable into the fuselage 102 of the VTOL vehicle. If retractable, then these further engine modules may be used for vertical modes of flight, hovering and/or transitioning between vertical to horizontal modes of flight, and/or only in take-off and/or landing operations, and/or where additional thrust may be required.

Figure 1H:
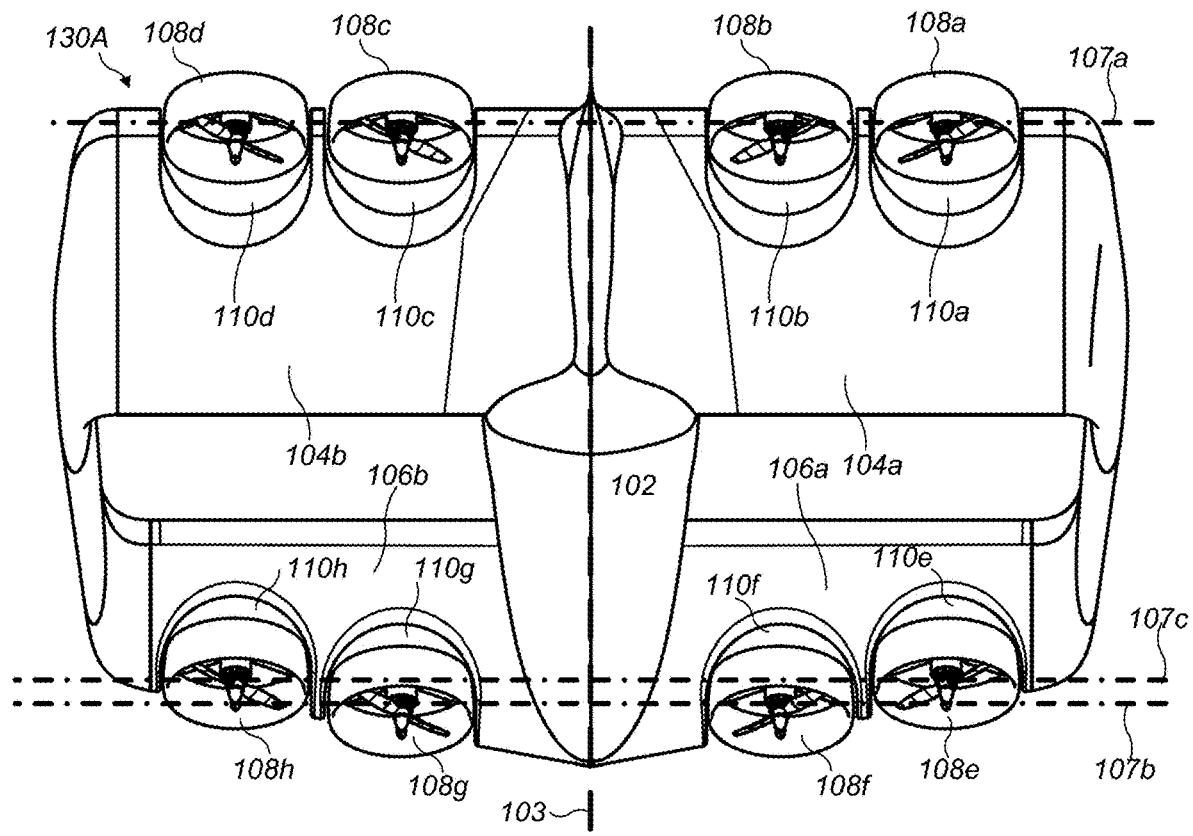
FIG. 1h is a schematic diagram illustrating a plan view (top view) viewed from arrow 130A of FIG. 1g of the example VTOL vehicle of FIG. 1g according to the invention.
Figure 1I:
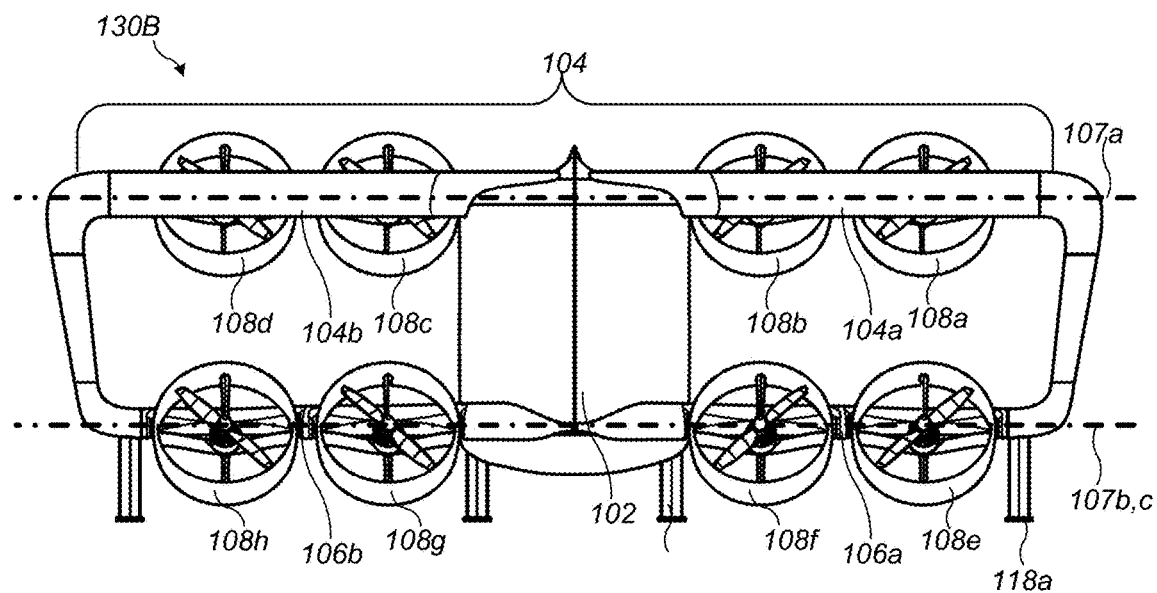
FIG. 1i is a schematic diagram illustrating a front view viewed from arrow 1308 of FIG. 1g of the example VTOL vehicle of FIG. 1g according to the invention.
Figure 1J:
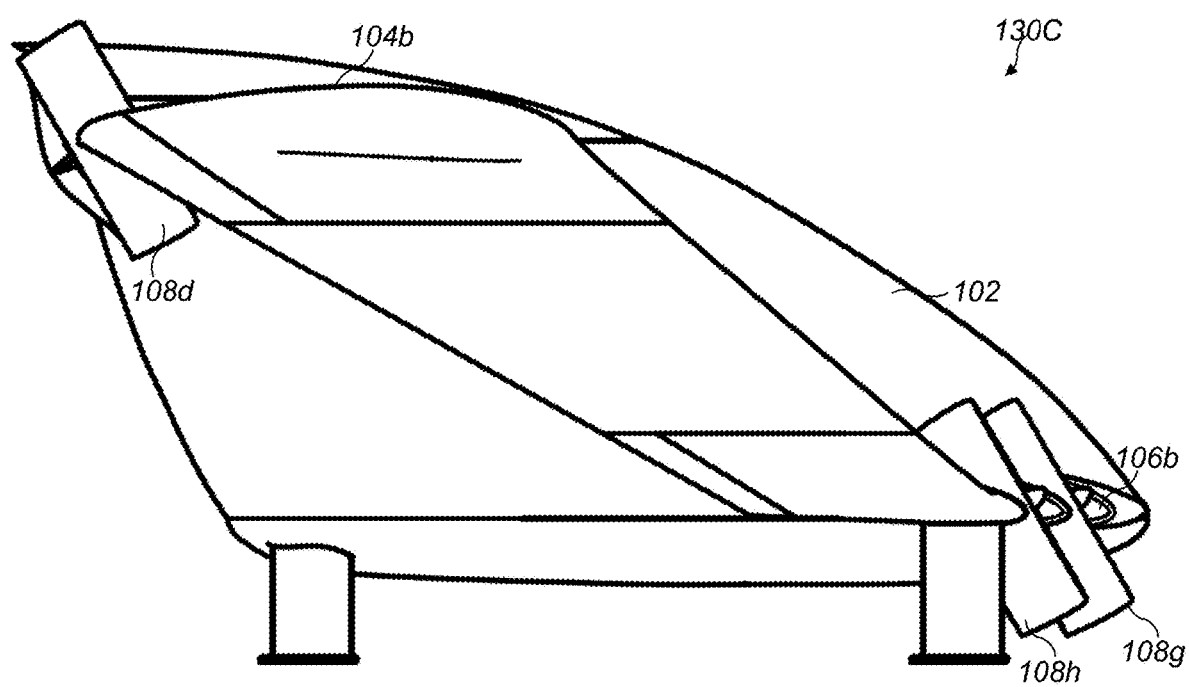
FIG. 1j is a schematic diagram illustrating a side view viewed from arrow 130C of FIG. 1g of the example VTOL vehicle of FIG. 1g according to the invention.

Several other examples of engine mounting configurations in relation to the VTOL vehicle 100 of FIGS. 1a-1f are illustrated in FIGS. 1g to 1n in VTOL vehicles 130 and 140 according to the invention. For simplicity and to avoid unnecessary duplication, common reference numerals as used in FIGS. 1a-1f are used throughout FIGS. 1g to 1n to indicate the same or similar features. FIG. 1g is a schematic diagram illustrating a perspective view from the front of another example VTOL vehicle or aircraft 130 according to the invention and which is based on VTOL vehicle or aircraft 100 of FIGS. 1a-1f. FIG. 1h is a schematic diagram illustrating a plan view 130A of the example VTOL vehicle 130 of FIG. 1g as viewed from arrow 130A in FIG. 1g. FIG. 1i is a schematic diagram illustrating a front view 130B of the example VTOL vehicle 130 of FIG. 1g as viewed from arrow 130B in FIG. 1g. FIG. 1j is a schematic diagram illustrating a side view 130C of the example VTOL vehicle 130 of FIG. 1g as viewed from arrow 130C of FIG. 1g.

Referring to FIGS. 1g to 1i, the VTOL vehicle 130 is based on the VTOL vehicle 100 of FIGS. 1a-1f in which the positioning or mounting of the engine modules 108e-108h has been modified. The wings 104a-104b and 106a-106b of the first lifting surface 104 and second lifting surface 106, respectively, each provide an amount of lift when the VTOL vehicle 130 is in the horizontal mode of flight that is dependent on the centre of gravity of the VTOL vehicle 130 and centre of lift of generated by the engine modules 108a-108d of the first lifting surface 104 and the engine modules 108e-108h of the second lifting surface 106. As shown in FIGS. 1g to 1i, the wings 104a-104b and 106a-106b of the first and second lifting surfaces 104 and 106, respectively, have cut-outs 110a-110h in the vicinity of the trailing and leading edges of the wings 104a-106b for receiving one of the engine modules 108a-108h. In particular, the wings 104a-104b of the first lifting surface 104, has cut-outs 110a-110d in the vicinity of the trailing edge the wings 104a-104b for receiving one of the engine modules 108a-108d. That is, each of the wings 104a-104b of the first lifting surface 104 has cut-outs 110a-110d along the trailing edge of the corresponding wing 104a-104b, each cut-out 110a-110d configured for receiving a corresponding engine module pivotable about a first tilting axis 107a, which is substantially perpendicular to the longitudinal axis 103 of the fuselage 102. Each of the engine modules 108a-108d is mounted to a corresponding wing 104a-104b and pivotable about or around the first tilting axis 107a that is perpendicular to the longitudinal axis 103 of the fuselage 102. As can be seen, the VTOL vehicle 130 has been modified from VTOL vehicle 100 of FIGS. 1a-1f in which the wings 106a-106b of the second lifting surface 106 has cut-outs 110e-110h in the vicinity of the leading edge the wings 106a-106b for receiving one of the engine modules 108e-108h. That is, each of the wings 106a-106b of the second lifting surface 106 have cut-outs 110e-110h along the leading edge of the wing 106, each cut-out 110e-110h configured for receiving an engine module pivotable about second or third tilting axes 107b or 107c, which are substantially perpendicular to the longitudinal axis of the fuselage. Each of the engine modules 108e-108h being mounted to a corresponding wing 104a-106b and pivotable about or around the second or the third tilting axis 107b or 107c that are perpendicular to the longitudinal axis 103 of the fuselage 102.

In this example, given that the leading edges of wings 106a-106b are swept back, a first pair of engine modules 108e and 108h from wings 106a and 106b, respectively, are positioned to pivot around the second tilting axis 107b. Similarly, a second pair of engine modules 108f and 108g from wings 106a and 106b, respectively, are positioned to pivot around the third tilting axis 107c. The second and third tilting axes 107b and 107c are separate or different tilting axes that may be substantially perpendicular to the longitudinal axis 103 of the fuselage 102 but are spaced apart from each other due to the sweep of the leading edge of wings 106a and 106b. In general, for a number of N engine modules on each wing 106a and 106b, then there may be a number of N tilting axes that are spaced apart from each other based on the sweep of the leading edge of the wings, in which each tilting axis may be a tilting axis for at least a pair of engine modules from each wing 106a and 106b.

Each of the engine modules 108a-108h may include a plurality of rotors or thrust mechanisms supported about a centre axis of the engine module, where the centre axis is substantially perpendicular to the tilting axis. The plurality of rotors or thrust mechanism may be configured to provide a thrust, when in operation, that is in a direction substantially perpendicular to the corresponding tilting axes 107a-107c of the corresponding engine module. Thus, each of the engine modules 108a-108h may provide a thrust that is in a direction substantially perpendicular to the corresponding tilting axis 107a-107c of that engine module.

As described in relation to FIGS. 1a-1f of VTOL vehicle 100, each of the engine modules 108a-108h of wings 104a-106b may be coupled to a tilt mechanism including one or more actuators (not shown) in which each tilt mechanism may be configured to independently pivot each of the engine modules 108a-108h around the corresponding tilting axes 107a-107c corresponding to that engine module. The engine modules 108a-108h of the VTOL vehicle 130 are thus configured for transitioning the VTOL vehicle 130 between a vertical mode of flight and a horizontal mode of flight. Although the modified positioning of engine modules 108e-108h have been described in FIGS. 1g-1j, it is to be appreciated by the skilled person that the similar or same features of VTOL vehicle 100 as described with respect to FIGS. 1a-1f and/or as described herein are also applicable to VTOL vehicle 130 of FIGS. 1g to 1i and/or as the application demands.

Figure 1K:
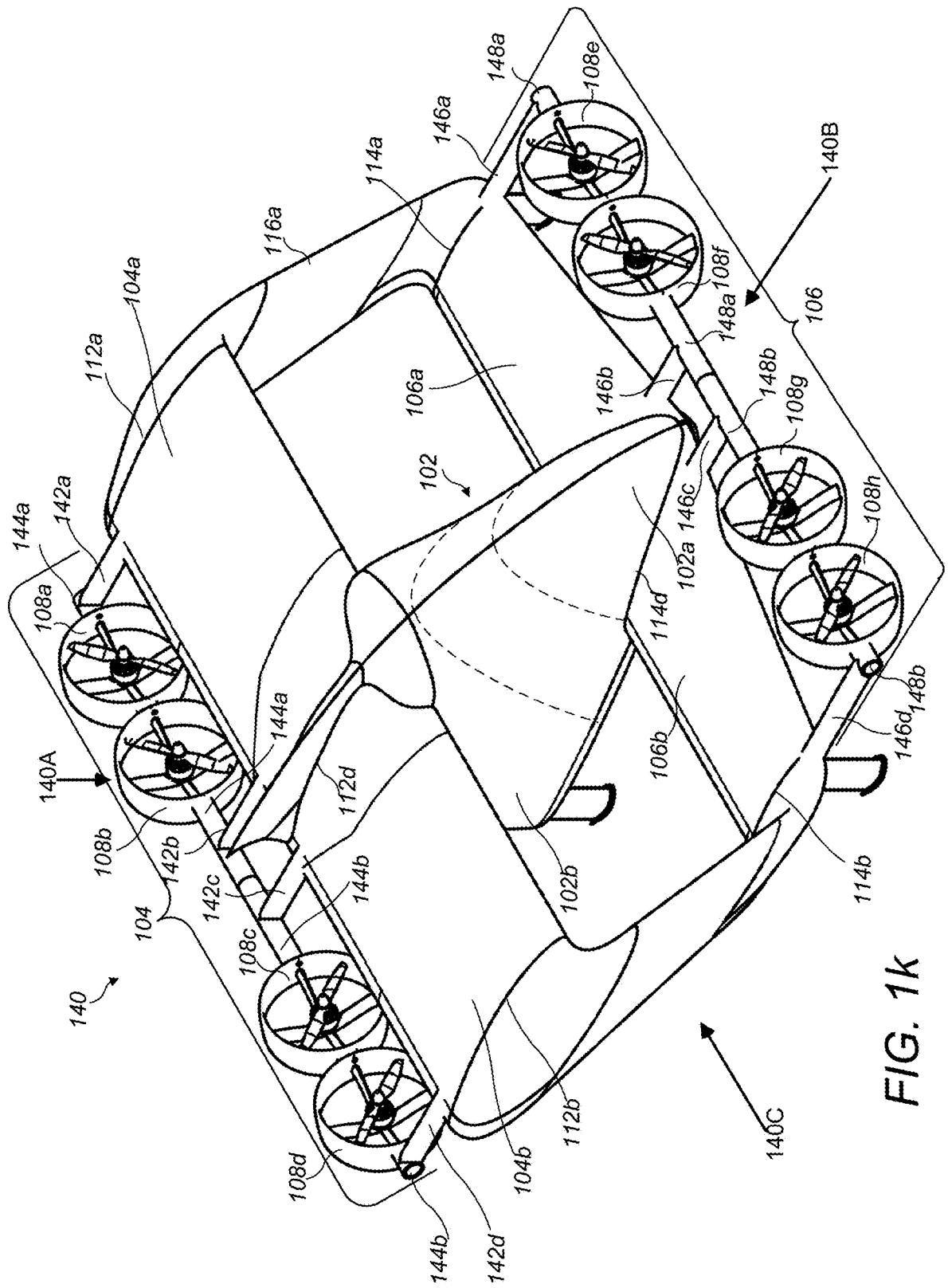
FIG. 1k is a schematic diagram illustrating a perspective view from the front of a further example VTOL vehicle according to the invention.
Figure 1L:
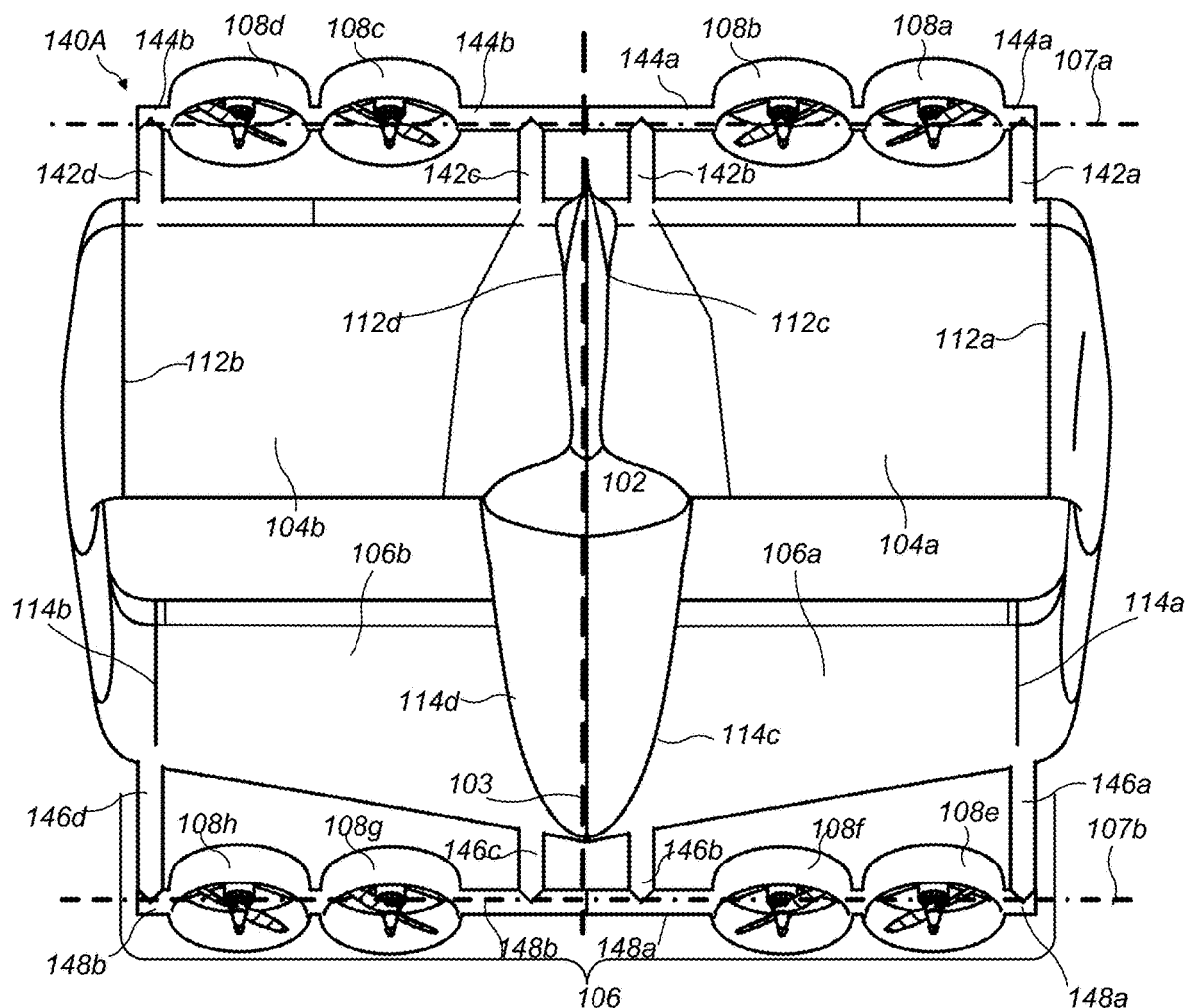
FIG. 1l is a schematic diagram illustrating a plan view (top view) viewed from arrow 140A of FIG. 1k of the example VTOL vehicle of FIG. 1k according to the invention.
Figure 1M:
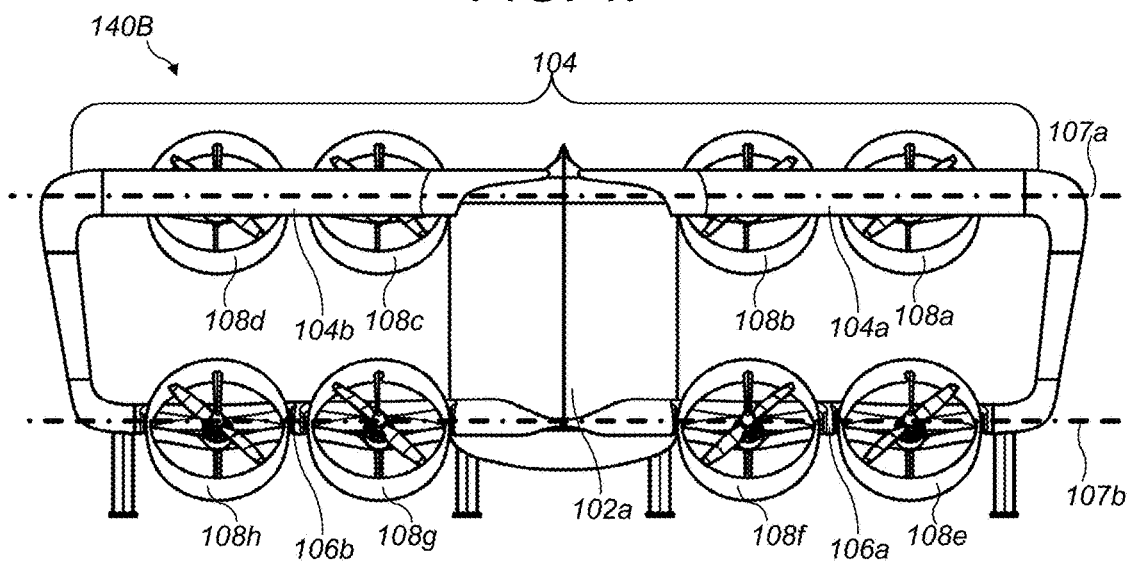
FIG. 1m is a schematic diagram illustrating a front view viewed from arrow 140B of FIG. 1k of the example VTOL vehicle of FIG. 1k according to the invention.
Figure 1N:
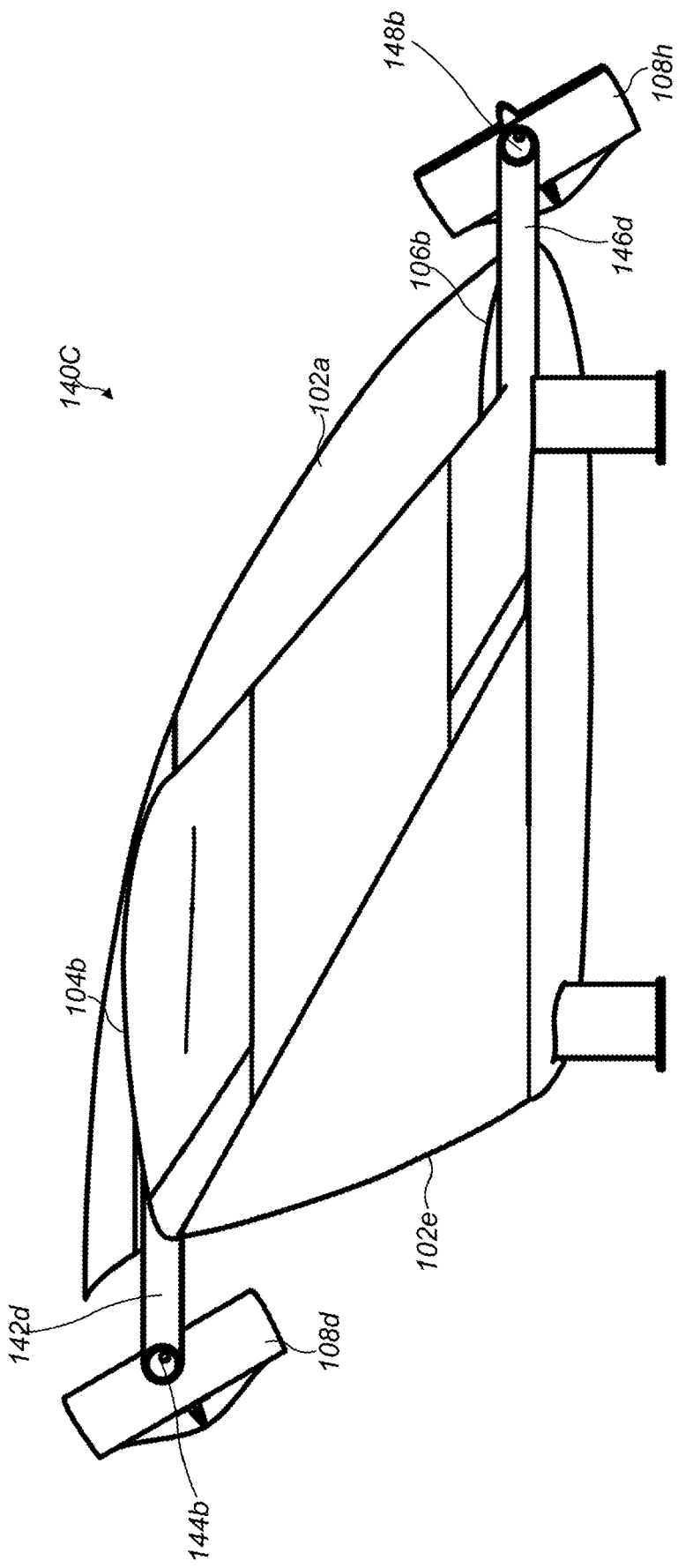
FIG. 1n is a schematic diagram illustrating a side view viewed from arrow 140C of FIG. 1k of the example VTOL vehicle of FIG. 1k according to the invention.

FIG. 1k is a schematic diagram illustrating a perspective view from the front of an further example VTOL vehicle or aircraft 140 according to the invention and which is based on VTOL vehicle or aircraft 100 of FIGS. 1a-1f. For simplicity and to avoid unnecessary duplication, common reference numerals as used in FIGS. 1a-1f are used throughout FIGS. 1g to 1 n to indicate the same or similar features. FIG. 1l is a schematic diagram illustrating a plan view 140A of the example VTOL vehicle 140 of FIG. 1k as viewed from arrow 140A in FIG. 1k. FIG. 1m is a schematic diagram illustrating a front view 1408 of the example VTOL vehicle 140 of FIG. 1*k* as viewed from arrow 140B in FIG. 1*k*. FIG. 1*n* is a schematic diagram illustrating a side view 140C of the example VTOL vehicle 140 of FIG. 1*k* as viewed from arrow 140C of FIG. 1*k*.

Referring to FIGS. 1*k* to 1*n*, the VTOL vehicle 140 is based on the VTOL vehicle 100 of FIGS. 1*a*-1*f* in which the positioning or mounting of the engine modules 108*a*-108*h* has been modified. In this example, the VTOL vehicle 140 is based on VTOL vehicle 100 of FIGS. 1*a*-1*f* but has been modified such that each of the engine modules 108*a*-108*h* are pivotally mounted to one or more tilting mechanisms 144*a*-144*b* and/or 148*a*-148*b* coupled to supporting struts 142*a*-142*d* and 146*a*-146*d* that are attached to the corresponding wing 104*a*-106*b* of VTOL vehicle 140 and/or portions of the fuselage 102. The tilting mechanisms 144*a*-144*b* and/or 148*a*-148*b* may be configured to independently pivot or tilt each of the engine modules 108*a*-108*h* for a vertical mode of flight (e.g. hovering), transitioning between vertical to a horizontal mode of flight, and in a horizontal mode of flight of VTOL vehicle 140 as described with reference to VTOL vehicle 100 of FIGS. 1*a*-1*f* and/or as herein described.

In particular, each of the wings 104*a*-104*b* of the first lifting surface 104 have at least one support strut 142*a*-142*d* mounted or connected along the trailing edge of the wing 104 and/or connected to a rear portion of the fuselage 102. In this example, there are four support struts 142*a*-142*d*, however, it is to be appreciated by the skilled person that any number of one or more support struts may be used to support the tilt mechanism(s) 144*a* and 144*b* and also corresponding engine modules and/or as the application demands. For example, support struts 142*a* and 142*d* may be optional, and so the tilt mechanisms 144*a* and 144*b* may be supported only by support struts 142*b* and 142*c*, respectively. In addition, the support struts 142*b* and 142*c* may be combined to form a single support strut for supporting tilt mechanisms 144*a* and 144*b* and corresponding engine modules 108*a*-108*d*.

Referring to the example of FIGS. 1*k*-1*n*, each support strut 142*a*-142*d* is configured for supporting first tilt mechanism(s) 144*a* and 144*b* to which engine modules 108*a*-108*d* are pivotally coupled/connected/mounted. The first tilt mechanism(s) 144*a*-144*b* are configured to control the pivoting of each of the engine modules 108*a*-108*d* so that they are pivotable about a tilting axis 107*a* that is substantially perpendicular to the longitudinal axis 103 of the fuselage 102. The first tilt mechanism(s) 144*a* and 144*b* may be configured to independently control or pivot each of the engine modules 108*a*-108*d* about the tilting axis 107*a*. Furthermore, the support struts 142*a*-142*d* may configured and mounted to the trailing edge of wings 104*a*-104*b* such that each of the corresponding engine modules 108*a*-108*d* have enough clearance from the trailing edge of the wings 104*a*-104*b* to enable the first tilt mechanism(s) 144*a*-144*b* to pivot each of the engine modules 108*a*-108*d* from at least a first pivot position corresponding to a vertical mode of flight of VTOL vehicle 130 to at least a second pivot position corresponding to a horizontal mode of flight of the VTOL vehicle 140. The additional support struts 142*a* and 142*d* may provide the advantages, for boxwing aircraft, of additional support and rigidity to the wings and also additional support and rigidity to the tilt mechanism 144*a*-144*b*.

As illustrated in FIGS. 1*k* to 1*n*, a first set of support struts 142*a*-142*b* are mounted to the trailing edge of wing 104*a* of the first lifting surface 104 in which a first support strut 142*a* is mounted to the trailing edge of wing 104*a* in the vicinity of wing-tip 112*a* and a second support strut 142*b* is mounted to the trailing edge of wing 104*a* in the vicinity of the end 112*c* of wing 104*a* that is secured to a portion 102*b* of the fuselage 102. A first tilting mechanism section 144*a* of the first tilting mechanism(s) 144*a*-144*b* is mounted or coupled to the first set of support struts 142*a*-142*b*. The tilting mechanism section 144*a* is configured to pivot the engine modules 108*a*-108*b* when required. The tilting mechanism section 144*a* may be configured to independently pivot each of the engine modules 108*a*-108*b* as the application demands. A second set of support struts 142*c*-142*d* are mounted to the trailing edge of wing 104*b* of the first lifting surface 104 in which a third support strut 142*d* is mounted to the trailing edge of wing 104*b* in the vicinity of wing-tip 112*b* and a fourth support strut 142*c* is mounted to the trailing edge of wing 104*b* in the vicinity of the end 112*d* of wing 104*b* that is secured to a portion 102*b* of the fuselage 102. A second tilting mechanism section 144*b* of the first tilting mechanism(s) 144*a*-144*b* is mounted or coupled to the second set of support struts 142*c*-142*d*. The second tilting mechanism section 144*b* is configured to pivot the engine modules 108*c*-108*d* when required. The second tilting mechanism section 144*b* may be configured to independently pivot each of the engine modules 108*c*-108*d* as the application demands.

The tilting mechanisms 144*a*-144*b* are configured to enable the engine modules 108*a*-108*d* to be coupled to the wings 104*a* and 104*b* and to be independently tiltable or pivotable around tilting axis 107*a*. Tilt mechanism 144*a* and 144*b* may form one piece or one tilt mechanism in which the tilt mechanism is configured to enable or control the corresponding engine modules 108*a*-108*d* to rotate or pivot independently about tilt axis 107*a*. As an option, the tilt mechanism 144*a* and 144*b* may attach to the fuselage 102 or to a rear region of the rear section 102*b* of the fuselage 102, and/or in the vicinity of the rear section 102*b* and trailing edge of wings 104*a* and 104*b*.

An example of the tilting mechanisms 144*a*-144*b* may include, by way of example only but is not limited to, a number of independently tiltable rods, one tiltable rod coupled to each engine module 108*a*-108*d*. Each tiltable rod may be configured to pivot or tilt the corresponding engine module around or about the tiltable axis 107*a*. For example, VTOL vehicle 140 is illustrated in FIGS. 1*k* to 1*n* as having, by way of example only but is not limited to, four engine modules 108*a*-108*d* connected to tilting mechanisms 144*a*-144*b* that are coupled to the wings 104*a* and 104*b* by struts 142*a*-142*d*. The tilting mechanisms 144*a*-144*b* may include an independently tiltable rod for each of the engine modules 108*a*-108*d*. The tilting rods may be coaxial, coaxially located or located next to each other. For example, the tilting mechanisms 144*a*-144*b* may include four independently tillable rods. The tilting mechanisms 144*a*-144*b* may include a first tiltable section 144*a* that is coupled to wing 104*a* by struts 142*a*-142*b* and a second tiltable section 144*b* that is coupled to wing 104*b* by struts 142*c*-142*d*. The first tiltable section 144*a* is associated with wing 104*a* and may include independent tiltable rods for each engine module 108*a*-108*b* associated with wing 104*a*. The second tiltable section 144*b* is associated with wing 104*b* and may include independent tiltable rods for each engine module 108*c*-108*d* associated with wing 104*b*. The tilting mechanism(s) 144*a*-144*b* are connected to the rear of wing 104 of the VTOL vehicle 140.

Furthermore, although each tilting rod has been described, by way of example only but is not limited to, corresponding to pivoting or being pivotally coupled to one engine module, it is to be appreciated by the skilled person that each tilting rod may include engine units (not shown) that include multiple engine modules connected together, in which the engine units are coupled to the tilting rod and pivotable around the tilting axis 107*a*. That is each tiltable rod may include a set of multiple engine modules coupled thereto, in which each set of engine modules is pivotable around the tilting axis 107*a* as the tilting rod rotates. Although the tilting mechanisms 144*a* and 144*b* are illustrated and described as being located or mechanically coupled to, by way of example only but is not limited to, struts 142*a*-142*d*, it is to be appreciated by the skilled person in the art that the tilting mechanisms 144*a* and 144*b* may be colocated with the trailing edges of the rear wings 104*a*-104*b*. Depending on the positioning of the colocation of the tilting mechanisms 144*a*-144*b* with the trailing edge of the rear wings 104*a*-104*b*, this may also include or require cut-outs for allowing engine modules 108*a*-108*d* to pivot about the tilting axis 107*a* from a first pivot position corresponding to a vertical mode of flight to a second pivot position corresponding to a horizontal model of flight.

In addition, as illustrated in FIGS. 1*k* to 1*n*, each of the wings 106*a*-106*b* of the second lifting surface 106 have at least one support strut 146*a*-146*d* mounted or connected along the leading edge of the wing 106 and/or fuselage 102. In this example, there are four support struts 146*a*-146*d*, however, it is to be appreciated by the skilled person that any number of one or more support struts may be used to support the tilt mechanism(s) 148*a* and 148*b* and also corresponding engine modules and/or as the application demands. For example, support struts 146*a* and 146*d* may be optional, and so the tilt mechanisms 148*a* and 148*b* may be supported only by support struts 146*b* and 146*c*, respectively. In addition or optionally, the support struts 146*b* and 146*c* may be further combined to form a single support strut for supporting tilt mechanisms 148*a* and 148*b* and corresponding engine modules 108*e*-108*h*.

Referring to the example of FIGS. 1*k*-1*n*, each support strut 146*a*-146*d* is configured for supporting second tilt mechanism(s) 148*a* and 148*b* to which engine modules 108*e*-108*h* are pivotally coupled/connected/mounted. The second tilt mechanism(s) 148*a*-148*b* are configured to control the pivoting of each of the engine modules 108*e*-108*h* so that they are pivotable about a tilting axis 107*b* that is substantially perpendicular to the longitudinal axis 103 of the fuselage 102. The second tilt mechanism(s) 148*a* and 148*b* may be configured to independently control or pivot each of the engine modules 108*e*-108*h* about the tilting axis 107*b*. Furthermore, the support struts 146*a*-146*d* may be configured and mounted to the leading edge of wings 106*a*-106*b* such that each of the corresponding engine modules 108*e*-108*h* have enough clearance from the leading edge of the wings 106*a*-106*b* to enable the second tilt mechanism(s) 148*a*-148*b* to pivot each of the engine modules 108*e*-108*h* from at least a first pivot position corresponding to a vertical mode of flight of VTOL vehicle 130 to at least a second pivot position corresponding to a horizontal mode of flight of the VTOL vehicle 140. The additional support struts 146*a* and 146*d* may provide the advantages, for boxwing aircraft, of additional support and rigidity to the wings 106*a* and 106*b* and also additional support and rigidity to the tilt mechanism 148*a*-148*b*.

As illustrated in FIGS. 1*k* to 1*n*, a third set of support struts 146*a*-146*b* are mounted to the leading edge of wing 106*a* of the second lifting surface 106 in which a first support strut 146*a* is mounted to the leading edge of wing 106*a* in the vicinity of wing-tip 114*a* and a second support strut 146*b* is mounted to the leading edge of wing 106*a* in the vicinity of the end 114*c* of wing 106*a* that is secured to a portion 102*a* of the fuselage 102. A first tilting mechanism section 148*a* of the second tilting mechanism(s) 148*a*-148*b* is mounted or coupled to the third set of support struts 146*a*-146*b*. The first tilting mechanism section 148*a* is configured to pivot the engine modules 108*e*-108*f* when required. The first tilting mechanism section 148*a* may be configured to independently pivot each of the engine modules 108*e*-108*f* as the application demands. A fourth set of support struts 146*c*-146*d* are mounted to the leading edge of wing 106*b* of the second lifting surface 106 in which a third support strut 146*d* is mounted to the leading edge of wing 106*b* in the vicinity of wing-tip 114*b* and a fourth support strut 146*c* is mounted to the leading edge of wing 106*b* in the vicinity of the end 114*d* of wing 104*b* that is secured to the portion 102*a* of the fuselage 102. A second tilting mechanism section 148*b* of the second tilting mechanism(s) 148*a*-148*b* is mounted or coupled to the fourth set of support struts 146*c*-146*d*. The second tilting mechanism section 148*b* is configured to pivot the engine modules 108*g*-108*h* when required. The second tilting mechanism section 148*b* may be configured to independently pivot each of the engine modules 108*g*-108*h* as the application demands.

As described for tilting mechanisms 144*a*-144*b*, the tilting mechanisms 148*a*-148*b* may be configured to enable the engine modules 108*e*-108*h* to be coupled to the wings 106*a* and 106*b* and to be independently tiltable or pivotable around tilting axis 107*b* as illustrated in FIGS. 1*l* and 1*m*. Tilt mechanism 148*a* and 148*b* may form one piece or one tilt mechanism in which the tilt mechanism is configured to enable or control the corresponding engine modules 108*e*-108*h* to rotate or pivot independently about tilt axis 107*b*. As an option, the tilt mechanism 148*a* and 148*b* may attach to the fuselage 102 or to a front region of the front section 102*a* of the fuselage 102, and/or in the vicinity of the front section 102*a* and leading edge of wings 106*a* and 106*b*.

An example of the tilting mechanisms 148*a*-148*b* may include, by way of example only but is not limited to, a number of independently tiltable rods, one tiltable rod coupled to each engine module 108*e*-108*h*. Each tiltable rod may be configured to pivot or tilt the corresponding engine module around or about the tiltable axis 107*b*. For example, VTOL vehicle 140 is illustrated in FIGS. 1*k* to 1*n* as having, by way of example only but is not limited to, four engine modules 108*e*-108*h* connected to tilting mechanisms 148*a*-148*b* that are coupled to the wings 106*a* and 106*b* by struts 146*a*-146*d*. The tilting mechanisms 148*a*-148*b* may include an independently tiltable rod for each of the engine modules 108*e*-108*h*. The tilting rods may be coaxial, coaxially located or located next to each other. For example, the tilting mechanisms 148*a*-148*b* may include four independently tillable rods. The tilting mechanisms 148*a*-148*b* may include a first tiltable section 148*a* that is coupled to wing 106*a* by struts 146*a*-146*b* and a second tiltable section 148*b* that is coupled to wing 106*b* by struts 146*c*-146*d*. The first tiltable section 148*a* is associated with wing 106*a* and may include independent tiltable rods for each engine module 108*e*-108*f* associated with wing 106*a*. The second tiltable section 148*b* is associated with wing 106*b* and may include independent tiltable rods for each engine module 108*g*-108*h* associated with wing 106*b*. The tilting mechanism(s) 148*a*-148*b* are connected to the front of wing 106 of the VTOL vehicle 140 via the struts 146*a*-146*d*. Alternatively or additionally, the tilting mechanisms 148*a*-148*b* may be connected via struts 146*a*-146*d* to a front region of the front section 102*a* of the fuselage 102 in the vicinity of the front of wing 106.

Furthermore, although each tilting rod of tilting mechanisms 148a-148b have been described, by way of example only but is not limited to, corresponding to pivoting or being pivotally coupled to one engine module, it is to be appreciated by the skilled person that each tilting rod may include engine units (not shown) that include multiple engine modules connected together, in which the engine units are coupled to the tilting rod and pivotable around the tilting axis 107b. That is each tiltable rod may include a set of multiple engine modules coupled thereto, in which each set of engine modules is pivotable around the tilting axis 107b as the tilting rod rotates. Although the tilting mechanisms 148a and 148b are illustrated and described as being located or mechanically coupled to, by way of example only but is not limited to, struts 146a-146d, it is to be appreciated by the skilled person in the art that the tilting mechanisms 148a and 148b may be colocated with the leading edges of the front wings 106a-106b. Depending on the positioning of the colocation of the tilting mechanisms 148a-148b with the leading edge of the front wings 106a-106b, this may also include or require cut-outs for allowing engine modules 108e-108h to pivot about the tilting axis 107b from a first pivot position corresponding to a vertical mode of flight to a second pivot position corresponding to a horizontal model of flight.

The VTOL vehicle 140 as described with respect to FIGS. 1k to 1n, modifications thereof, combinations thereof and/or as described herein may provide various advantages such as, by way of example only but is not limited to: ensuring the center of the aerodynamic lift forces of VTOL vehicle 140 can be colocated with or closely located to the lift forces generated by the engine modules 104a-104h (e.g. the rotors) when in a vertical mode of flight (e.g. in an upright position), and ensuring the overall center of gravity can be colocated with or located closely to the center of these lift forces. Further advantages or benefits of VTOL vehicle 140 may also include that the dimension of the wings 104a-106b can be equal for all the wings 104a-106b attached to the VTOL vehicle 140; as well the dimension of the engine modules 108a-108h (e.g. motors/rotors) may also be equal for all the wings 104a-106b. Furthermore, the wing structure 104 and 106 may be decoupled from the tiltable mechanism(s) 144a-144b, 148a-148b (e.g. motor support rods), which provides a more modular design and faster/easier construction and installation of VTOL vehicle 140. In addition, placing the engine modules 108a-108h (e.g. rotors) away from the wings 104a-106b may further reduce aerodynamic perturbances and can have a positive effect on the lift/drag ratio of VTOL vehicle 140.

Further modifications to the location and/or mounting of the engine modules 108a-108h of VTOL vehicles 100, 130 and/140 may include, by way of example only but is not limited to, instead of coupling and/or mounting the engine modules 108a-108h to the wings 104a-106b of the VTOL vehicle 100, 130, and/or 140, the one or more sets of the engine modules 108a-108h may be mounted and/or coupled fewer support struts and/or mounted and/or coupled to support struts connected to structural points or regions of the fuselage 102 of the VTOL vehicle 100, 130 and/or 140 such that the engine modules 108a-108d are pivotable around tiltable axis 107a and/or the engine modules 108e-108h are pivotable around a tiltable axis 107b, or independent tiltable axes and the like that are substantially perpendicular to the centre line 103 of the fuselage 102 and the like.

FIG. 10 is a schematic diagram illustrating a plan view of another example VTOL vehicle 150 based on the VTOL vehicle 140 of FIGS. 1k to 1n according to the invention. In this case, the VTOL vehicle 140 of FIGS. 1k to 1n has been modified to form VTOL vehicle 150 in which the number of support struts for supporting the tilt mechanisms 144a-144b and 148a-148b and corresponding engine modules 108a-108h have been reduced. In this example, only one support strut 152a and 152b is used for supporting the corresponding tilt mechanisms 144a and 144b, respectively. Each support strut 152a and 152b is connected to a rear portion 154a and 154b, respectively, of the rear section 102b of fuselage 102 and extends rearwardly or outwardly away from the rear of the fuselage. In this example, each of the struts 152a and 152b extends rearwardly in a direction substantially parallel to the center line 103 of the fuselage 102.

One end of the support strut 152a connects to a rear portion 154a of the fuselage 102 in the vicinity of where trailing edge of wing 104a of first lifting surface 104 connects with the fuselage 102 and the other distil end of the support strut 152a connects or is mechanically coupled with tilt mechanism 144a. Alternatively or additionally, the support strut 152a may connect to a rear portion 154a of wing 104a of first lifting surface 104 in the vicinity of where the trailing edge of wing 104a connects 112c with the fuselage 102. One end of the support strut 152b connects to a rear portion 154b of the fuselage 102 in the vicinity of where trailing edge of wing 104b of first lifting surface 104 connects 112d with the fuselage 102 and the other distil end of the support strut 152b connects or is mechanically coupled with tilt mechanism 144b. Alternatively or additionally, the support strut 152b may connect to a rear portion 154b of wing 104b of first lifting surface 104 in the vicinity of where the trailing edge of wing 104b connects 112b with the fuselage 102.

Tilt mechanism 144a couples and supports engine modules 108a-108b associated with wing 104a of first lifting surface 104. The engine modules 108a-108b are each independently pivotable about a tilt axis 107a, which is substantially perpendicular to the longitudinal axis 103 of the VTOL vehicle 150. Tilt mechanism 144b couples and supports engine modules 108c-108d associated with wing 104b of the first lifting surface 104. The engine modules 108c-108d are each independently pivotable about a tilt axis 107a, which is substantially perpendicular to the longitudinal axis 103 of the VTOL vehicle 150. Tilt mechanism 144a and 144b may form one piece or one tilt mechanism in which the tilt mechanism is configured to enable or control the corresponding engine modules 108a-108d to tilt, rotate or pivot independently about tilt axis 107a. The tilt mechanism 144a and 144b may attach to the fuselage 102 or to a rear region of the rear section 102b of the fuselage 102.

In addition, only one support strut 156a and 156b is used for supporting the corresponding tilt mechanisms 148a and 148b, respectively. Each support strut 156a and 156b is connected to a front portion 158a and 158b, respectively, of the front section 102c of fuselage 102 and extends forwardly or outwardly away from the front of the fuselage 102. In this example, each of the struts 156a and 156b extends forwardly in a direction substantially parallel to the center line 103 of the fuselage 102. One end of the support strut 156a connects to a front portion 158a of the fuselage 102 in the vicinity of where leading edge of wing 106a of second lifting surface 106 connects with the fuselage 102 and the other distil end of the support strut 156a connects or is mechanically coupled with tilt mechanism 148a. Alternatively or additionally, the support strut 156a may connect to a rear portion 158a of wing 106a of second lifting surface 106 in the vicinity of where the leading edge of wing 106a connects 114c with the fuselage 102. One end of the support strut 156*b* connects to a front portion 158*b* of the fuselage 102 in the vicinity of where leading edge of wing 106*b* of second lifting surface 106 connects 114*d* with the fuselage 102 and the other distil end of the support strut 156*b* connects or is mechanically coupled with tilt mechanism 148*b*. Alternatively or additionally, the support strut 156*b* may connect to a front portion 158*b* of wing 106*b* of second lifting surface 106 in the vicinity of where the leading edge of wing 106*b* connects 114*d* with the fuselage 102.

Tilt mechanism 148*a* couples and supports engine modules 108*e*-108*f* associated with wing 106*a* of second lifting surface 106. The engine modules 108*e*-108*f* are each independently pivotable about a tilt axis 107*b*, which is substantially perpendicular to the longitudinal axis 103 of the VTOL vehicle 150. Tilt mechanism 148*b* couples and supports engine modules 108*g*-108*h* associated with wing 106*b* of the second lifting surface 106. The engine modules 108*g*-108*h* are each independently pivotable about a tilt axis 107*b*, which is substantially perpendicular to the longitudinal axis 103 of the VTOL vehicle 150. Tilt mechanism 148*a* and 148*b* may also form one piece or one tilt mechanism in which the tilt mechanism is configured to enable or control the corresponding engine modules 108*e*-108*h* to rotate or pivot independently about tilt axis 107*b*. The tilt mechanism 148*a* and 148*b* may attach to the fuselage 102 or to a front region of the front section 102*a* of the fuselage 102.

Further modifications may be made to VTOL vehicle 150 in which the support struts 152*a* and 152*b* may be merged into a single rearward support strut for supporting tilt mechanisms 144*a* and 144*b*. In addition, the support struts 156*a* and 156*b* may be merged into a single forward support strut for supporting tilt mechanisms 148*a* and 148*b*. Although the tilt mechanisms 144*a* and 144*b* and tilt mechanisms 148*a* and 148*b* are illustrated, by way of example only but are not limited to, as being formed of one piece, connected or coupled together, it is to be appreciated by the skilled person that tilt mechanisms 144*a* and 144*b* may be separated, decoupled and/or not connected or coupled together, and also that tilt mechanisms 148*a* and 148*b* may be separated, decoupled and/or not connected or coupled together.

Figure 1O:
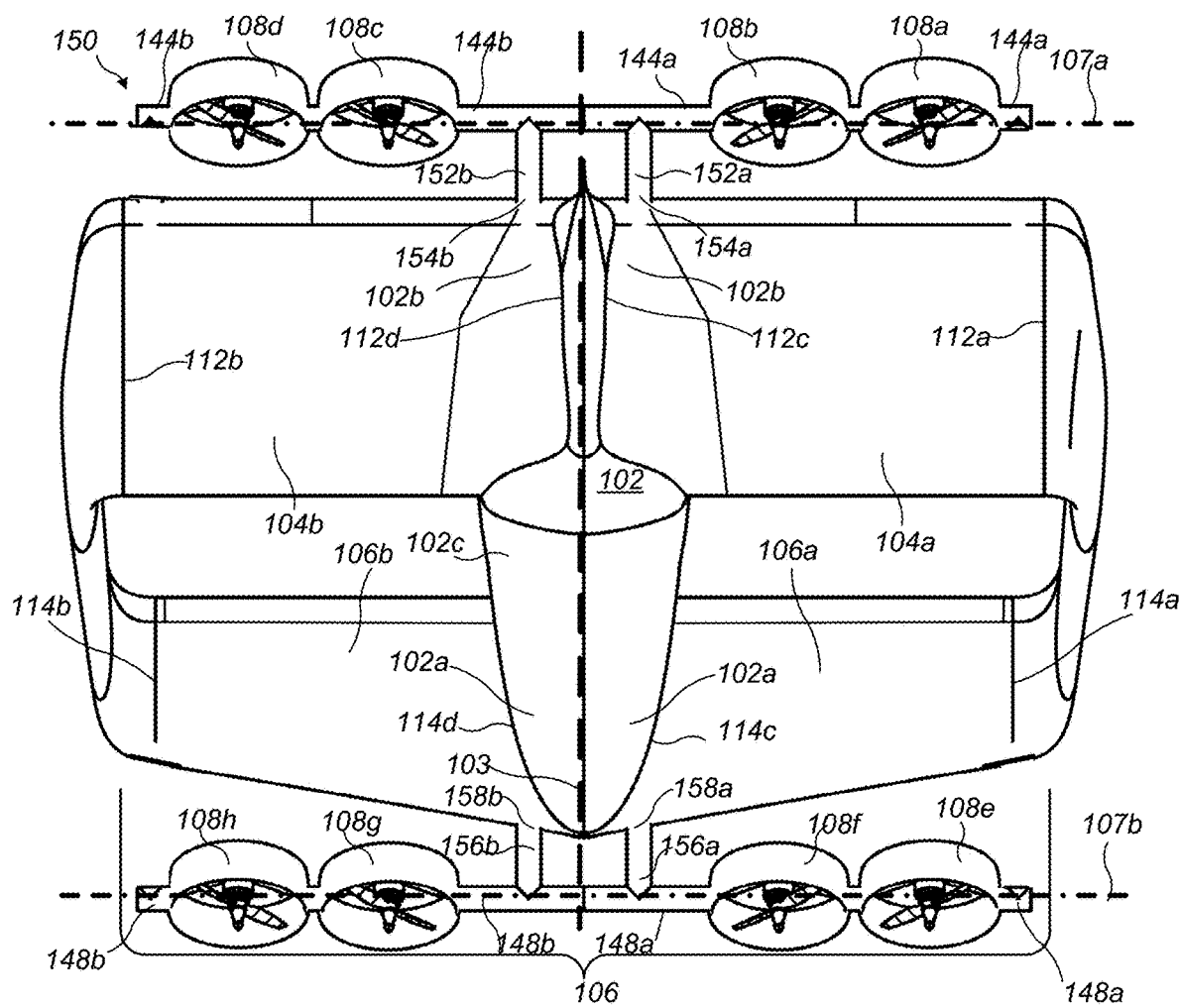
FIG. 1o is a schematic diagram illustrating a plan view of another example VTOL vehicle according to the invention.
Figure 1P:
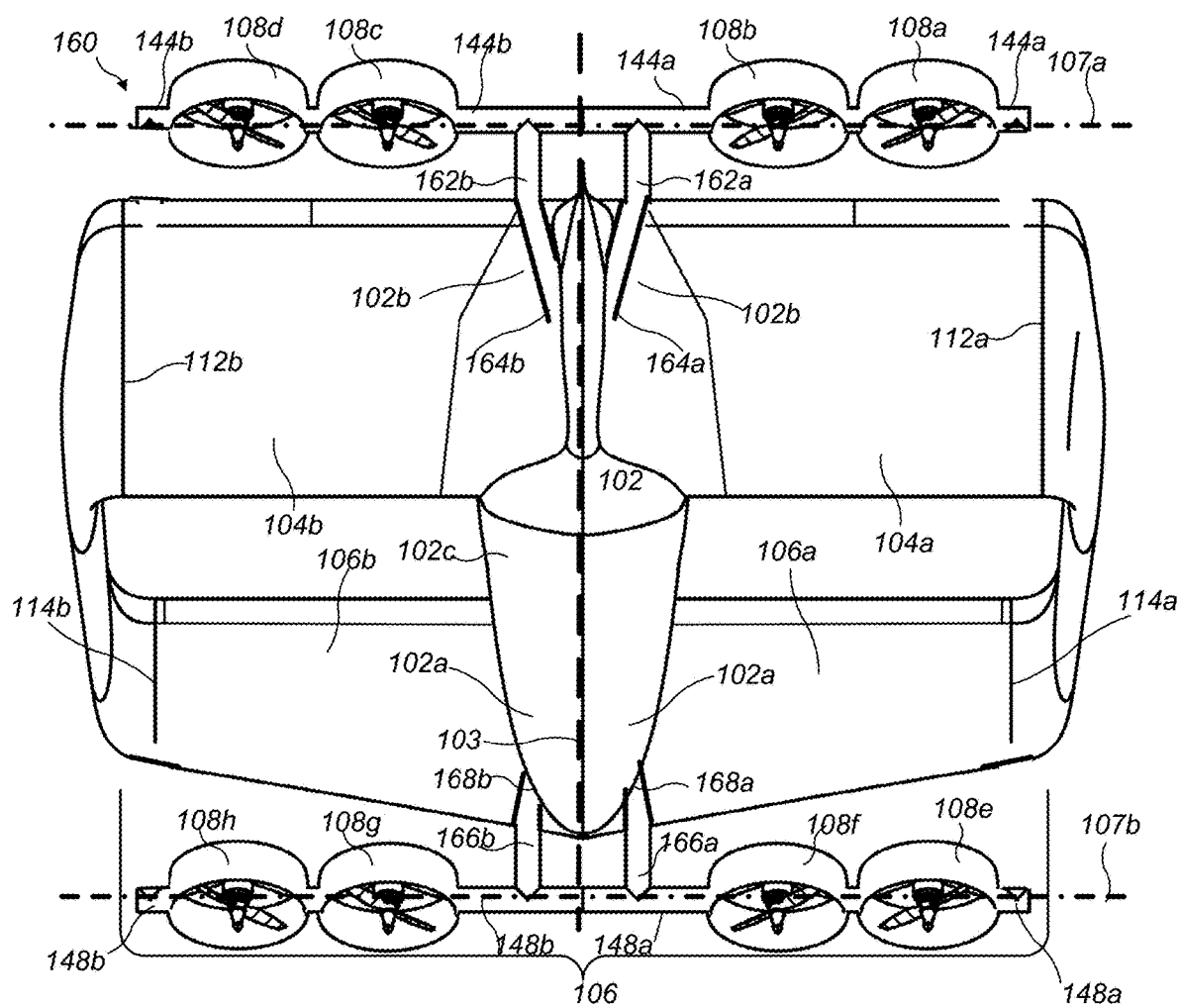
FIG. 1p is a schematic diagram illustrating a plan view of a further example VTOL vehicle according to the invention.

FIG. 1*p* is a schematic diagram illustrating a plan view of a further example VTOL vehicle 160 according to the invention and may be based on the VTOL vehicle 140 of FIGS. 1*k* to 1*n* according to the invention. In this case, the VTOL vehicle 140 of FIGS. 1*k* to 1*n* has been modified to form VTOL vehicle 160 in which the number of support struts for supporting the tilt mechanisms 144*a*-144*b* and 148*a*-148*b* and corresponding engine modules 108*a*-108*h* have been reduced and are shown to be connected or mounted to the fuselage 102 of VTOL vehicle 160. The VTOL vehicle 160 includes a fuselage 102 having longitudinally a front section 102*a*, a central section 102*c* and a rear section 102*b*. The VTOL vehicle 160 also has a central longitudinal axis 103 about which forms: a first lifting surface 104, which includes two wings 104*a* and 104*b* respectively secured to opposite sides of the rear section 102*b* of the fuselage 102; and a second lifting surface 106 comprising two wings 106*a* and 106*b* respectively secured to opposite sides of the front section 102*a* of the fuselage 102. At least one first set of support struts 162*a* and 162*b* are coupled and mounted to a rear portion 164*a* and 164*b* of the rear section 102*b* for supporting a first set of engine modules 108*a*-108*d*. At least one second set of support struts 166*a* and 166*b* are coupled and mounted to a front portion 168*a* and 168*b*, respectively, of the front section 102*a* of fuselage 102 for supporting a second set of engine modules 108*e*-108*h*. Each of the engine modules 108*a*-108*h* of the sets of engine modules are pivotally coupled to the corresponding support struts 162*a*-162*b*, 166*a*-166*b* and each of the engine modules 108*a*-108*h* being independently controlled for transitioning between a vertical mode of flight and a horizontal mode of flight.

The first set of engine modules 108*a*-108*d* includes one or more engine modules 108*a*-108*b* associated with the first wing 104*a* of the first lifting surface 104, in which these engine modules 108*a*-108*b* are pivotable about tilting axis 107*a* using tilt mechanism 144*a*. The first set of engine modules 108*a*-108*d* includes one or more engine modules 108*c*-108*d* associated with a second wing 104*b* of the first lifting surface 104, in which these engine modules 108*c*-108*d* are pivotable about tilting axis 107*a* using tilt mechanism 144*b*. The second set of engine modules 108*e*-108*h* includes one or more engine modules 108*e*-108*f* associated with a first wing 106*a* of the second lifting surface 106, in which these engine modules 108*e*-108*f* are pivotable about tilting axis 107*b* using tilt mechanism 148*b*. The second set of engine modules 108*e*-108*h* includes one or more engine modules 108*g*-108*h* associated with a second wing 106*b* of the second lifting surface 106, in which these engine modules 108*e*-108*f* are pivotable about tilting axis 107*b* using tilt mechanism 148*b*. Each of the engine modules 108*e*-108*h* includes a plurality of rotors about a centre axis of the engine module, where the centre axis is substantially perpendicular to the corresponding tilting axis 107*a* or 107*b* of that engine module.

The at least one set of first support struts 162*a*-162*b* are connected and mounted to the rear portions 164*a*-164*b* of the fuselage 103 for supporting tilt mechanisms 144*a* and 144*b*, respectively, that are mechanically coupled to the first set of engine modules 108*a*-108*d* and enable the first set of engine modules 108*a*-108*d* to be independently pivotable about a tilting axis 107*a* substantially perpendicular to the longitudinal axis 103 of the fuselage 102. The at least one second set of support struts 166*a*-166*b* are connected and mounted to the front portions 168*a*-168*b* of the fuselage 102 for supporting tilt mechanisms 148*a*-148*b*, respectively, that are mechanically coupled to the second set of engine modules 108*e*-108*h* and enable the one or more engine modules 108*e*-108*h* to be independently pivotable about a tilting axis 107*b* substantially perpendicular to the longitudinal axis 103 of the fuselage 102.

Further modifications to the location and/or mounting of the engine modules 108*a*-108*h* of VTOL vehicles 100, 130, 140, 150 and/or 160 may include, by way of example only but is not limited to, instead of coupling and/or mounting the engine modules 108*a*108*h* to the wings 104*a*-106*b* of the VTOL vehicle 100, 130, 140, 150 and/or 160, coupling or mounting one or more sets of the engine modules 108*a*-108*h* to support struts connected to the fuselage 102 of the VTOL vehicle 100, 130, 140, 150 and/or 160 such that the engine modules 108*a*-108*d* are pivotable around tiltable axis 107*a* and/or the engine modules 108*e*-108*h* are pivotable around a tiltable axis 107*b*, or independent tiltable axes and the like that are substantially perpendicular to the centre line 103 of the fuselage 102 and the like. For example, a pair of engine modules 108*a*-108*b* may be pivotally coupled to one or more support struts extending outwardly from rear fuselage 102*b* to the side of the fuselage 102*b* onto which wing 104*a* is connected, and a portion of the strut forming a tiltable axis 107*a* about which the engine modules 108*a*-108*b* may be pivoted. The pair of engine modules 108*a*-108*b* may be independently pivotable about a tilting axis 107*a*. Another pair of engine modules 108*c*-108*d* may be pivotally coupled to one or more support struts extending outwardly from rear fuselage 102b to the side of the fuselage 102b onto which wing 104b is connected, and a portion of these struts lying in the tiltable axis 107a about which the engine modules 108c-108d may be pivoted. The pair of engine modules 108c-108d may be independently pivotable about the tilting axis 107a. Similarly, a pair of engine modules 108e-108f may be pivotally coupled to another one or more support struts extending outwardly from front fuselage 102a to the side of the fuselage 102a onto which wing 106a is connected, and a portion of these struts lying in the tiltable axis 107b about which the engine modules 108e-108f may be pivoted. The pair of engine modules 108e-108f may be independently pivotable about the tilting axis 107b. Another pair of engine modules 108g-108h may be pivotally coupled to one or more support struts extending outwardly from front fuselage 102a to the side of the fuselage 102a onto which wing 106b is connected, and a portion of these struts lying in the tiltable axis 107b about which the engine modules 108e-108f may be pivoted. The pair of engine modules 108g-108h may be independently pivotable about the tilting axis 107b.

Although several configurations for the placement and/or locations of engine modules 108a-108h have been described, by way of example only but not limited to, with respect to VTOL vehicles 100, 130, 140, 150 and 160 it is to be appreciated by the skilled person that various modifications and/or combinations of the above-mentioned engine module positioning/locations may be made as the application demands. For example, the VTOL vehicle 100, 130, 140, 150, or 160 may be further modified or configured in which each of the wings 104a-104b of the first lifting surface 104 may have cut-outs 110a-110d along the trailing edge of the wings 104a-104b, in which each cut-out 110a-110d is configured for receiving an engine module 108a-108d pivotable about a tilting axis 107a substantially perpendicular to the longitudinal axis 103 of the fuselage 102. Each of the wings 106a-106b of the second lifting surface 106 may have at least one support strut 146a-146d along the leading edge of the wing 106a-106b, each support strut 146a-146d for supporting tilt mechanism(s) 148a-148b, which are configured for coupling and/or receiving an engine module 108e-108h such that the engine module 108e-108h is pivotable about a tilting axis 107b substantially perpendicular to the longitudinal axis 103 of the fuselage 102.

In another example, one or more of the VTOL vehicles 100, 130, 140, 150 or 160 may be further modified or configured in which each of the wings 106a-106b of the second lifting surface 106 have cut-outs 110e-110h along the leading edge of the wing 106a or 106b, in which each cut-out 110e-110h is configured for receiving an engine module 108e-108h that is pivotable about a tilting axis 107b substantially perpendicular to the longitudinal axis 103 of the fuselage 102. Each of the wings 104a-104b of the first lifting surface 104 may have at least one support strut 142a-142d coupled to or along the trailing edge of the wing 104a or 104b, in which each support strut 142a-142b is configured for supporting and/coupling tilt mechanism(s) 144a-144b that are configured for mounting/coupling and/or receiving one or more engine modules 108a-108d to be pivotable about a tilting axis 107a substantially perpendicular to the longitudinal axis 103 of the fuselage 102.

Although the tilting mechanisms 144a-144b of wings 104a-104b of the first lifting surface 104 and tilting mechanisms 148a-148b of wings 106a-106b of the second lifting surface 106 have been described as using tilting rods or coaxially colocated tilting rods and the like, it is to be appreciated by the skilled person that the tilting mechanisms 144a-144b and/or 148a-148b may be any mechanism or component(s) that are designed and/or configured to couple the engine modules 108a-108h to corresponding struts 142a-146d whilst also enabling controlled pivoting and/or tilting of the engine modules 108a-108h, preferably independently.

For simplicity, further features of the example VTOL vehicle 100 are now described, by way of example only but is not limited to, with reference to FIGS. 1a-1f, it is to be appreciated by the skilled person that these further features of the VTOL vehicle 100 may be applied or used with the VTOL vehicles 130, 140, 150 and/or 160 of FIGS. 1g to 1p as the application demands. As shown in FIGS. 1a-1f, the example VTOL vehicle 100 is shown in which each of the wings 104a-104b and 106a-106b of the first and second lifting surface 104 and 106, respectively, have an end-tip 112a-112b or 114a-114b that is distal from the ends of the wings 104a-104b and 106a-106b that are secured or connected to the fuselage 102. The VTOL vehicle 100 is shown in these figures as, by way of example only but is not limited to, including a first stabiliser (or pylon) 116a that connects an end-tip 112a of a first wing 104a of the first lifting surface 104 that is secured to a first side of the fuselage 102 with the end-tip 114a of a first wing 106a of the second lifting surface 106 that is secured to the first side of the fuselage 102. In addition, the example VTOL vehicle 100 is illustrated as including a second stabiliser 116b (or pylon) that connects the end-tip 112b of a second wing 104b of the first lifting surface 104 that is secured to a second side of the fuselage 102 opposite the first side with the end-tip 114b of a second wing 106b of the second lifting surface 106 secured to the second side of the fuselage 102. The stabilisers 116a-116b provide the advantages of increasing the structural stability or integrity, as well as, flight stability to the VTOL vehicle 100.

For simplicity, further features of the example VTOL vehicle 100 is now described, by way of example only but is not limited to, with reference to FIGS. 1c-1e, it is to be appreciated by the skilled person that these further features of the VTOL vehicle 100 may be applied or used with the VTOL vehicles 130, 140, 150 and/or 160 of FIGS. 1g to 1p as the application demands. As illustrated in FIGS. 1c and 1e, the first and second lifting surfaces 104 and 106 are positioned or secured to the fuselage 102 of the VTOL vehicle 100 in a staggered spaced apart configuration. The first lifting surface 104 is positioned and secured to an uppermost portion of the rear portion 102b of the fuselage 102, whereas the second lifting surface is positioned and secured to a lower most portion of the front portion 102a of the fuselage 102. Thus, when the VTOL vehicle 100 is viewed from arrow 100B or arrow 100D in FIG. 1a and illustrated in FIGS. 1c and 1 e, the first lifting surface 104 is staggered or spaced apart from the second lifting surface 106 by a height between the base portion 102d of the fuselage 102 and the uppermost portion of the rear portion 102b of the fuselage 102. As can be seen, this staggered spaced apart configuration comprises the first lifting surface 104 being secured to an upper portion of the rear portion 102b of the fuselage 102 and the second lifting surface 106 being secured to a lower portion of the front portion 102a of the fuselage 102.

As illustrated in FIGS. 1c and 1 e, the first lifting surface 104 has a wing span that is substantially similar to the wing span of the second lifting surface 106. Typically, the first lifting surface 104 has a wing span that is larger than the wing span of the second lifting surface 106. When the VTOL vehicle 100 is viewed from the rear or from the front in the direction of arrow 100B or 100D of FIG. 1a (e.g. along the longitudinal axis 103 of the fuselage 102), the first lifting surface 104, second lifting surface 106, first stabiliser 116a, and second stabiliser 116b form substantially, by way of example only but is not limited to, a trapezoidal and/or rectangular form/shape. In this example, when the VTOL vehicle 100 is viewed from the rear (rear form) or from the front (frontal form) in the direction of arrow 100B or 100D of FIG. 1a, the outline or perimeter of the first and second lifting surfaces 104 and 106 and first and second stabilisers 116a and 116b form substantially, by way of example only but is not limited to, a trapezoidal form/shape, where the first lifting surface 104 has a slightly longer wing span than the second lifting surface 106. Although the frontal form or rear form of the outline or perimeter of the first and second lifting surfaces 104 and 106 and first and second stabilisers 116a and 116b are described, by way of example only but are not limited to, a trapezoidal form/shape, it is to be appreciated by the skilled person that the frontal form or rear form of the first and second lifting surfaces 104 and 106 and first and second stabilisers 116a and 116b are not so limited and that the frontal and/or rear form of the outline of the first and second lifting surfaces 104 and 106 and first and second stabilisers 116a and 116b may take on any shape, form such as, by way of example only but not limited to, any polygonal shape/outline, rectangular shape or outline, trapezoidal shape or outline, or any other curved shape outline or form as the application demands.

In this example as illustrated in FIGS. 1a-1f, the wings 104a-104b of the first lifting surface 104 and the wings 106a-106b of the second lifting surface 106 of the VTOL vehicle 100 are based on a box configuration, where the wings 104a-104b of the first lifting surface 104. In particular, when viewed from arrows 100B and 100D of FIGS. 1a, 1c and 1f, the two wings 106a-106b of the second lifting surface 106 that are secured to the front portion 102a of the fuselage and the two wings 104a-104b of the first lifting surface 104 secured to the rear portion 102b of the fuselage 102 have a so-called staggered "doppeldecker configuration" (or bi-plane configuration). When viewed from arrows 100B and 100D, the frontal wings 106a-106b are located beneath the rear wings 104a-104b in which the pair of wings 104a and 106a connected together via the stabilizer or pylon 116a and the pair of wings 106b and 104b are connected together via the stabilizer or pylon 116b.

Although the pair of wings 104a and 106a are connected from their distal end wing tips 112a and 114a by stabilizer 116a and the pair of wings 104b and 106b are connected from their distal end wing tips 112b and 114b by stabilizer 116b, this is by way of example only, and it is to be appreciated by the skilled person that the stabilizer 116a and 116b may be located or positioned along the span of the corresponding wings 104a-106b of the lifting surfaces 104 and 106 at any other advantageous position as the application demands.

Similarly, although each pair of wings 104a and 106a is connected by stabilizer 116a and each pair of wings 104b and 106b is connected by stabiliser 116b, this is by way of example only, it is to be appreciated by the skilled person that each pair of wings 104a and 106a and 104b and 106b may be connected by one or more further stabilizers positioned along the span of the corresponding pair of wings 104a and 106a and the corresponding pair of wings 104b and 106b as the application demands.

The VTOL vehicle 100 is illustrated in FIGS. 1a-1f as having an fin or vertical stabiliser 120 positioned in substantially in parallel and along the longitudinal axis 103 of the fuselage 102. The vertical stabiliser 120 may provide further directional or yaw stability to the VTOL vehicle 100 when operating in the horizontal mode of flight. The VTOL vehicle 100 may further include additional fins/stabilizers extending outwardly and positioned substantially parallel to and along the longitudinal axis 103 of the fuselage 102. For example, positioned either on top of the fuselage 102, on one or more sides of the fuselage 102, and/or base 102d of the fuselage, and/or extending outwardly from other places or locations of the VTOL vehicle 100 such as the lifting surfaces 104 and 106 or as the application demands.

The VTOL vehicle 100 is illustrated in FIGS. 1a and 1c-1f to further include a set of landing gear 118a-118d. Each of the landing gear 118a-118d may be, by way of example only but not limited to, static landing gear; retractable landing gear; wheeled landing gear to enable motion of VTOL vehicle 100 along the ground; floating landing gear for operation of the VTOL vehicle 100 on water; or one or more combinations thereof. The landing gear may be aerodynamically shaped to reduce air friction/drag when the VTOL vehicle 100 is in the horizontal model of flight. In this example, the VTOL vehicle 100 includes four landing gear 118a-118d. Two landing gear 118a and 118b extend outwardly from, and substantially perpendicular to, a plane surface intersecting the base of the end tips 114a and 114b of the corresponding wings 106a and 106b of the second lifting surface 106. Another two landing gear 118c and 118d extend outwardly from the rear portion 102b of the fuselage base 102d, towards the rear aft section 102e of the fuselage 102, and substantially perpendicular to the plane surface intersecting the base of the end tips 114a and 114b.

In the present example VTOL vehicle 100, each of the landing gear 118a-118d is a static landing gear that includes a landing strut attached to a corresponding one of a set of shaped aerofoils 119a-119d or aerodynamic portions as illustrated in FIGS. 1d and 1f. The shaped aerofoils 119a-119d are dimensioned for attachment to the base of each of the landing gear 118a-118d. The shaped aerofoils 119a-119d may assist in reducing the drag of the landing gear 118a-118d and also provide an additional lifting force for assisting the stability and efficient horizontal flight mode of the VTOL vehicle 100. Although this example describes the four landing gear 118a-118d as being, by way of example only but is not limited to, static landing gear 118a-118d (e.g. four struts), it is to be appreciated by the skilled person that any number of landing gear may be used and positioned/located to the VTOL vehicle 100 to enable the VTOL vehicle 100 to have a stable resting position when on the ground, or when not in use, but also to ensure efficient, safe and stable VTOL operation as the application demands.

The structure of the VTOL vehicle 100 may be manufactured based on a monocoque construction techniques and/or semi-monocoque construction techniques. Monocoque construction techniques involve constructing the VTOL vehicle 100 in which the external skin (e.g. a surface or exo-skeleton design of the VTOL vehicle 100) of the VTOL vehicle 100 forms a structural system where most if not all the loads are supported through an the VTOL vehicle's external skin or surface rather than having a load bearing frame to support the structure of the VTOL vehicle 100. Thus, both tensile and compressive forces are carried within the external skin of the VTOL vehicle 100. For example, the airframe and wings of the VTOL vehicle 100 may constitute a so-called monocoque design, such as an exoskeleton design where the entire body of the VTOL vehicle 100 can be made from one part or several smaller parts. The VTOL vehicle may be made from lightweight compound materials. Thus, at least the fuselage and/or the lifting surfaces 104 and 106 of the VTOL vehicle 100 may be based on a monocoque construction. In some examples, the whole VTOL vehicle 100 may be based on a monocoque construction. In other examples, the main parts of the VTOL vehicle 100 are each based on a monocoque construction, e.g. fuselage, wings and stabilisers, and are subsequently fitted and secured together using various suitable manufacturing and/or fixing techniques. The mechanical stability of the monocoque construction of the VTOL vehicle 100 and/or parts of the VTOL vehicle 100 can be further enhanced using a metal or other material based geometric structure such as honeycomb, embedded under the surfaces or skin of the VTOL vehicle 100. The electrical safety of the VTOL vehicle 100 may be achieved through a Faraday cage metal wire mesh being embedded in the skin of the VTOL vehicle 100 during monocoque construction. The VTOL vehicle 100 may be further constructed based on 3D printing techniques.

The VTOL vehicle 100 may be constructed to any scale and supplied or mounted with appropriately scaled engine modules 108a-108h as the application demands. For example, the VTOL vehicle 100 may be configured to be an autonomous small parcel/package delivery VTOL vehicle in which small packages or spare parts up to, by way of example only but is not limited to, 1 kg, 10 kg, 50 kg or any weighted payload there between. The VTOL vehicle 100 may be designed and configured to be an autonomous medium to large parcel/package delivery VTOL vehicle in which medium to large packages or spare parts up to, by way of example only but is not limited to, 50 kg, 100 kg, 250 kg or any weighted payload there between. Alternatively or additionally, the VTOL vehicle 100 may be designed and configured to be an autonomous or semi-autonomous air taxi service or personnel carrier for carrying one or more passengers and luggage/cargo from a first location to a second location. The VTOL vehicle 100 may be further designed and configured as an autonomous, semi-autonomous and/or manually piloted VTOL vehicle for carrying a plurality of passengers. Although several applications of the VTOL vehicle 100 have been described, this is by way of example only and the invention is not so limited, the skilled person would appreciate that the VTOL vehicle 100 may be designed to a certain and configured accordingly for any other application, operation, and/or as the application demands.

The VTOL vehicle 100 may be constructed to include a cargo or payload compartment(s) that may be accessible through at least one door or hatch, which may be located, by way of example only but is not limited to, the aft rear portion 102e of the fuselage 102, the side portions of the fuselage 102, and/or upper portions of the fuselage 102; or any other position that allows easy access or ingress/egress of cargo or payload through the door or hatch. A VTOL vehicle 100 may be constructed as a passenger version that may have at least one door for ingress/egress of passengers, and having passenger seats/supports or multiple seats/supports that may be accessible through said at least one door, which may be located, by way of example only but is not limited to, the aft rear portion 102e of the fuselage 102, the side portions of the fuselage 102, and/or upper portions of the fuselage 102; or any other position that allows easy access or ingress/egress of passengers, cargo and/or payload through the at least one door or hatch.

In addition, the VTOL vehicle 100 may be constructed to be equipped with emergency breakdown and/or crash systems. For example, the VTOL vehicle 100 may be fitted with a parachute system in which a parachute may be deployed during emergency situations to slow down the descent velocity and reduce any ground impact. Further emergency systems may include, by way of example only but are not limited to, impact reducing mechanisms such as airbags, seated airbags and the like.

Although the components, mechanisms and/or features of the example VTOL vehicle 100 have been described, by way of example only but is not limited to, with reference to FIGS. 1a-1f, it is to be appreciated by the skilled person that the features, mechanisms and/or components as described for the VTOL vehicle 100 may be applicable, applied and/or used with the VTOL vehicles 130, 140, 150 and/or 160 of FIGS. 1g to 1p as the application demands.

FIG. 2a is a schematic diagram illustrating a front perspective view 200 of an engine module 108b for use with the example VTOL vehicles 100, 130 and 140 of FIGS. 1a, 1g, and/1k as viewed from arrow 1008. Although reference is made to VTOL vehicle 100 of FIGS. 1a-1f, this is for simplicity and by way of example only and the invention is not so limited, it is to be appreciated by the skilled person that the configuration of the engine module 108b of FIG. 2a is also applicable to, and/or modifiable for use with VTOL vehicles 130, 140, 150 and/or 160, combinations thereof, modifications thereto and the like and/or as the application demands. The engine module 108b includes at least one rotor comprising at least two rotor blades 202a and 202b radially coupled to a drive shaft 204 which forms a centre axis of the engine module 108b. The drive shaft 204 is driven, by way of example only but is not limited to, an electric motor 206, which, when in operation, rotates the drive shaft 204 and rotor blades 202a and 202b about the centre axis. The engine module 108b further includes support struts 208a-208d extending radially from the electric motor to support an annular shroud 210, which is held in place around the centre axis. The rotor blades 202a and 202b may be shrouded for noise ablation and/or to achieve better rotor performance.

The support struts 208a-208d centrally locate the electric motor 206, drive shaft 204 and hence centre axis within the centre of the shroud 210. The longitudinal axis of the shroud 210 is parallel to the centre axis of the drive shaft. The rotors can rotate, when the electric motor 206 is in operation, around the centre axis to provide a thrust substantially parallel to the centre axis. When in operation, the rotating rotor blades 202a and 202b are configured to "suck" or pull air into the annulus of the annular shroud 210 in which the air flows past the rotating rotor blades 202a and 202b and support struts 208a-208d and provides thrust substantially parallel to the centre axis. The engine module 108b further includes at least one tilting mechanism 212a located on a first position 214a on the annular shroud 210, which is configured to pivot or tilt the engine module 108b around a tilting axis 107. The tilting axis 107 is perpendicular to the centre axis and passes through both the first position 214a and the centre axis of the drive shaft 204 through to a second position 214b on the annular shroud that is diametrically opposite the first position 214a. The engine module 108b may optionally include a second tilting mechanism 212b that is further configured to assist the tilting mechanism 212a to pivot or tilt the engine module 108b around the tilting axis 107. The tilt mechanism(s) 212a and/or 212b are electrically driven through actuators (not shown) for pivoting the engine module 108b around the tilting axis 107 to a desired pivot or tilt position. The remaining engine modules 108a, 108c-108h of the VTOL vehicle 100 may be of the same or similar design and may operate similarly.

As another example engine module 108b, the engine module 108b of FIG. 2a may be further modified in which the shroud 210 may form a gimbal arrangement in which the shroud 210 forms an outer gimbal that is pivotally coupled or connected to an inner gimbal of a set of inner gimbals by pivot couplings, in which each inner gimbal has a pivot or tilt axis that is different to each other and different to the pivot or tilt axis 107 of the shroud 210. Although reference is made to VTOL vehicle 100 of FIGS. 1a-1f, this is for simplicity and by way of example only and the invention is not so limited, it is to be appreciated by the skilled person that the configuration of the engine module 108b of FIG. 2a is also applicable to, and/or modifiable for use with VTOL vehicles 130, 140, 150 and/or 160, combinations thereof, modifications thereto and the like and/or as the application demands. The set of inner gimbals may comprise one or more inner gimbals. The pivot or tilt axes of each inner gimbal and the shroud 210 are orthogonal, i.e. perpendicular to each other, and intersect the center axis of the engine module 108b. At least one of the pivot couplings of each inner gimbal may include a tilt mechanism to controllably tilt that gimbal about its tilt axis. The engine module 108b may be fixed to the innermost gimbal. This gimbaled arrangement allows the engine module 108b to have a greater number of degrees of freedom for directing thrust and thus the VTOL vehicle 100 with a suitable programmed flight control system for controlling the gimbaled engine modules may achieve a greater degree of manoeuvrability in vertical mode of flight and/or in the horizontal mode of flight. The remaining engine modules 108a, 108c-108h of the VTOL vehicle 100 may be of the same or similar design and may operate similarly. Although this greater degree of manoeuvrability may be at a cost of additional weight of the tilting mechanisms and additional gimbals allowing the engine module 108b the greater degree of freedom, it is to be appreciated by the skilled person that the VTOL vehicle may include, by way of example only but is not limited to, a set of gimbaled engine modules with multiple tilt axes and a set of tiltable engine modules each with their own single tilt axis 107 or as the application demands.

FIG. 2b is a schematic diagram illustrating a plan view 220 of engine module 108b of the example VTOL vehicle 100 of FIG. 1a as viewed from arrow 100A. The engine module 108b is mounted to a portion of the first wing 104a of the first lifting surface 104. The other engine modules 108a, 108c-108h are mounted on the wings 104a-106b of the first and second lifting surfaces 104 and 106 in a similar manner as engine module 108b.

The engine module 108b is mounted in the vicinity of the trailing edge 224 of wing 104a. The engine module 108b is mounted on wing 104a and oriented such that the tilting axis 107 of the engine module 108b is substantially perpendicular to a wing chord line 222 that passes through the centre axis of the drive shaft 204 of the engine module 108b. The tilt axis 107 for the engine module 108b may be perpendicular to the longitudinal axis 103 of the fuselage 102 and/or a wing chord line 222. The tilting axis 107 of the engine module 108b may be substantially perpendicular to the longitudinal axis 103 of the fuselage 102. The actuators of the tilt mechanism(s) (not shown) may be configured to electrically rotate the engine module 108b around the tilt axis 107 and to tilt or pivot engine module 108b as desired.

Thus, when the VTOL vehicle 100 is in a horizontal mode of flight, the engine module 108b will be pivoted to a pivot position such that the airflow over the wing 104a is substantially in the direction of thrust output from engine module 108b. When the VTOL vehicle 100 is in a vertical mode of flight, the engine module 108b will be pivoted to a pivot position such that the thrust output by the engine module 108b is substantially perpendicular to the wing chord line 222 of the wing chord that is in line with the centre axis of the engine module 108b. The tilt mechanism(s) of engine module 108b may pivot the engine module 108b around the tilt axis 107 of engine module 108b from a vertical mode of flight, transition between the vertical mode of flight and the horizontal mode of flight, and to a horizontal mode of flight, and vice versa.

Similarly, each of the engine modules 108a, 108c-108h of wings 104a-106b may be mounted on wings 104a-106b and coupled to one or more tilt mechanisms (not shown). Each tilt mechanism may be configured to independently pivot each of the engine modules 108a-108h around the corresponding tilting axis 107 of each of the engine modules 108a-108h. The engine modules 108a-108h may be independently controlled to allow the VTOL vehicle 100 to enter a vertical mode of flight, transition between the vertical mode of flight and the horizontal mode of flight, and to enter the horizontal mode of flight, and vice versa.

FIG. 2c is a schematic diagram illustrating side plan view cross section 230 of wing 104a with pivotally mounted engine module 108b of the example VTOL vehicle 100 of FIG. 1a as viewed from arrow 100F. Although reference is made to VTOL vehicle 100 of FIGS. 1a-1f, this is for simplicity and by way of example only and the invention is not so limited, it is to be appreciated by the skilled person that the configuration of the engine module 108b and/or wing 104a of FIG. 2a is also applicable to, and/or modifiable for use with trailing and/or leading edges of the wings 104a-104b and/or 106a-106b of VTOL vehicles 130, 140, 150 and/or 160, combinations thereof, modifications thereto and the like and/or as the application demands. In the side plan view of FIG. 2c, the tilting axis 107 of the engine module 108b is perpendicular to the page surface of FIG. 2c and hence is represented by a dot. A pivot axis 232a for the engine module 108b may be defined to be perpendicular to the tilting axis 107 and intersects the tilting axis 107 and the centre axis 234 of the engine module 108b. The pivot axis 232a is illustrated in FIG. 2c as being in a first pivot position A, which makes an acute angle of approximately 45 degrees to the wing chord line 222 (or the pivot axis 232a at a third pivot position C) such that the thrust output by the engine module 108b is substantially in the direction of the centre axis 234, which is output in the direction of an acute angle of approximately −45 degrees between the centre axis 234 and the wing chord line 222. The tilting mechanism may pivot or rotate the pivot axis 232a of the engine module 108b from the first pivot position A by an angle of approximately 45 degrees anti-clockwise about the tilting axis 107 of the engine module 108b to a second pivot position B. The second pivot position B may correspond substantially to a horizontal mode of flight, where the pivot axis 232a of the engine module 108b has been pivoted such that the airflow over the wing 104a is substantially in the direction of thrust output from engine module 108b. The tilting mechanism may pivot or rotate the pivot axis 232a of the engine module 108b from the second pivot position B by an angle of 90 degrees clockwise about the tilting axis 107 of the engine module 108b to the third pivot position C. The third pivot position C may correspond substantially to a vertical mode of flight where the pivot axis 232a of the engine module 108b has been pivoted such that the thrust output by the engine module 108b is substantially perpendicular to the wing chord line 222 of the wing chord that is in line with the centre axis of the engine module 108b.

The tilt mechanism may thus be configured to pivot or rotate the pivot axis 232a of the engine module 108b to any pivot position (e.g. around 360 degrees anti-clockwise and/or clockwise about the tilting axis 107) as desired to a vertical mode of flight, to transition between the vertical mode of flight and the horizontal mode of flight, and to a horizontal mode of flight, and vice versa. Similarly, each of the remaining engine modules 108a-108h of wings 104a-106b may be independently controlled in a similar manner as described with respect to engine module 108b to allow the VTOL vehicle 100 to enter a vertical mode of flight, to transition between the vertical mode of flight and the horizontal mode of flight, and to enter the horizontal mode of flight, and vice versa.

Figure 2E:
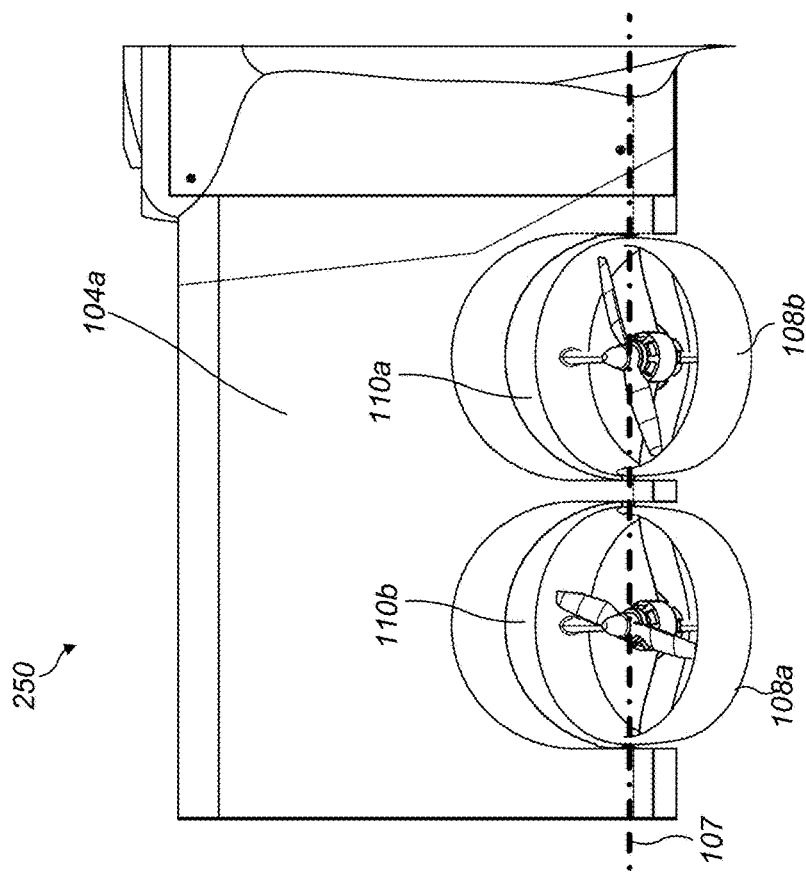
FIG. 2e is a schematic diagram illustrating a plan view of a portion of the wing with cut-outs and pivotally mounted engine modules of the example VTOL vehicle of FIG. 1a according to the invention.
Figure 2D:
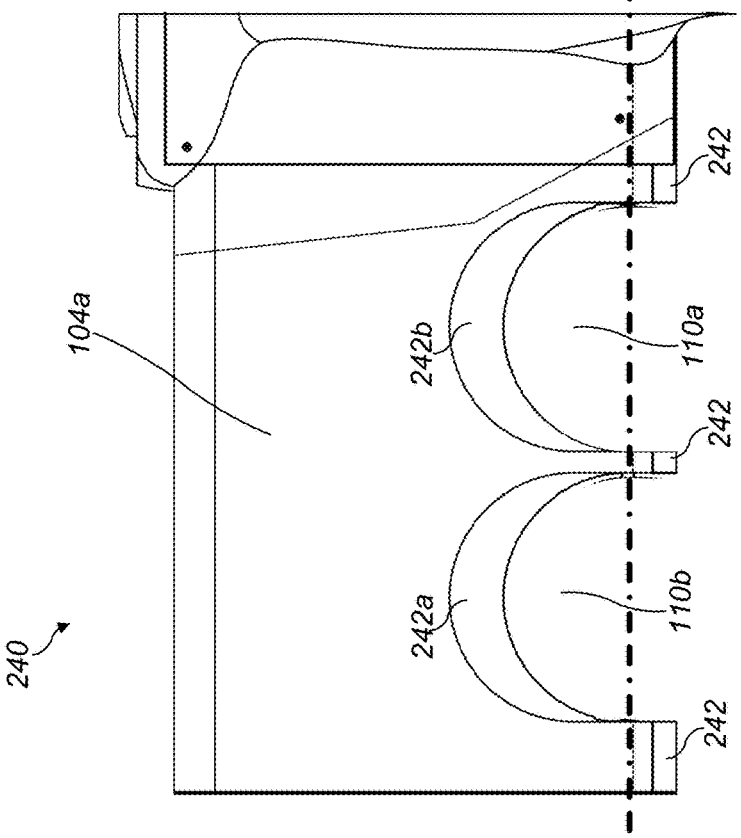
FIG. 2d is a schematic diagram illustrating a plan view of a portion of the wing with cut-outs for receiving and mounting engine modules of the example VTOL vehicle of FIG. 1a according to the invention.

FIG. 2d is a schematic diagram illustrating a plan view 240 of a portion of the wing 104a with cut-outs 110a and 110b for receiving engine modules 108b and 108a of the example VTOL vehicle 100 of FIG. 1a as viewed from arrow A. Although reference is made to VTOL vehicle 100 of FIGS. 1a-1f, this is for simplicity and by way of example only and the invention is not so limited, it is to be appreciated by the skilled person that the configuration of the engine module 108b and/or wing 104a of FIG. 2a is also applicable to, and/or modifiable for use with trailing and/or leading edges of the wings 104a-104b and/or 106a-106b of VTOL vehicles 130, 140, 150 and/or 160, combinations thereof, modifications thereto and the like and/or as the application demands. The cut-outs 110a and 110b of the wing 104a are located in the vicinity of the trailing edge 242 of wing 104a. Each of the cut-outs 110a and 110b form a shape based on a rectangle topped with a semi-circular region. These shaped cut-outs 110b and 110a allow the tilting mechanism(s) 212a and 212b of the engine module 108b and corresponding tilting mechanisms of engine module 108a, respectively, to be mounted in the rectangular portion of the cut-out. The rectangular portion of the cut-outs 110a and 110b are in the vicinity of the trailing edge 442 of the wing 104a. Furthermore, the semi-circular regions of each cut-out 110a and 110b may define additional trailing edges 242a and 242b, respectively, of wing 104a. The remaining wings 104b, 106a and 106b of the VTOL vehicle 100 have similarly shaped cut-outs 110c-110h in the vicinity of the trailing edges of the corresponding wings 104a, 106a and 106b. Similarly, the remaining engine modules 108c-108h may be pivotally mounted in the vicinity of the trailing edges as described for engine modules 108a and 108b. FIG. 2e is a schematic diagram illustrating a plan view 250 of the portion of the wing 104a of FIG. 2d with the engine modules 108b and 108a pivotally mounted along the trailing edge 242 of wing 104a. The cut-outs 110a-110h are sized to allow the corresponding engine modules 108a-108h to be independently pivoted about the respective tilt axes of each of the engine modules 108a-108h from a vertical mode of flight, to transition between the vertical mode of flight and the horizontal mode of flight, and to enter the horizontal mode of flight, and vice versa.

Figure 3A:
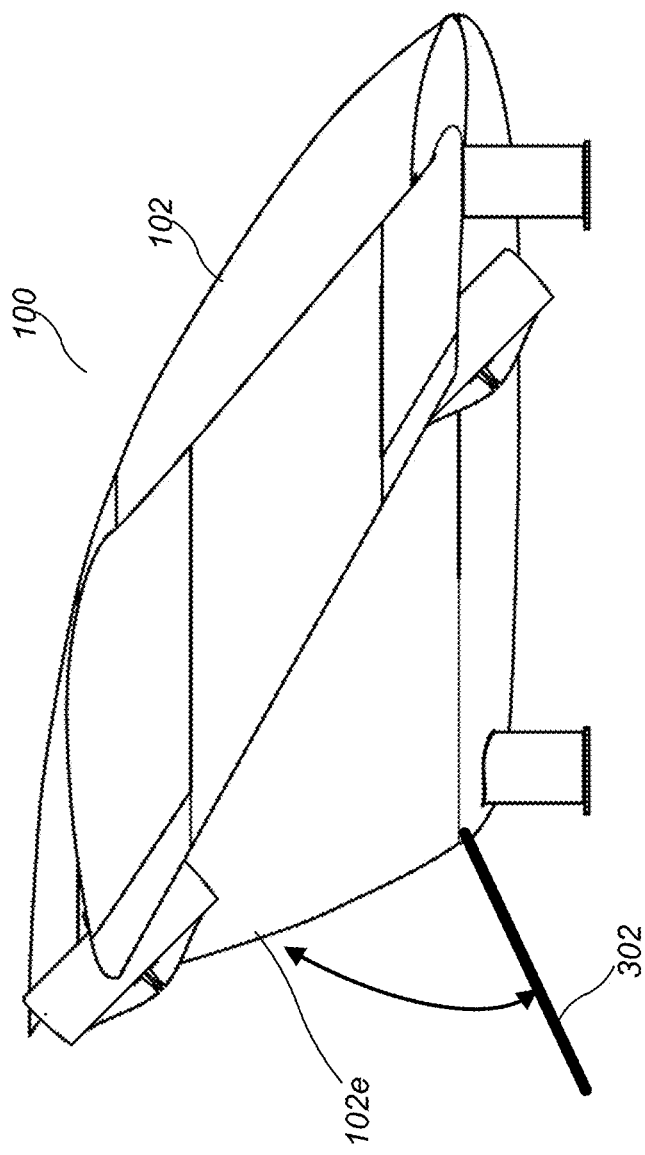
FIG. 3a is a schematic diagram illustrating an example rear access route to an interior portion of VTOL vehicle according to the invention.
Figure 3A:
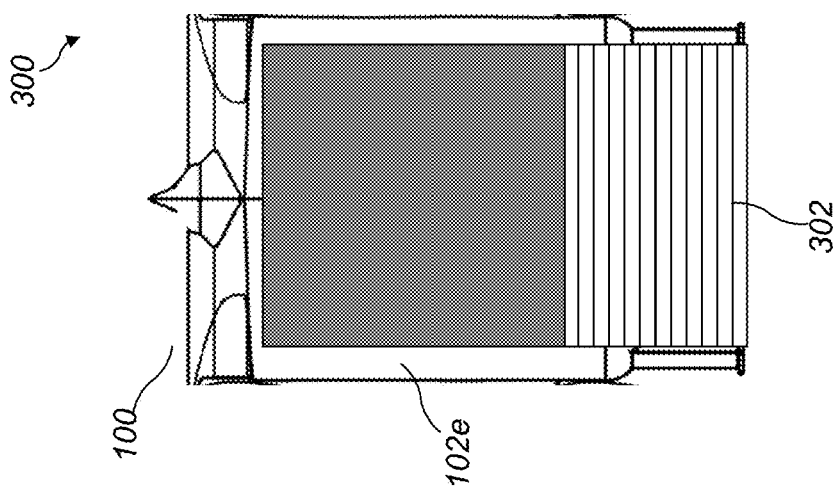

FIG. 3a is a schematic diagram illustrating an example rear access route 300 to an interior portion of VTOL vehicle 100. FIG. 3a illustrates a rear view portion of VTOL vehicle 100 of FIG. 1a when viewed from arrow 100D and a side view portion of VTOL vehicle 100 of FIG. 1a when viewed from arrow 100C. In this example, the rear access route 300 includes a rear ramp door 302 with one end pivotally coupled to the base of the aft rear portion 102e of the fuselage 102 of the VTOL vehicle 100. The rear ramp door 302 is illustrated in the open position and may be pivoted to a closed position. The rear ramp door 302 may be used for ingress and/or egress of cargo and/or payloads to/from the interior of the fuselage 102 of the VTOL vehicle 100. The rear ramp door 302 may be used for ingress and/or egress of passengers and/or cargo/payloads/luggage to/from the interior of the fuselage 102 of the VTOL vehicle 100. This type of access may be useful when the VTOL vehicle 100 is of a scale for lifting heavy payloads and/or multiple passengers and the like.

Figure 3B:
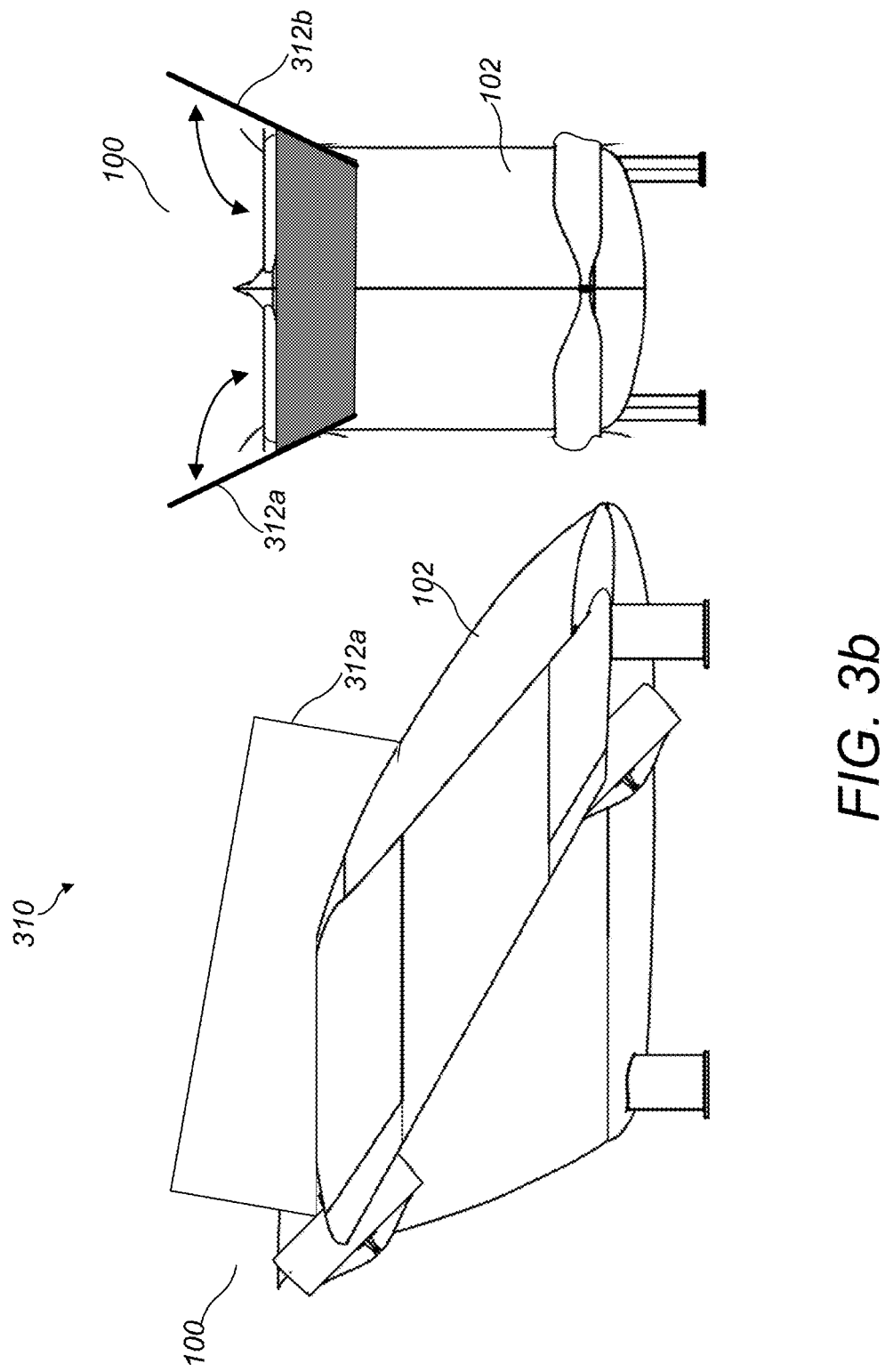
FIG. 3b is a schematic diagram illustrating an example upper access route to an interior portion of the VTOL vehicle according to the invention.

FIG. 3b is a schematic diagram illustrating an example upper access route 310 to an interior portion of the VTOL vehicle 100 according to the invention. FIG. 3b illustrates a side view portion of VTOL vehicle 100 of FIG. 1a when viewed from arrow 100C and a front view portion of VTOL vehicle 100 of FIG. 1a when viewed from arrow 100B. In this example, the upper access route 310 includes a pair of upper access doors 312a and 312b each pivotally coupled to an opposite upper side portion of the fuselage 102 of VTOL vehicle 100. The upper access doors 312a and 312b are illustrated in an open position and may be pivoted towards the upper side portions of the fuselage 102 to a closed position flush against the fuselage 102. The upper access doors 312a and 312b may be used for ingress and/or egress of cargo and/or payloads to/from the interior of the fuselage 102 of the VTOL vehicle 100. This type of access may be useful when the VTOL vehicle 100 is of a scale that a user may access (e.g. reach into the VTOL vehicle 100) any payload/cargo and/or place any payload/cargo into the fuselage of VTOL vehicle 100. That is the, VTOL vehicle 100 may be of a size that is smaller than a nominal adult human.

Figure 3C:
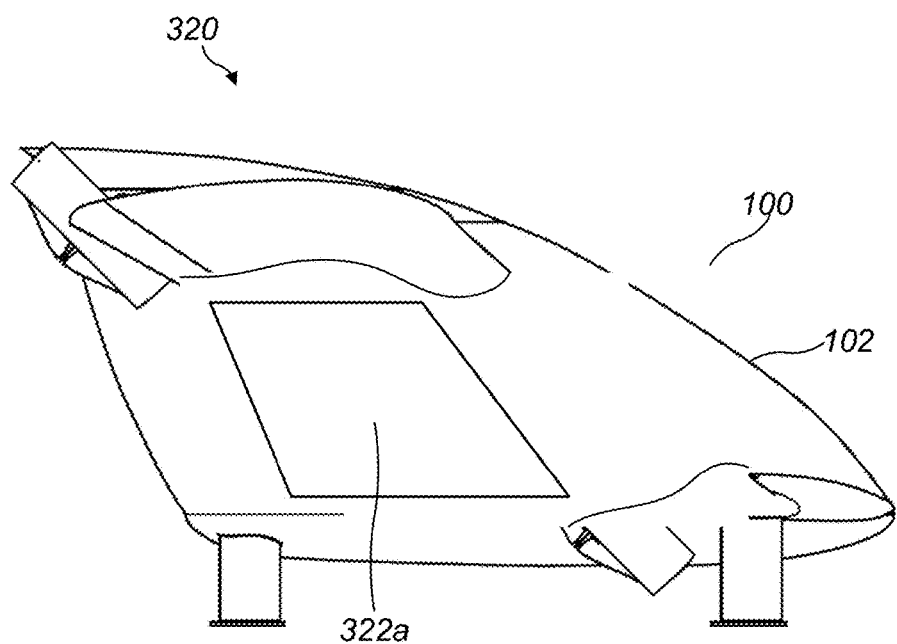
FIG. 3c is a schematic diagram illustrating an example side access route to an interior portion of the VTOL vehicle according to the invention.

FIG. 3c is a schematic diagram illustrating an example side access route 320 to an interior portion of the VTOL vehicle 100 according to the invention. FIG. 3b illustrates a side view portion of VTOL vehicle 100 of FIG. 1a when viewed from arrow 100C. In this example, the side access route 320 includes a side access door or hatch 322a that may be coupled to a side portion of the fuselage 102 of VTOL vehicle 100. The side access door 322a may be pivotally mounted on the side portion of the fuselage 102 and/or slideably mounted on the side portion of the fuselage 102. The side access door 322a may be configured for use for ingress and/or egress of cargo and/or payloads to/from the interior of the fuselage 102 of the VTOL vehicle 100. In particular, the side access door 322a may be configured for ingress and/or egress of one or more passengers and/or cargo/payloads/luggage to/from the interior of the fuselage 102 of the VTOL vehicle 100. Another side access door (not shown) may be located on the opposite side portion of the fuselage 102 to allow other passengers and/or cargo/payloads/luggage to/from the interior of the fuselage 102 of the VTOL vehicle 100. This type of access may be useful when the VTOL vehicle 100 used for transporting one or more or multiple passengers and the like.

Figure 3D:
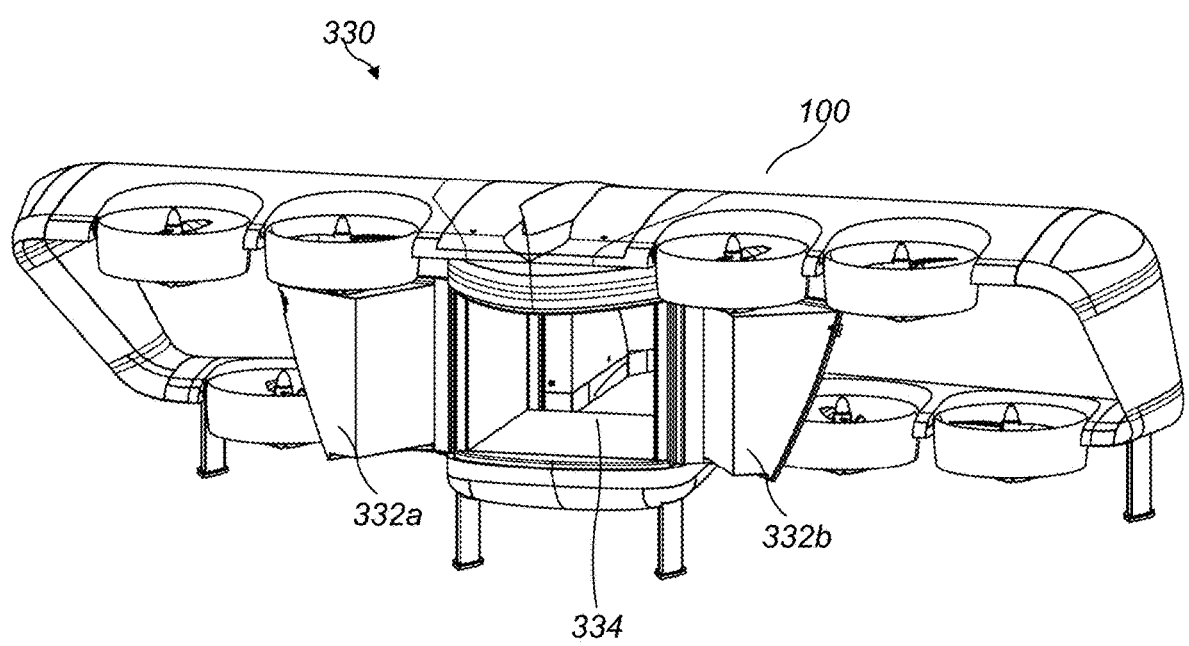
FIG. 3d is a schematic diagram illustrating another example rear access route to an interior portion of the VTOL vehicle according to the invention.

FIG. 3d is a schematic diagram illustrating another example rear access route 330 to an interior portion 334 of the VTOL vehicle 100 according to the invention. FIG. 3d illustrates a perspective rear view of VTOL vehicle 100 of FIG. 1a. In this example, the rear access route 330 includes a first rear access door 332a and a second rear access door 332b, both of which are pivotally mounted to opposite side portions of fuselage 102 of VTOL vehicle 100. The rear access doors 332a and 332b may be used for ingress and/or egress of cargo and/or payloads to/from the interior 334 of the fuselage 102 of the VTOL vehicle 100. This type of access may be useful when the VTOL vehicle 100 is of a scale for lifting heavy payloads and the like and which can be accessed either by robotic arms and/or users and the like.

Although reference is made in FIGS. 3a-3d to VTOL vehicle 100 of FIGS. 1a-1f, this is for simplicity and by way of example only and the invention is not so limited, it is to be appreciated by the skilled person that the features described with respect to FIGS. 3a-3d in relation to VTOL vehicle 100 of FIGS. 1a-1f may be applicable to, and/or modifiable for use with VTOL vehicles 130, 140, 150 and/or 160, combinations thereof, modifications thereto and the like and/or as the application demands.

Figure 4A:
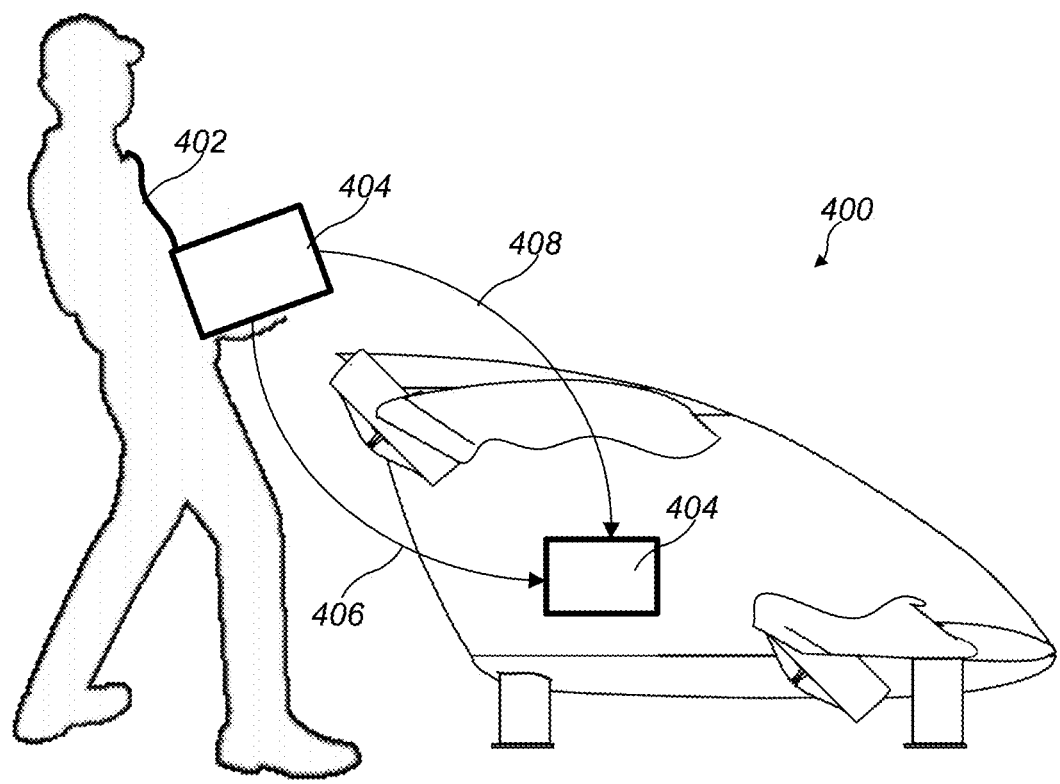
FIG. 4a is a schematic illustration of an example VTOL vehicle scaled for small or lightweight parcel delivery according to the invention.

FIG. 4a is a schematic illustration of an example VTOL vehicle 400 scaled for small or lightweight parcel delivery according to the invention. In this example, the VTOL vehicle 400 may include a ramp door as described with reference to FIG. 3a, side rear doors as described with reference to FIG. 3d, and/or a upper access doors as described with reference to FIG. 3b or as the application demands. A user 402 may have a payload 404 for delivery, and so may access the VTOL vehicle 400 via a first access route 406 (e.g. via a ramp doors and/or rear side doors) or via a second access route 408 (e.g. via a upper access doors). The VTOL vehicle 400 is designed to be smaller than the average user 402 for delivery and pick-up of, by way of example only but not limited to, small payloads/parcels and/or spare parts and the like. In this example, it is assumed that the VTOL vehicle 400 has sufficient storage capacity and range for the payload 404 to be safely transported/delivered from a first location to a second location in an autonomous or semi-autonomous fashion or even by remote control.

Figure 4B:
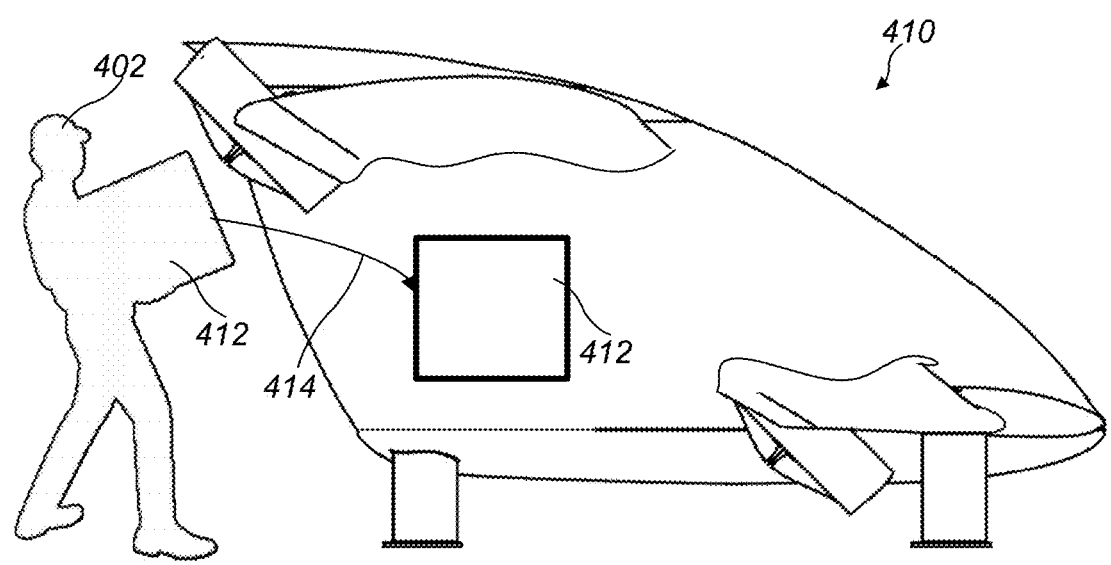
FIG. 4b is a schematic illustration of an example VTOL vehicle scaled for large or heavyweight parcel delivery according to the invention.

FIG. 4b is a schematic illustration of another example VTOL vehicle 410 scaled for large or heavyweight parcel delivery according to the invention. In this example, the VTOL vehicle 410 may include a ramp door as described with reference to FIG. 3a or rear access doors as described with reference to FIG. 3d. A user 402 may have a heavy payload 412 for delivery, and so may access the VTOL vehicle 410 via a first access route 414 (e.g. via a ramp doors and/or rear side doors). The VTOL vehicle 410 is designed to be larger than the average user 402 for delivery and pick-up of, by way of example only but not limited to, large heavy payloads/parcels and/or spare parts and the like, but which may still be loaded by the user 402 and/or a robotic arm or other mechanisms. In this example, it is assumed that the VTOL vehicle 410 has sufficient storage capacity and range for the payload 412 to be safely transported/delivered from a first location to a second location in an autonomous or semi-autonomous fashion.

Figure 4C:
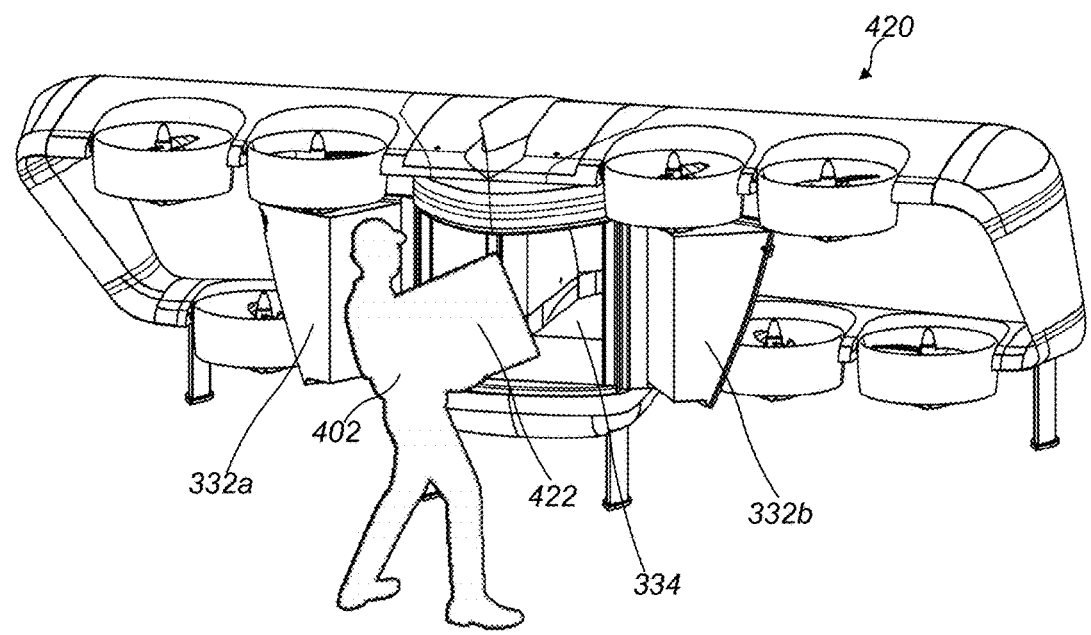
FIG. 4c is a schematic illustration of another example VTOL vehicle scaled for large or heavyweight parcel delivery and/or transport of side-by-side passengers according to the invention.

FIG. 4c is a schematic illustration of an example VTOL vehicle 420 scaled for large or heavyweight parcel delivery and/or transport of side-by-side passengers according to the invention. In this example, the VTOL vehicle 420 may include a rear access doors 332a and 332b as described with reference to FIG. 3d. A user 402 may have a heavy payload 422 for delivery, and/or cargo and so may access the VTOL vehicle 420 via the rear access route past rear access doors 332a and 332b to the interior 334 of the VTOL vehicle 420. The VTOL vehicle 420 is designed to be larger than the average user 402 for delivery and pick-up of, by way of example only but not limited to, large heavy payloads/parcels and/or spare parts and the like, but which may still be loaded by the user 402 and/or a robotic arm or other mechanisms. In this example, it is assumed that the VTOL vehicle 410 has sufficient storage capacity and range for the payload 422 to be safely transported/delivered from a first location to a second location in an autonomous or semi-autonomous fashion. Alternatively or additionally, the VTOL vehicle 420 may also be configured to include seating for transport of side-by-side passengers and their luggage.

Figure 4D:
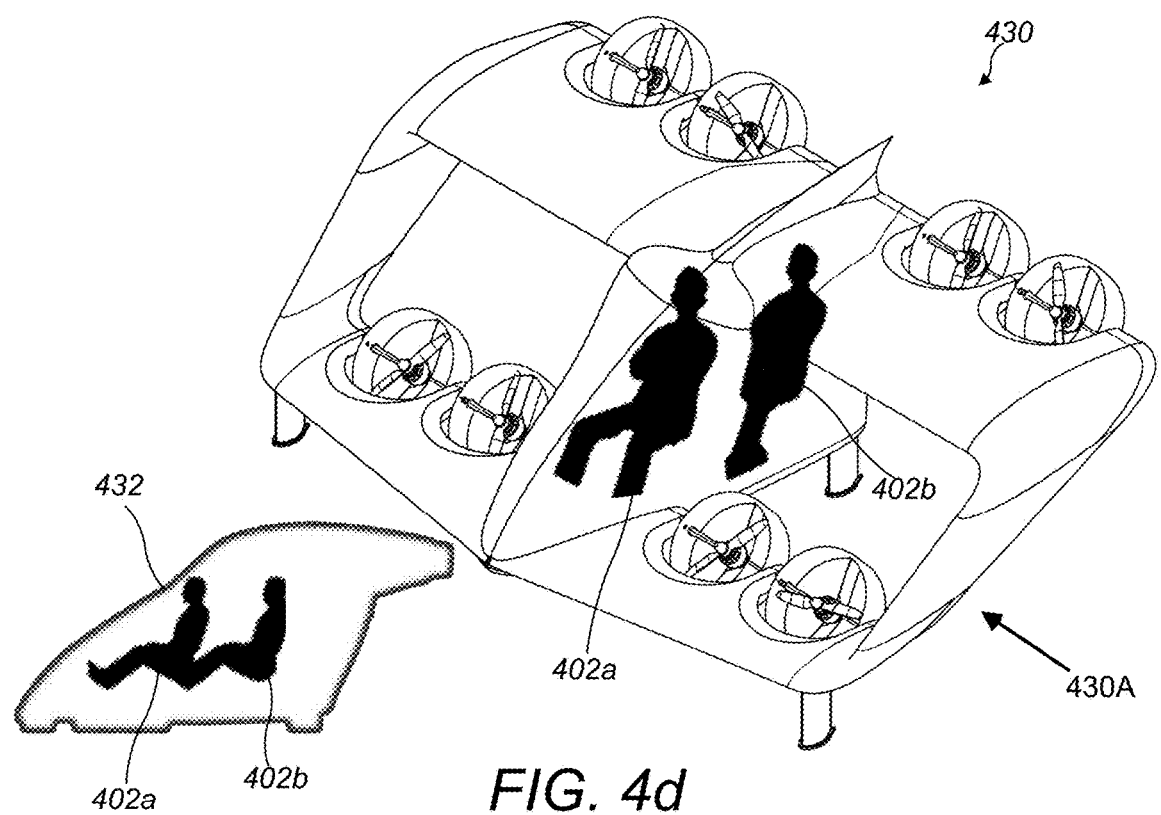
FIG. 4d is a schematic illustration of another example VTOL vehicle scaled for lightweight passenger transport according to the invention.

FIG. 4d is a schematic illustration of another example VTOL vehicle 430 scaled for lightweight passenger transport according to the invention. In this example, the VTOL vehicle 430 is illustrated by a perspective front view and also a side view portion of the fuselage 432 of the VTOL vehicle 430 when viewed from arrow 430A. The VTOL vehicle 430 has been designed and configured to carry two passengers 402a and 402b. In the side view portion, the two passengers 402a and 402b are shown seated in a single file configuration with a first passenger 402a seated in front of a second passenger 402b. In this example, it is assumed that the VTOL vehicle 430 has suitable seating arrangement to allow the two passengers 402a and 402b to be safely transported from a first location to a second location in an autonomous, semi-autonomous, and/or a piloted fashion (e.g. the first and/or the second user 402a or 402b may be a pilot). Although VTOL vehicle 430 has been described as carrying, by way of example only but is not limited to, two passengers in single file configuration, it is to be appreciated by the skilled person that the VTOL vehicle 430 may be further configured to seat and carry side-by-side passengers (e.g. two passengers seated side-by-side) as the application demands.

Figure 4E:
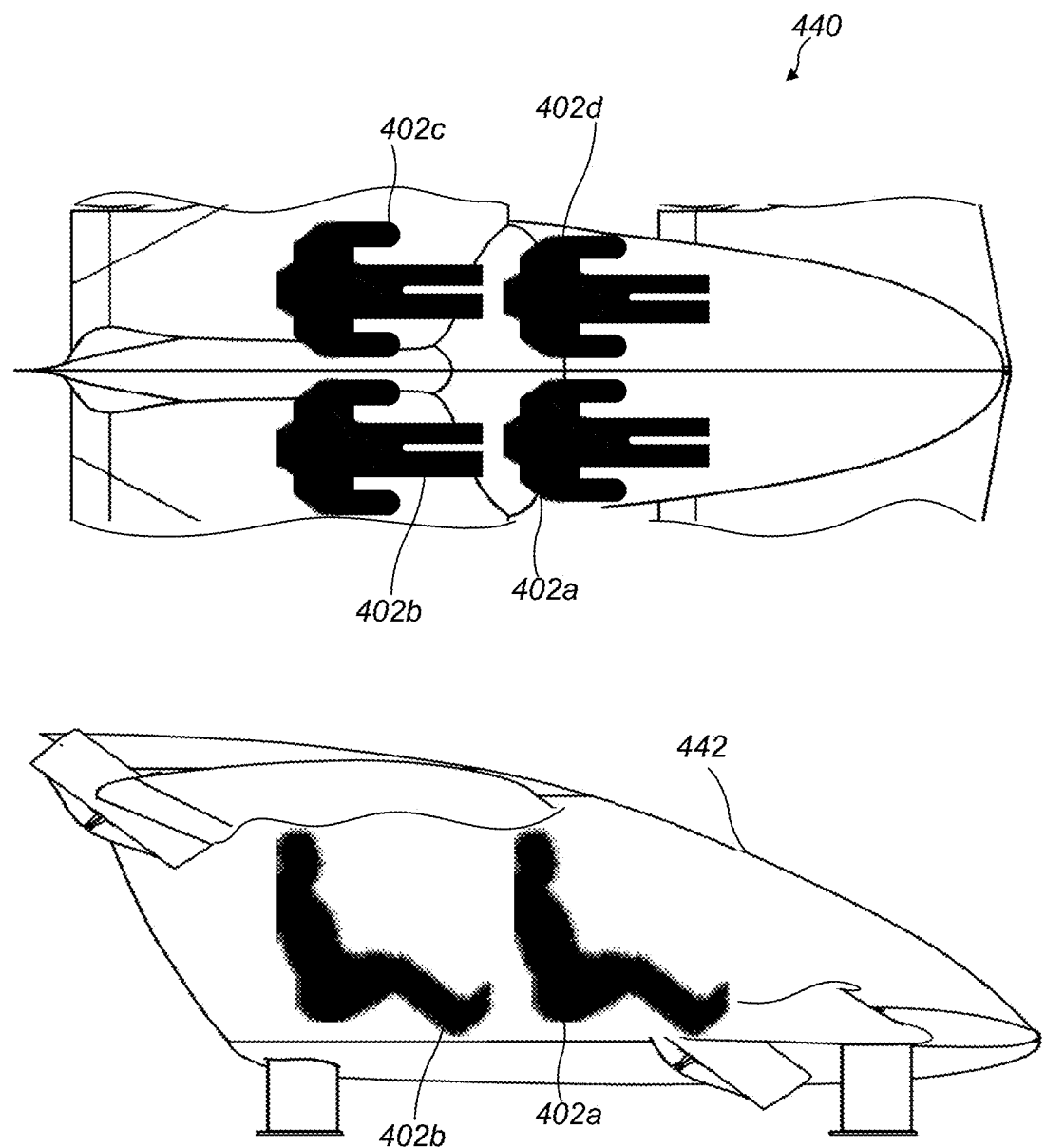
FIG. 4e is a schematic illustration of another example VTOL vehicle scaled for medium weight passenger transport according to the invention.

FIG. 4e is a schematic illustration of another example VTOL vehicle 440 scaled for medium weight passenger transport of multiple sets of side-by-side passengers according to the invention. In this example, the VTOL vehicle 440 is illustrated by a plan view portion and a side view portion of the fuselage 442 of the VTOL vehicle 440. The VTOL vehicle 440 has been designed and configured to carry four passengers 402a-402d. In the side view portion, the two passengers 402a and 402b are shown seated in a single file configuration with a first passenger 402a seated in front of a second passenger 402b. The plan view portion shows the first passenger 402a seated in the same row as a third passenger 402d, and the second passenger 402a seated in the same row as a fourth passenger 402c, where the third passenger 402d is seated in front of the fourth passenger 402c. In this example, it is assumed that the VTOL vehicle 430 has suitable seating arrangement to allow the four passengers 402a-402d to be safely transported from a first location to a second location in an autonomous, semi-autonomous, and/or a piloted fashion (e.g. the first and/or the third passengers 402a or 402d may be a pilot).

Figure 4F:
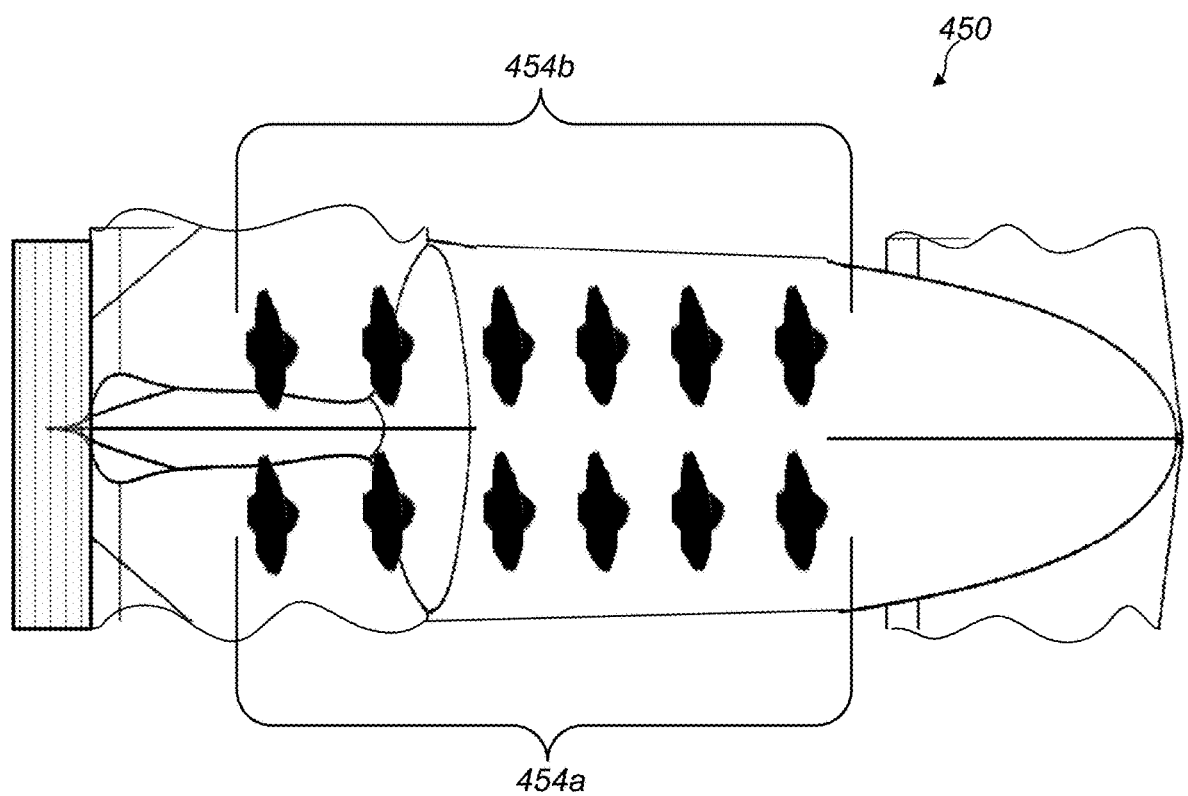
FIG. 4f is a schematic illustration of a plan and side portions of another example VTOL vehicle scaled for heavy weight passenger transport according to the invention.
Figure 4F:
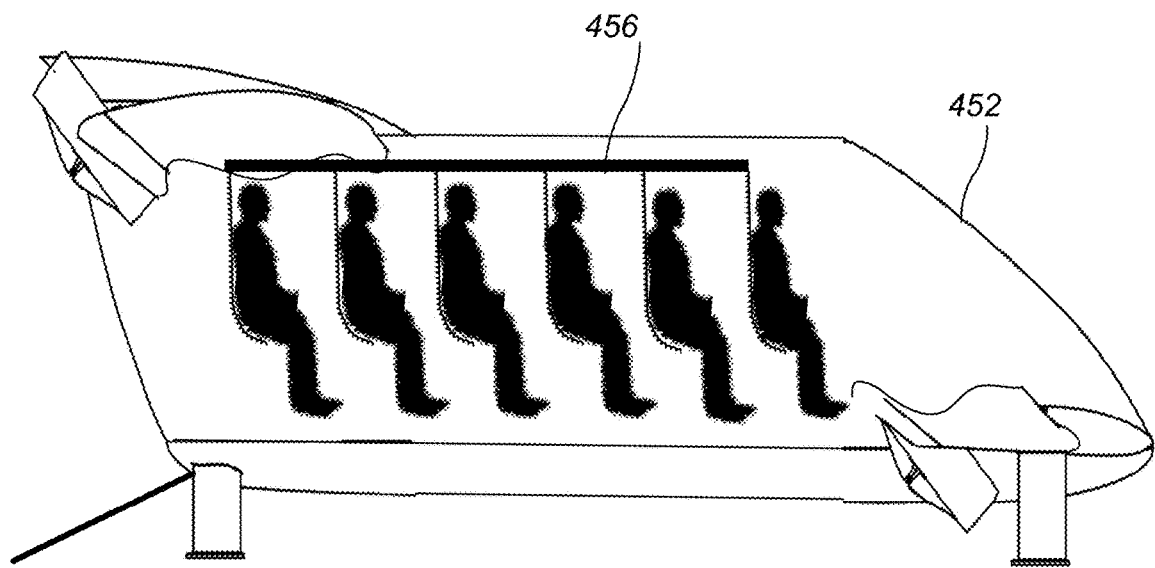

FIG. 4f is a schematic illustration of a plan and side portions of another example VTOL vehicle 450 scaled for heavy weight passenger transport according to the invention. In this example, the VTOL vehicle 450 is illustrated by a plan view portion and a side view portion of the fuselage 452 of the VTOL vehicle 450. The fuselage 452 of the VTOL vehicle 450 has been extended to accommodate the additional passengers. Furthermore, the VTOL vehicle 450 may be designed and/or configured with more powerful engine modules and/or have an increased number of engine modules along each of the wings of the VTOL vehicle 450. The VTOL vehicle 450 has been designed and configured to carry, by way of example only but is not limited to, twelve passengers, which are divided into a two column by six row seating arrangement 454a and 454b with two seats in each row. In the side view portion, the six passengers 454a are shown seated in a single file configuration. In the side view portion, the groups of passengers 454a and 454b are seated in a standing or leaning seat arrangement 456, which may be used for short haul flights. The standing or leaning seating arrangement 456 also provides the advantage of reducing the length, dimensions and size and weight of the VTOL vehicle 450 compared with reclining seated arrangements as described with respect to FIGS. 4d and 4e. In this example, it is assumed that the VTOL vehicle 450 has suitable seating arrangement 456 to allow the twelve passengers 454a and 454b to be safely transported from a first location to a second location in an autonomous, semi-autonomous, and/or a piloted fashion (e.g. the front most passengers of the two groups of passengers 454a and 454b may be a pilot). Although the VTOL vehicle 450 has been described as being configured to carry, by way of example only but is not limited to, twelve passengers, it is to be appreciated by the skilled person that the VTOL vehicle 450 may be configured to carry any number of passengers such as, by way of example only but is not limited to, two or more passengers, a multiplicity of passengers, a plurality of passengers, a group of passengers and the like, and/or a number of passengers as the application demands and/or as the technology in relation to configuring a VTOL vehicle 450 to carry that number of passengers allows.

Although reference is made in FIGS. 4a-4f to VTOL vehicles 400, 410, 420, 430, 440, and 450, this is for simplicity and by way of example only and the invention is not so limited, it is to be appreciated by the skilled person that the features and/or functions and the like as described with respect to FIGS. 4a-4f in relation to VTOL vehicles 400, 410, 420, 430, 440, and 450 may be applicable to and/or modifiable for use with VTOL vehicles 130, 140, 150 and/or 160 as described with respect to FIGS. 1a-1o, combinations thereof, modifications thereto and the like and/or as the application demands.

Figure 5A:
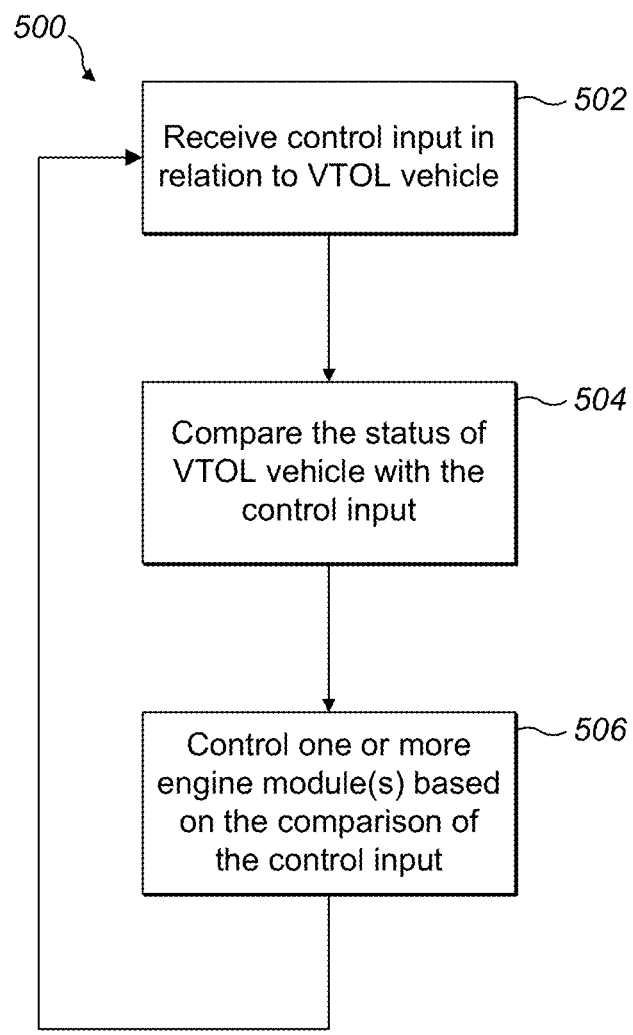
FIG. 5a is a flow diagram illustrating an example control process for operating the engine modules of an example VTOL vehicle according to the invention.

FIG. 5a is a flow diagram illustrating an example control process 500 for operating the engine modules 108a-108h of the example VTOL vehicle 100 of FIGS. 1a-1f according to the invention. Although reference is made in FIG. 5a to VTOL vehicle 100 of FIGS. 1a-1f, this is for simplicity and by way of example only and the invention is not so limited, it is to be appreciated by the skilled person that the control process 500 and/or features and/or functions and the like as described with respect to FIG. 5a in relation to VTOL vehicle 100 may be used, applicable to and/or modifiable for use in controlling VTOL vehicles 130, 140, 150 and/or 160 as described, by way of example only but not limited to, with respect to FIGS. 1k-1o, combinations thereof, modifications thereto and the like and/or as the application demands. The control process 500 may be performed by an on-board computing device/system that may be at least in part installed on the VTOL vehicle 100 according to the invention. The control process 500 may include the following steps of:

In step 502, the process 500 may receive a control input that may include data representative of at least one from the group of: speed, direction, orientation, position, flight and attitude in relation to the VTOL vehicle. Additionally or alternatively, the control input may also include sensor data from a set of sensor(s) on-board the VTOL vehicle that may assist process 500 in operating the engine modules 108a-108h of the VTOL vehicle 100. Additionally or alternatively, the control input may further include user input data from a user interface device for directing/controlling the operation of the VTOL vehicle 100. Additionally or alternatively, the control input may include autonomous data from an autonomous device for directing/controlling the operation of the VTOL vehicle 100.

In step 504, a comparison is performed based on the determined current status of the VTOL vehicle 100 and a determined desired status of the VTOL vehicle 100 based on the control input data. The current status of the VTOL vehicle may be based on, by way of example only but is not limited to, flight path, mode of flight (e.g. vertical mode of flight, horizontal mode of flight, transitioning there between and vice versa), orientation, attitude, speed, direction, position in space and time and the like. The desired status of the VTOL vehicle 100 may be defined or determined, by way of example only but is not limited to, at least by one or more of the control input data, sensor data, user input data, autonomous data and the like.

In step 506, based on the comparison of the current status and the desired status of the VTOL vehicle 100, the one or more engine modules 108a-108h may be independently controlled by controlling at least the thrust and/or pivot orientation of each of the engine modules 108a-108h to change the current status towards the desired status in response to the received control input data. The process may proceed to step 502 for receiving further control input data for adjusting the new current status of the VTOL vehicle 100.

In step 506, controlling each of the engine modules 108a-108h may further include determining which of the engine modules 108a-108h require adjustment to move the VTOL vehicle 100 from the current status to the desired status; determining the type of adjustment for those engine modules requiring adjusting from a set of engine operations comprising a plurality of engine module operations, where the plurality of engine module operations affect, by way of example only but is not limited to, the orientation, flight path, position, attitude, altitude, speed and other axes of motion and/or position in relation to the VTOL vehicle 100; and implementing each of the determined engine module operations on those engine modules requiring adjusting.

Step 506 may further use one or more steps associated with the process(es), method(s), engine configurations, and mechanism(s) that describe one or more sets of flight modes (e.g. vertical mode of flight, horizontal mode of flight, transitioning there between, and the like), engine operations or engine control operations, lateral movement and angular movement in an X, Y, Z frame of reference or coordinate system of the VTOL vehicle and the like is described with reference to FIGS. 5b-5d, combinations thereof, modifications thereof and/or as described herein.

Figure 5B:
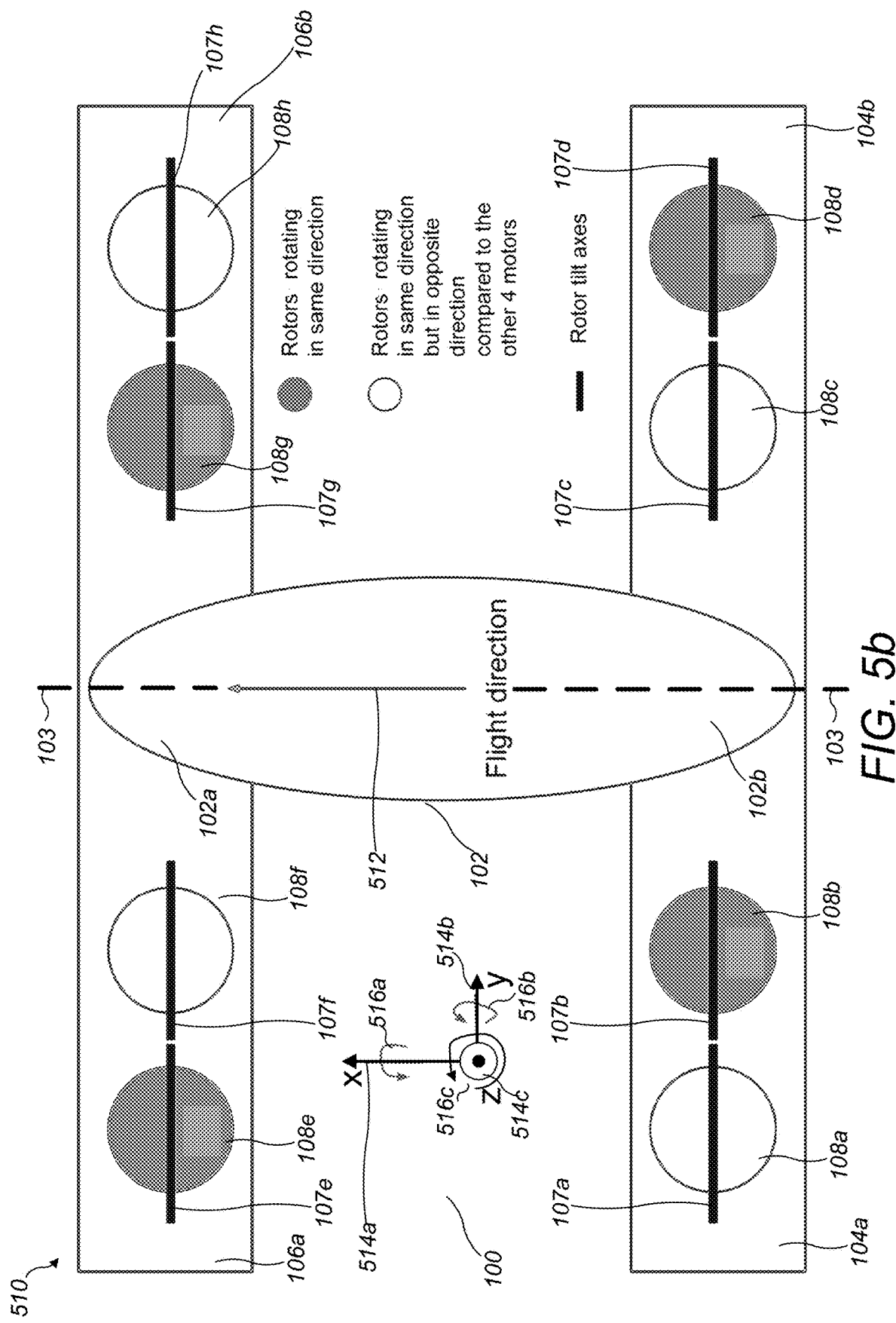
FIG. 5b is a schematic diagram illustrating a plan view of the engine module configuration of an example VTOL vehicle according to the invention.

FIG. 5b is a schematic diagram illustrating a plan view of an engine module configuration 510 of the example VTOL vehicle 100 of FIG. 1a according to the invention. The VTOL vehicle 100 is depicted in a plan view illustration with the fuselage 102 having longitudinal axis 103. The rear wings 104a and 104b are secured to a rear portion 102b of the fuselage 102 and the front wings 106a-106b are secured to the front portion 102a of the fuselage 102. The VTOL vehicle 100 is configured, by way of example only but is not limited to, as described with reference to any one of FIGS. 1a to 4f, modifications thereof, or as described herein. The VTOL vehicle 100 is assumed to be in a forward direction 512 of flight which is in parallel with the longitudinal axis 103 of the fuselage 102. Although reference is made in FIG. 5b to VTOL vehicle 100 of FIGS. 1a-1f, this is for simplicity and by way of example only and the invention is not so limited, it is to be appreciated by the skilled person that the engine module configuration 510, operations and/or functions thereof, features and the like as described with respect to FIG. 5a in relation to VTOL vehicle 100 may be used, applied to and/or modifiable for use with VTOL vehicles 130, 140, 150 and/or 160 as described, by way of example only but not limited to, with respect to FIGS. 1k-1o, combinations thereof, modifications thereto and the like and/or as the application demands.

An X-Y-Z coordinate reference system or frame of reference in respect of the VTOL vehicle 100 may be defined and used for determining or specifying the direction, position, attitude, orientation and/or speed of the VTOL vehicle 100. An X-axis 514a may be defined to be parallel to the longitudinal axis 103 of the fuselage 102, a Y-axis 514b may be defined to be perpendicular to the X-axis 514a and parallel to a plane defined by the page, or a plane that intersects a first position on a wing 104a or 106a and a corresponding second position (mirrored) on the opposite wing 104b or 106b, and the Z-axis 514c may be defined to be perpendicular to the X-axis and the Y-axis, which in this example is coming out of the page or perpendicular to the page and is represented by a dotted circle.

A movement in the direction of the arrow along the X-axis represents a forwards lateral movement of the VTOL vehicle 100 in the direction of flight 512, a movement in the opposing lateral direction of the arrow along the X-axis represents a backwards movement of the VTOL vehicle 100 in the opposite direction of flight 512. Pivoting around the X-axis represents a so-called roll movement of the VTOL vehicle 100. As viewed in the direction of flight 512 in FIG. 5b, when the pivot around the X-axis is an anti-clockwise pivot 516a, then the VTOL vehicle 100 is said to have rolled anti-clockwise. That is, the tips of the wings 106b and 104b have a downwards movement (e.g. into the page) and the tips of the wings 104a and 106a have an upward movement (e.g. out of the page) about the longitudinal axis 103 of the fuselage 102. If the pivot around the X-axis is opposite to the anti-clockwise pivot 516a (e.g. clockwise), then VTOL vehicle 100 is said to have rolled clockwise. That is the tips of the wings 106a and 104a have a downwards movement (e.g. into the page) and the tips of the wings 104b and 106b have an upward movement (e.g. out of the page) about the longitudinal axis 103 of the fuselage 102. Thus, the X-axis 514a defines 4 degrees of freedom the VTOL vehicle 100 may move in, which include forward and backwards (or positive and negative movement) movement/translation in a lateral direction parallel to or along the X-axis 514a and anti-clockwise and clockwise pivoting around the X-axis 514a (e.g. the VTOL vehicle 100 rolls about the X-axis 514a).

A movement in the direction of the arrow along the Y-axis 514b represents a lateral side-ways movement of the VTOL vehicle 100 towards the top of the page (when viewed in portrait) or in a direction perpendicular to direction of flight 512 and perpendicular to the Z-axis 514c. A movement in the opposing direction of the arrow along the Y-axis 514b represents a lateral side-ways movement along the Y-axis 514b of the VTOL vehicle 100 towards the bottom of the page (when viewed in portrait) in a direction perpendicular to direction of flight 512 and perpendicular to the Z-axis 514c. Pivoting around the Y-axis represents a so-called pitch movement of the VTOL vehicle 100. As viewed along the arrow of the Y-axis in FIG. 5b, when the pivot around the Y-axis 514b is an anti-clockwise pivot 516b, then the VTOL vehicle 100 is said to have pitched anti-clockwise (e.g. the VTOL vehicle 100 has pitched downwards). That is the front portion 102a of the fuselage 102 has a downwards movement (e.g. into the page) whilst the rear portion 102b of the fuselage 102 has an upwards movement (e.g. out of the page). If the pivot around the Y-axis 514b is opposite to the anti-clockwise pivot 516b (e.g. clockwise), then the VTOL vehicle is said have pitched clockwise (e.g. the VTOL vehicle 100 has pitched upwards). That is the rear portion 102b of the fuselage 102 has a downwards movement (e.g. into the page) whilst the front portion 102a of the fuselage 102 has an upwards movement (e.g. out of the page). Thus, the Y-axis 514b also defines 4 degrees of freedom the VTOL vehicle 100 may move in, which includes forward and backwards (or positive and negative movement) movement or translation in a direction parallel to or along the Y-axis 514b and anti-clockwise and clockwise pivoting around the Y-axis 514b (e.g. the VTOL vehicle 100 pitches about the Y-axis 514b).

A movement in a direction along the Z-axis 514c out of the page represents a movement of the VTOL vehicle 100 in a direction out of the page (when viewed in portrait), or an upwards direction, that is perpendicular to the X and Y-axes 514a and 514b. A movement in the direction along the Z-axis 514c into the page represents a movement of the VTOL vehicle 100 in a direction into the page, or a downwards direction, that is perpendicular to the X and Y-axes 514a and 514b. Pivoting around the Z-axis 514c represents a so-called yaw movement of the VTOL vehicle 100. As viewed into the page in FIG. 5b, if the pivot around the Z-axis 514c is an anti-clockwise pivot 516c, then the VTOL vehicle 100 is said to have yawed anti-clockwise. That is, the plan view of the VTOL vehicle 100 of FIG. 5b rotates anticlockwise in the plane of the page. If the pivot around the Z-axis is opposite to the anti-clockwise pivot 516c (e.g. clockwise), then the VTOL vehicle is said have yawed clockwise. That is, the plan view of the VTOL vehicle 100 of FIG. 5b rotates clockwise in the plane of the page. Thus, the Z-axis 514c also defines 4 degrees of freedom the VTOL vehicle 100 may move in, which includes forward and backwards (or positive and negative movement) movement or translation in a direction parallel to or along the Z-axis 514c and anti-clockwise and clockwise pivoting around the Z-axis 514c (e.g. the VTOL vehicle 100 yaws about the Z-axis 514c). This forms 12 degrees of freedom available to the VTOL vehicle.

Given the VTOL vehicle 100 only uses the engine modules 108a-108h for controlling the orientation and flight path etc. of the VTOL vehicle 100, then up to at least twelve engine operations (or engine control operations) defining motions within these degrees of freedom may be used for controlling the engine modules 108a-108h to allow the VTOL vehicle 100 to make use of the available degrees of freedom. Each of the engine modules 108a-108h may be controlled independently by varying, by way of example only but not limited to, at least the pivot or tilt of each engine module about its corresponding tilt axis 107a-107h and by varying the rotor RPM and/or thrust of the corresponding engine module.

The rear wings 104a and 104b have a set of engine modules 108a-108d pivotally mounted thereto (e.g. in suitably shaped cut-outs (not shown) within the wing 104a-104b). Each of the engine modules 108a-108d have a corresponding tilting or pivoting axis 107a-107d. Each of the tilting or pivoting axes 107a-107d is, by way of example only but is not limited to, perpendicular to the longitudinal axis 103 of the fuselage 102 and parallel to the Y-axis 514b, and may also be perpendicular to the wing chord line (not shown). As depicted in FIG. 5b, each of the tilting or pivoting axes 107a-107d are shown to, for simplicity and by way of example only but is not limited to, be in line with each other and parallel to the Y-axis 514b, it is to be appreciated by the skilled person that each of the pivoting/tilt axes 107a-107d may be mounted in a spaced apart or staggered manner on wings 104a-104b along the X-axis 514a and/or longitudinal axis 103 of the fuselage 102.

The front wings 106a and 106b have a set of engine modules 108g-108h pivotally mounted thereto (e.g. in suitably shaped cut-outs (not shown) within the wing 106a-106b). Each of the engine modules 108g-108h have a corresponding tilting or pivoting axis 107g-107h. Each of the tilting or pivoting axes 107g-107h is, by way of example only but is not limited to, substantially perpendicular to the Y-axis 514b and/or the longitudinal axis 103 of the fuselage 102, and may be perpendicular to the wing chord line (not shown). As depicted in FIG. 5b, each of the tilting or pivoting axes 107g-107h are shown to, for simplicity and by way of example only but is not limited to, be in line with each other, it is to be appreciated by the skilled person that each of the pivoting/tilt axes 107g-107h pivotally mounted in a spaced apart or staggered manner on wings 106a-106b along the X-axis 514a and/or longitudinal axis 103 of the fuselage 102.

The engine module configuration 510 forms another of the engine module operations that may be used by the process 500 to ensure the VTOL vehicle 100 operates optimally during flight operations. A specific rotation pattern of the rotors of the engine modules 108a-108h is required for neutralizes all motor torques of the engine modules 108a-108h by staggering the direction of spin of the rotors of each of the engine modules 108a-108h. If all rotors are spinning in the same direction then the VTOL vehicle 100 may experience a large torque in the direction of the spinning rotors, which can destabilise the VTOL vehicle 100 when in a vertical mode of flight and/or a horizontal mode of flight and there between.

For example, assuming the rotors of the engine modules 108a-108h are rotating about the X-axis 514a with the same amount of RPM and/or thrust, if the rotors of all engine modules 108a-108h all spin in the clockwise direction then the VTOL vehicle 100 would experience a clockwise roll movement around the X-axis 514a due to the combined clockwise torque of the engine modules 108a-108h. Alternatively, if all of the rotors are spinning in the anti-clockwise direction then the VTOL vehicle 100 would experience an anti-clockwise roll movement around the X-axis 514a. The staggering of the direction of spins of the rotors along the wings 104a-104b and 106a-106b based on the engine module configuration 510 of FIG. 5b may stabilise the VTOL vehicle 100 and minimise or neutralise (if all rotors are spinning at the same RPM or outputting the same thrust) this rolling effect when all engine modules 108a-108h are outputting substantially the same amount of thrust.

The engine module configuration 510 also further allows only the use of the engine modules 108a-108h, which can be controlled independently (e.g. pivoted and RPM/thrust can be adjusted independently), for all flight manoeuvres such that the VTOL vehicle 100 requires no control surfaces (e.g. ailerons, flaps, rudder, elevator etc.) on the wings 104a-106b of the VTOL vehicle 100. Furthermore, the engine module configuration 510 allows all flight manoeuvres to be performed simultaneously in the vertical mode of flight and/or in the horizontal mode of flight (e.g. in hover and flight) and/or when transitioning between the vertical mode of flight and the horizontal model of flight. The engine module configuration 510 may also optimise the rotors airflow interaction with the fuselage 102 of the VTOL vehicle 100.

The engine module configuration 510 defines a rotation pattern for engine modules 108a-108h along the wings 104a-106b of the VTOL vehicle 100. The rotation pattern along wings 104a and 104b is to alternate the direction of rotation of the rotors of each engine module 108a-108b along wing 104a, where the rotors of the engine modules 108c-108d on wing 104b have an opposite direction of rotation to the rotors of each corresponding engine module on wing 104a. The rotation pattern along the wing 106a is for the rotors of the engine modules 108e-108f to have an opposite direction of rotation to the rotation pattern of the rotors of the corresponding engine modules 108a-108b of wing 104a. The rotation pattern along the wing 106b is for the rotors of the engine modules 108g-108h to have an opposite direction of rotation to the rotation pattern of the rotors of the corresponding engine modules 108a-108b of wing 104a.

As well, positioning of the engine modules 108a-108h in the vicinity of the trailing edges of the wings 104a-106b of VTOL vehicle 100 means that the centre of gravity of the VTOL vehicle 100 is located in a way to maximise thrust and ensure safe operation from the motors of the engine modules 108a-108h during take-off, hover and landing. This impacts the required lift generated from the wings 104a-106b since the centre of lift of the wings 104a-106b is not co-located with the centre of lift of the motors of the engine modules 108a-108h. Assuming all motors of the engine modules 108a-108h generate a similar amount of lift (or thrust) during hover, this can result in less lift generated from the front wings 106a-106b than the rear wings 104a-104b when the motors of the engine modules 108a-108h are located towards or in the vicinity of the trailing edges of the wings 104a-106b.

Figure 5C:
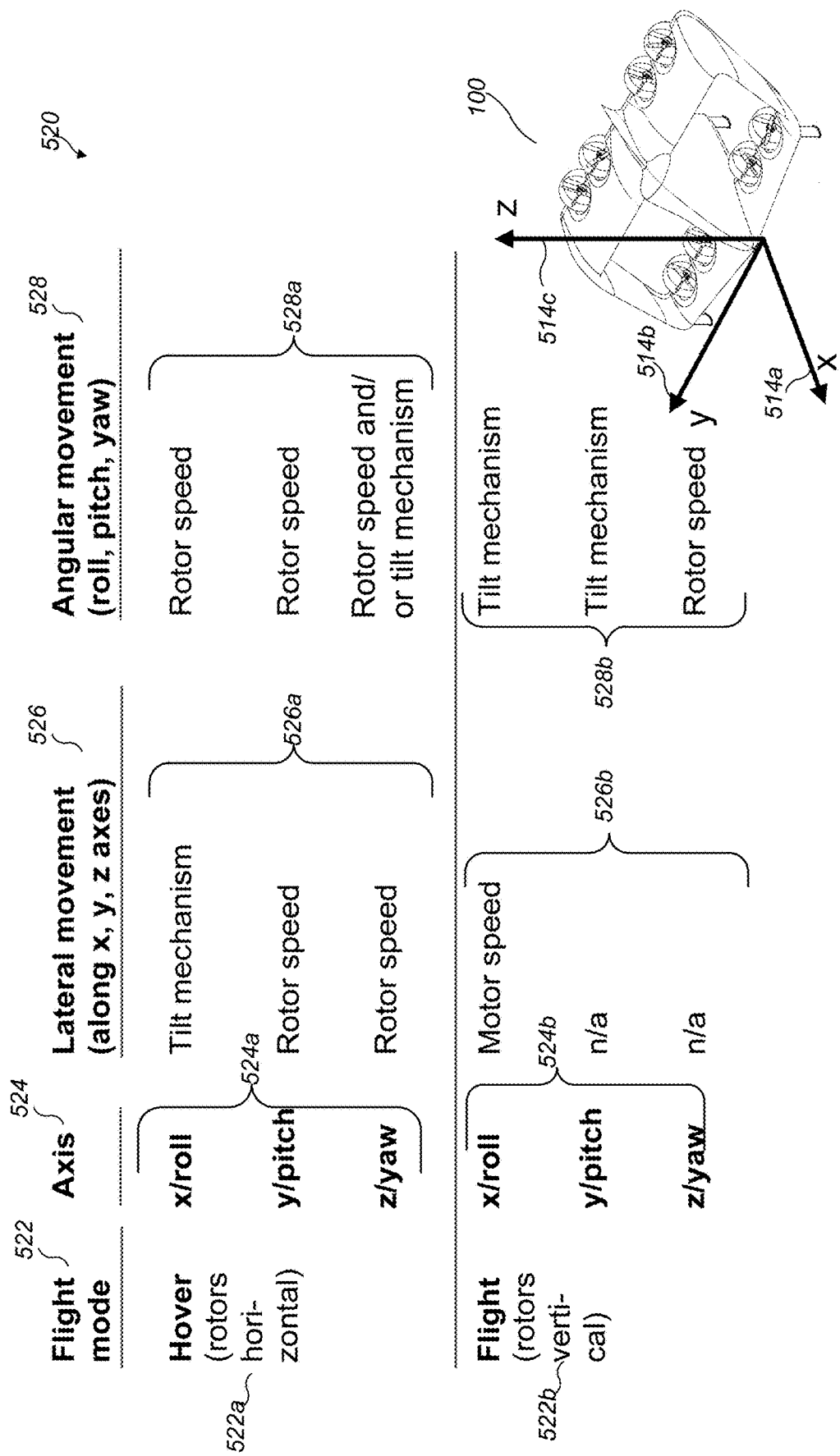
FIG. 5c is a schematic diagram and table illustrating an example set of flight modes and control axes with corresponding engine control operations to achieve the desired flight mode and/or control axis of the VTOL vehicle according to the invention.

FIG. 5c is a schematic diagram and table 520 illustrating an example set of flight modes 522 and corresponding control axes 524 defining a set of engine module operations 526 and 528 for achieving a desired flight mode and/or control axis of the example VTOL vehicle 100 of FIG. 1a according to the invention. Although reference is made in FIG. 5c to VTOL vehicle 100 of FIGS. 1a-1f, this is for simplicity and by way of example only and the invention is not so limited, it is to be appreciated by the skilled person that the operations and/or functions thereof, features, components as described with respect to FIG. 5a in relation to VTOL vehicle 100 may be used, applied to and/or modifiable for use with VTOL vehicles 130, 140, 150 and/or 160 as described, by way of example only but not limited to, with respect to FIGS. 1k-1o, combinations thereof, modifications thereto and the like and/or as the application demands. As described, one or more of the engine modules 108a-108h of the VTOL vehicle 100 may be independently controlled based on one or more engine module operations from the group of: revolutions per minute of rotors of an engine module; rotor blade pitch of an engine module; torque differentials acting on each engine module; independently tilting or pivoting of each of the engine modules 108a-108h about their corresponding tilting axes 107a-107h for generating thrust vectors for changing speed, direction or position of the VTOL vehicle 100; and/or any other engine operation that may be used to control the flight path and/or orientation and the like of the VTOL vehicle 100. These engine module operations may be used by the flight controller to adjust the VTOL vehicle 100 according to a coordinate system with respect to the VTOL vehicle 100.

Using the X-Y-Z coordinate system of FIG. 5b a set of flight modes 522 and control axes 524 may be mapped to a set of engine module operations 526 and 528 to control the orientation and flight of the VTOL vehicle 100. Thus, a certain combination of engine module operations 526 and 528 may be used to direct the VTOL vehicle 100 along, by way of example only but not limited to, the X-axis, the Y-axis, and/or the Z-axis and/or direct the VTOL vehicle 100 around, by way of example only but not limited to, the X-axis (e.g. a roll), the Y-axis (e.g. a pitch or pivot), and/or around the Z-axis (e.g. a yaw). As described in FIG. 5b, there are 12 degrees of freedom available to the VTOL vehicle 100, in which each of these 12 degrees of freedom may be mapped to a set of flight modes 522 and control axes 524 based on the available engine module operations 526 and 528.

The set of flight modes 522 may have at least two flight modes, a vertical mode of flight 522a and a horizontal mode of flight 522b. The first flight mode 522a is the vertical mode of flight (e.g. hover) that has a first set of control axes 524 in which there may be up to twelve degrees of freedom in relation to the X, Y, and Z-axes 514a, 514b and 514c and a corresponding sets of engine module operations 526a and 528a that may be performed for one or more of the degrees of freedom. The second flight mode 522b is the horizontal mode of flight (e.g. flight) that has a second set of control axes 524b in which there may be up to twelve degrees of freedom in relation to the X, Y, and Z-axes 514a, 514b and 514c and a corresponding second sets of engine module operations 526b and 528b that may be performed for one or more of the degrees of freedom.

The following set of flight modes 522 are based on the VTOL vehicle 100 of FIGS. 1a-1f and FIG. 5b, in which the VTOL vehicle 100 has, by way of example only but is not limited to, eight pivotally mounted engine modules 108a-108h. For simplicity, it is assumed that each of the engine modules 108a-108h includes, by way of example only but is not limited to, two degrees of freedom via the corresponding tilt axis 107a-107h of the corresponding engine module and rotor speed/thrust of the corresponding engine module. Although each engine module is described as having, by way of example only but is not limited to, two degrees of freedom for controlling said each engine module, it is to be appreciated by the skilled person that the two degrees of engine module control described hereafter are not exhaustive and the described manoeuvres can be achieved through other degrees of freedom of engine module control such as, by way of example only but not limited to, one or more from the group of: revolutions per minute of rotors of an engine module; rotor blade pitch of an engine module; torque differentials acting on each engine module; independently tilting or pivoting of each of the engine modules 108a-108h about their corresponding tilting axes 107a-107h for generating thrust vectors for changing speed, direction or position of the VTOL vehicle 100; any other engine operation that may be used to control the flight path and/or orientation and the like of the VTOL vehicle 100; and/or combinations thereof, modifications thereto or as described herein.

The first flight mode 522a is the vertical mode of flight (or Hover mode) which includes, by way of example only but is not limited to, a set control axes 524a, which may include one or more of X, Y, Z lateral movement control axes such as, by way of example only but not limited to, X lateral movement forwards and/or backwards along the X-axis 514a, Y lateral movement sideways starboard (e.g. right side of VTOL vehicle 100—e.g. wing 104b is considered on the starboard side of VTOL vehicle 100) and/or sideways port (e.g. left side of VTOL vehicle—e.g. wing 104a is considered on the port side of VTOL vehicle) movement along the Y-axis 514b (in FIGS. 1a and 5b wing 104b is a starboard wing and wing 104a is a port wing), Z lateral movement upwards and/or downwards along the Z axis 514c and at least one of: X roll, Y pitch and Z yaw angular movement axes anti-clockwise and/or clockwise about the corresponding X, Y and Z axes 514a, 514b and 514c. It is noted that Y pitch and X roll are essentially used for the X lateral movements and the Y lateral movements and may not be necessary for use when the VTOL vehicle 100 is in the first flight mode 522a (e.g. hover mode). The following describe some of the possible lateral and angular movements when the VTOL vehicle 100 is in the first flight mode 522a.

In essence, X lateral movement control axis for movement forwards/backwards (e.g. move forward/backward) may be achieved through tilting of at least two motors (one on each side of VTOL vehicle 100 to avoid yawing motion) and increasing motor speed simultaneously to maintain altitude.

In particular, the X lateral movement control axis for movement forwards is a movement along the X axis 514a in the direction of the arrow of the X-axis 514a. The X lateral movement control axis for movement forwards is achieved with the following engine module operations of: tilting (or pivoting) at least one set of the engine modules on one side of the VTOL vehicle 100 whilst simultaneously tilting (or pivoting) at least one set of the engine modules on the opposite side of the VTOL vehicle 100, to avoid a yawing motion, and increasing the rotor speed (RPM or motor speed) of the tilted sets of engine modules simultaneously to maintain altitude. Each set of engine modules may include at least one of the engine modules 108a-108h on the corresponding side of the VTOL vehicle 100. Each of the sets of tilted engine modules are pivoted or tilted about the corresponding tilt axes 107a-107h of the engine modules in each tilted set such that an X-axis component of thrust output from the tilted sets of engine modules is in a direction opposite to the direction of the arrow of the X-axis 514a (i.e. opposite the forward direction of movement along the X-axis). It is assumed that, since the flight mode is the vertical mode of flight, the engine modules that are not in the tilted sets of engine modules have been tilted to have a direction of thrust along the Z-axis 514c in the opposite direction of the arrow of the Z-axis 514c.

The X lateral movement control axis for movement backwards is a movement along the X axis 514a in the direction opposite to the arrow of the X-axis 514a. The X lateral movement control axis for movement backwards is achieved with the following engine module operations of: tilting (or pivoting) at least one set of the engine modules on one side of the VTOL vehicle 100 whilst simultaneously tilting (or pivoting) at least one set of the engine modules on the opposite side of the VTOL vehicle 100, to avoid a yawing motion, and increasing the rotor speed (RPM or motor speed) of the tilted sets of engine modules simultaneously to maintain altitude. Each set of engine modules may include at least one of the engine modules 108a-108h on the corresponding side of the VTOL vehicle 100. Each of the sets of tilted engine modules are pivoted or tilted about the corresponding tilt axes 107a-107h of the engine modules in each tilted set such that an X-axis component of thrust output from the tilted sets of engine modules is in the direction of the arrow of the X-axis 514a (i.e. towards the forward direction of movement along the X-axis). It is assumed that, since the flight mode is the vertical mode of flight, the engine modules that are not in the tilted sets of engine modules have been tilted to have a direction of thrust along the Z-axis 514c in the opposite direction of the arrow of the Z-axis 514c.

In essence a Y lateral movement control axis along the Y-axis 514b for a sideways starboard or port movement (e.g. move sideways) may be achieve by speeding up or slowing down at least two motors on one side of VTOL vehicle 100

(one in the rear and one in the front to avoid yawing motion) to achieve a bank (roll angle) which will move the VTOL vehicle sideways while maintaining altitude by enhancing overall motor thrust In particular, the Y lateral movement control axis along the Y-axis 514*b* for a sideways starboard movement of the VTOL vehicle 100 is a movement along the Y-axis 514*b* in the direction of the arrow of the Y-axis 514*b*. The Y lateral movement control axis for sideways starboard movement is achieved with the following engine module operations of: speed-up at least one set of engine modules on a portside rear wing 104*a* and at least one set of engine modules on a portside front wing 106*a*, where the direction of the rotors of each set of engine modules neutralise each other to prevent yawing motion (one in the front wing 106*a* and one in the rear wing 104*a* to prevent yawing motion), which will achieve a bank (or roll angle about the X-axis) to starboard side of the VTOL vehicle 100 which will move the VTOL vehicle 100 in the sideways starboard movement; at the same time, maintaining altitude by enhancing or increasing overall motor thrust to the engine modules 108*a*-108*h*. Alternatively, the Y lateral movement control axis for sideways starboard movement may also be achieved with the following engine module operations of: slow-down at least one set of engine modules on a starboard side rear wing 104*b* and at least one set of engine modules on a starboard side front wing 106*b*, where the direction of the rotors of each set of engine modules neutralise each other to prevent yawing motion (one in the front wing 106*b* and one in the rear wing 104*b* to prevent yawing motion), which will achieve a bank (or roll angle about the X-axis) to starboard side of the VTOL vehicle 100 which will move the VTOL vehicle 100 in the sideways starboard movement; at the same time, maintaining altitude by enhancing or increasing overall motor thrust to the engine modules 108*a*-108*h*. It is assumed that, since the flight mode is the vertical mode of flight, the engine modules that are not in the sped-up or slowed-down sets of engine modules have been tilted to have a direction of thrust along the Z-axis 514*c* in the opposite direction of the arrow of the Z-axis 514*c*.

In particular, the Y lateral movement control axis along the Y-axis 514*b* for a sideways portside movement of the VTOL vehicle 100 is a movement along the Y-axis 514*b* in the direction opposite to the arrow of the Y-axis 514*b*. The Y lateral movement control axis for sideways portside movement is achieved with the following engine module operations of: speed-up at least one set of engine modules on a starboard side rear wing 104*b* and at least one set of engine modules on a starboard side front wing 106*b*, where the direction of the rotors of each set of engine modules neutralise each other to prevent yawing motion (one in the front wing 106*b* and one in the rear wing 104*b* to prevent yawing motion), which will achieve a bank (or roll angle about the X-axis) to portside side of the VTOL vehicle 100 which will move the VTOL vehicle 100 in the sideways portside movement; at the same time, maintaining altitude by enhancing or increasing overall motor thrust to the engine modules 108*a*-108*h*. Alternatively, the Y lateral movement control axis for sideways portside movement may also be achieved with the following engine module operations of: slow-down at least one set of engine modules on a portside rear wing 104*a* and at least one set of engine modules on a portside front wing 106*a*, where the direction of the rotors of each set of engine modules neutralise each other to prevent yawing motion (one in the front wing 106*b* and one in the rear wing 104*b* to prevent yawing motion), which will achieve a bank (or roll angle about the X-axis) to portside of the VTOL vehicle 100 which will move the VTOL vehicle 100 in the sideways portside movement; at the same time, maintaining altitude by enhancing or increasing overall motor thrust to the engine modules 108*a*-108*h*. It is assumed that, since the flight mode is the vertical mode of flight, the engine modules that are not in the sped-up or slowed-down sets of engine modules have been tilted to have a direction of thrust along the Z-axis 514*c* in the opposite direction of the arrow of the Z-axis 514*c*.

In essence the Z lateral movement control axis along the Z-axis 514*c* for a upwards/downwards movement (move up/down) may be achieved by increasing or decreasing the engine module (or motor) thrust across at least four engine modules simultaneously to avoid pitch, roll, yaw to achieve climb/descend.

In particular, the Z lateral movement control axis along the Z-axis 514*c* for a upwards movement of the VTOL vehicle 100 is a movement along the Z-axis 514*c* in the direction of the arrow of the Z-axis 514*c*. The Z lateral movement control axis for upwards movement is achieved with the following engine module operations of: ensuring all engine modules 108*a*-108*h* have been tilted to have a direction of thrust along the Z-axis 514*c* in the opposite direction of the arrow of the Z-axis 514*c*; and increasing thrust or speeding-up the rotors of least one set of engine modules on one side of the VTOL vehicle 100 and at least one set of engine modules on the opposite side of the VTOL vehicle 100, where the direction of the rotors of each set of engine modules neutralise each other to prevent yawing motion, and where each set of engine modules has an equal number of engine modules.

In particular, the Z lateral movement control axis along the Z-axis 514*c* for a downwards movement of the VTOL vehicle 100 is a movement along the Z-axis 514*c* in the direction along the Z-axis 514*c* that is opposite to the arrow of the Z-axis 514*c*. The Z lateral movement control axis for downwards movement is achieved with the following engine module operations of: ensuring all engine modules 108*a*-108*h* have been tilted to have a direction of thrust along the Z-axis 514*c* in the opposite direction of the arrow of the Z-axis 514*c* (e.g. to maintain a hover); and decreasing the thrust or slowing-down the rotors of least one set of engine modules on one side of the VTOL vehicle 100 and at least one set of engine modules on the opposite side of the VTOL vehicle 100, where the direction of the rotors of each set of engine modules neutralise each other to prevent rolling and/or yawing motions, and where each set of engine modules has an equal number of engine modules (also to prevent yawing and/or rolling motions).

In essence, the Z yaw angular movement around the Z-axis 514*c* in the anti-clockwise/clockwise direction (e.g. Rotate the craft around Z-axis 514*c* or vertical axis (yaw)) may be achieved by invertedly changing engine module rotor speed of all clockwise spinning rotors compared to counter clockwise rotating rotors.

In particular, the Z yaw angular movement around the Z-axis 514*c* in the anti-clockwise direction may be performed by rotating the VTOL vehicle around the Z-axis 514*c* (yaw) in the anti-clockwise direction when viewed from a plan view of the VTOL vehicle 100 in the direction of arrow A in FIG. 1*a* or FIG. 5*b*. The anti-clockwise Z yaw angular movement is achieved with the following engine module operations of: invertedly changing or reducing the rotor speed of all clockwise spinning rotors compared to all counter clockwise (anti-clockwise) rotating rotors; and, optionally, at the same time, maintaining altitude by enhancing or increasing overall motor thrust to the engine modules 108a-108h.

In particular, the Z yaw angular movement around the Z-axis 514c in the clockwise direction may be performed by rotating the VTOL vehicle around the Z-axis 514c (yaw) in the clockwise direction when viewed from a plan view of the VTOL vehicle 100 in the direction of arrow A in FIG. 1a or FIG. 5b. The clockwise Z yaw angular movement is achieved with the following engine module operations of: invertedly changing or reducing the rotor speed of all anti-clockwise spinning rotors compared all clockwise rotating rotors; and, optionally, at the same time, maintaining altitude by enhancing or increasing overall motor thrust to the engine modules 108a-108h.

As indicated in 528a of FIG. 5c and also described above, changing rotor speed of selected clockwise and/or anti-clockwise spinning rotors may be used to generate Z yaw angular movement around Z-axis 514c (e.g. invertedly changing engine module rotor speed of all clockwise spinning rotors compared to counter clockwise rotating rotors). As well, as illustrated in 528a, tilt of the tilt mechanisms that tilt each engine module 108a-108h may be used to tilt one or more of the engine modules from vertical mode of flight operation, in which those selected engine modules are tilted such that thrust from rotors is substantially more in the X-axis direction depending on what type of Z yaw angular movement is needed whilst the other engine modules maintain a hover or the vertical mode of flight. Using tilt mechanism for some of the engine modules whilst maintaining vertical mode of flight allows Z-yaw angular movement around the Z-axis 514c. Such a configuration has the advantage of having higher control torques around the yaw axis for better and more rapid control, whilst avoiding a situation of motor signal saturation. For example, engine module 108d may be tilted such at least some of the thrust from the rotors is in the direction opposite to the X-axis arrow 514a, which means that the VTOL vehicle is rotated around the Z-axis 514c (yaw) in the anti-clockwise direction. Tilting an engine module 108a on the opposite side of the VTOL vehicle such that at least some of the direction of thrust from the rotors of the engine module 108a is in the direction of the X-axis arrow 514a may induce a faster rotation around the Z-axis 514c (yaw) in the anti-clockwise direction. In another example, engine module 108d may be tilted such at least some of the thrust from the rotors is in the direction of the X-axis arrow 514a, which means that the VTOL vehicle is rotated around the Z-axis 514c (yaw) in the clockwise direction. Tilting an engine module 108a on the opposite side of the VTOL vehicle such that at least some of the direction of thrust from the rotors of the engine module 108a is opposite the direction of the X-axis arrow 514a may induce a faster rotation around the Z-axis 514c (yaw) in the clockwise direction. Although engine modules 108d and 108a have been selected, this is by way of example only and the invention is not so limited, it is to be appreciated by the skilled person that any other of the engine modules 108a108h may be selected for tilting to induce or generate clockwise or anti-clockwise Z yaw angular movement.

The second flight mode 522b is the horizontal mode of flight (or flight/fixed wing mode) in which the engine modules 108a-108h are tilted such that the thrust from the rotors is substantially in the direction opposite to the arrow of the X-axis 514a and where the weight of the VTOL vehicle 100 is entirely carried by the uplift of the wings 104a-106b. The second flight mode 522b includes, by way of example only but is not limited to, a set control axes 524b, which may include the X lateral movement of accelerating or decelerating forwards along the X-axis 514a in the direction of the arrow of the X-axis 514a, and at least one of: X roll, Y pitch and Z yaw angular movement axes anti-clockwise and/or clockwise about the corresponding X, Y and Z axes 514a, 514b and 514c. The following describe some of the possible lateral and angular movements when the VTOL vehicle 100 is in the second flight mode 522d.

In essence, the X lateral acceleration/deceleration movement control axis for movement accelerating/decelerating forwards may be achieved by changing motor speed of at least one motor on each side of VTOL vehicle 100 (to avoid yaw motion).

In particular, the X lateral acceleration movement control axis for movement accelerating forwards is a movement the accelerates along the X axis 514a in the direction of the arrow of the X-axis 514a. The X lateral acceleration movement control axis for accelerated movement forwards is achieved with the following engine module operations of: increasing the thrust and/or increasing the speed of the rotors of at least one set of the engine modules on one side of the VTOL vehicle 100 whilst simultaneously increasing the thrust of and/or increasing the speed of the rotors of at least one set of the engine modules on the opposite side of the VTOL vehicle 100, where the direction of the rotors of each set of engine modules neutralise each other to prevent yawing motions, and each set of engine modules has the same number of engine modules.

In particular, the X lateral deceleration movement control axis for movement decelerating forwards is a movement the decelerates along the X axis 514a in the direction of the arrow of the X-axis 514a. The X lateral deceleration movement control axis for decelerated movement forwards is achieved with the following engine module operations of: decreasing the thrust and/or decreasing the speed of the rotors of at least one set of the engine modules on one side of the VTOL vehicle 100 whilst simultaneously decreasing the thrust of and/or decreasing the speed of the rotors of at least one set of the engine modules on the opposite side of the VTOL vehicle 100, where the direction of the rotors of each set of engine modules neutralise each other to prevent yawing motions, and each set of engine modules has the same number of engine modules.

In essence, Y pitch angular movement around the Y-axis 514b in a clockwise direction/anti-clockwise direction may induce a VTOL vehicle 100 pitch which will change the angle of attack and hence wing lift leading to ascend/descend of vehicle by tilting at least one motor on each side of the VTOL vehicle 100 either on rear wings or front wings.

In particular, the Y pitch angular movement around the Y-axis 514b in a clockwise direction may be performed by rotating the VTOL vehicle around the Y-axis 514b (pitch for climb) in the clockwise direction when viewed from a side view of the VTOL vehicle 100 in the direction of arrow 100F in FIG. 1a or in the direction of arrow of the Y-axis 514b. The clockwise Y pitch angular movement or climb is achieved with the following engine module operations of: inducing vehicle pitch angle that will increase the angle of attack of the wings and hence generate more wing lift (up to a certain limit called the critical angle of attack or "stall angle of attack") by tilting (or pivoting) at least one set of the engine modules of the front wing 106a on one side of the VTOL vehicle 100 whilst simultaneously tilting (or pivoting) at least one set of the engine modules of the front wing 106b on the opposite side of the VTOL vehicle 100, to avoid a banking motion, and/or increasing the rotor speed (RPM or motor speed) of the tilted sets of engine modules simultaneously to increase the rate of climb. Each set of engine modules may have the same number of engine modules to avoid banking. Each of the sets of tilted engine modules are pivoted or tilted about their corresponding tilt axes 107e-107h of the engine modules in each tilted set such that an Z-axis component of thrust output from the tilted sets of engine modules is in the direction opposite of the arrow of the Z-axis 514c (i.e. tilted downwards, or thrust is directed downwards). It is assumed that, since the flight mode is the horizontal mode of flight, the remaining engine modules that are not in the tilted sets of engine modules have been tilted to have a direction of thrust substantially along the X-axis 514a in the opposite direction of the arrow of the X-axis 514a.

In particular, the Y pitch angular movement around the Y-axis 514b in an anti-clockwise direction may be performed by rotating the VTOL vehicle 100 around the Y-axis 514b (pitch or descent/downward) in the anti-clockwise direction when viewed from a side view of the VTOL vehicle 100 in the direction of arrow 100F in FIG. 1a. The anti-clockwise Y pitch angular movement or descent is achieved with the following engine module operations of: inducing vehicle pitch angle that will decrease the angle of attack of the wings and hence generate less wing lift by tilting (or pivoting) at least one set of the engine modules of the rear wing 104a on one side of the VTOL vehicle 100 whilst simultaneously tilting (or pivoting) at least one set of the engine modules of the rear wing 104b on the opposite side of the VTOL vehicle 100, to avoid a banking motion, and/or increasing the rotor speed (RPM or motor speed) of the tilted sets of engine modules simultaneously to increase the rate of descent. Each set of engine modules may have the same number of engine modules to avoid banking. Each of the sets of tilted engine modules are pivoted or tilted about their corresponding tilt axes 107a-107d of the engine modules in each tilted set such that an Z-axis component of thrust output from the tilted sets of engine modules is in the direction opposite of the arrow of the Z-axis 514c (i.e. tilted downwards, or thrust is directed downwards). It is assumed that, since the flight mode is the horizontal mode of flight, the remaining engine modules that are not in the tilted sets of engine modules have been tilted to have a direction of thrust substantially along the X-axis 514a in the opposite direction of the arrow of the X-axis 514a.

The Z yaw angular movement around the Z-axis 514c in the anti-clockwise direction may be performed by rotating the VTOL vehicle around the Z-axis 514c (yaw) in the anti-clockwise direction when viewed from a plan view of the VTOL vehicle 100 in FIG. 5b (e.g. into page). The anti-clockwise Z yaw angular movement is achieved with the following engine module operations of: increasing the rotor speed of at least one engine module on at least one of the starboard side wings 104b or 106b and/or decreasing the rotor speed of at least one engine module on at least one of the port side wings 104a or 106a to induce a Z-yaw about the Z-axis 514c in the anti-clockwise direction; and, optionally, at the same time, maintaining acceleration by increasing or decreasing overall motor thrust to the engine modules 108a-108h.

The Z yaw angular movement around the Z-axis 514c in the clockwise direction may be performed by rotating the VTOL vehicle around the Z-axis 514c (yaw) in the clockwise direction when viewed from the plan view of the VTOL vehicle 100 in FIG. 5b. The clockwise Z yaw angular movement is achieved with the following engine module operations of: reducing the rotor speed of at least one engine module on at least one of the starboard side wings 104b or 106b and/or increasing the rotor speed of at least one engine module on at least one of the port side wings 104a or 106a to induce a Z-yaw about the Z-axis 514c in the clockwise direction; and, optionally, at the same time, maintaining acceleration by increasing or decreasing overall motor thrust to the engine modules 108a-108h.

In essence, left and right turns (e.g. a turn to port side or a turn towards the starboard side of the VTOL vehicle 100) may be achieved by induce a bank by tilting at least one engine module on one side oppositely to tilting at least one engine module on other side of VTOL vehicle 100, once the desired bank has been achieved augment turn motion through pitch, yaw and/or acceleration engine control operations as described above.

In particular, the X roll angular movement around the X-axis 514a in the anti-clockwise direction may be performed by rotating the VTOL vehicle around the X-axis 514a (roll) or longitudinal axis 103 in the anti-clockwise direction when viewed from a rear view of the VTOL vehicle 100 in the direction of arrow 100D of FIG. 1a, i.e. FIG. 1e. The anti-clockwise X roll angular movement induces a bank of the VTOL vehicle 100 in which the starboard side wings 104b and 106b rise upwards in a direction of the arrow of the Z-axis 514c, whilst the port side wings 104a and 106a dip downwards or in the direction of the Z-axis 514c that is opposite the arrow of the Z-axis 514c. Thus, in addition to performing the anti-clockwise X roll angular movement (or bank to port), the VTOL vehicle 100 may also change direction and turn towards port (or left of the VTOL vehicle 100 when viewed from the arrow 100D of FIG. 1e).

The anti-clockwise X roll angular movement is achieved with the following engine module operations of: tilting (or pivoting) at least one set of the engine modules of at least one of the port side wings 104a or 106a on one side of the VTOL vehicle 100 whilst simultaneously tilting (or pivoting) at least one set of the engine modules of at least one of the starboard side wings 104b or 106b on the opposite side of the VTOL vehicle 100. Referring to FIG. 5b, the set of tilted engine modules on the starboard side of the VTOL vehicle 100 are pivoted or tilted about their corresponding tilt axes 107g, 107h, 107c, 107d of the engine modules in each tilted set such that an Z-axis component of thrust output from this tilted set of engine modules is directed opposite the direction of the arrow of the Z-axis 514c in FIG. 5c (i.e. engine modules tilted to direct thrust downwards) so the starboard wings 104b and 106b move upwards. The set of tilted engine modules on the port side of the VTOL vehicle 100 are pivoted or tilted about their corresponding tilt axes 107a, 107b, 107e, 107f of the engine modules in each tilted set such that an Z-axis component of thrust output from this tilted set of engine modules is initially directed in the direction to the arrow of the Z-axis 514c (i.e. engine modules tilted to direct thrust upwards). Once the desired bank to port has been achieved the, the turn motion may be augmented through the corresponding Y pitch, X acceleration, and/or Z yaw engine module operations as described. It is assumed that, since the flight mode is the horizontal mode of flight, the remaining engine modules that are not in the tilted sets of engine modules have been tilted to have a direction of thrust substantially along the X-axis 514a in the opposite direction of the arrow of the X-axis 514a.

In particular, the X roll angular movement around the X-axis 514a in the clockwise direction may be performed by rotating the VTOL vehicle around the X-axis 514a (roll) in the clockwise direction when viewed from a rear view of the VTOL vehicle 100 in the direction of arrow 100D of FIG.

1a, i.e. FIG. 1e. The clockwise X roll angular movement induces a bank of the VTOL vehicle 100 in which the starboard side wings 104b and 106b dip downwards or in a direction of the Z-axis 514c opposite the arrow of the Z-axis 514c, whilst the port side wings 104a and 106a rise upwards or in the direction of the Z-axis 514c of the arrow of the Z-axis 514c, a turn towards the starboard side of the VTOL vehicle 100. Thus, in addition to performing the clockwise X roll angular movement (or bank to starboard), the VTOL vehicle 100 may also change direction and turn to starboard.

The clockwise X roll angular movement is achieved with the following engine module operations of: tilting (or pivoting) at least one set of the engine modules of at least one of the starboard side wings 104b or 106b on one side of the VTOL vehicle 100 whilst simultaneously tilting (or pivoting) at least one set of the engine modules of at least one of the port side wings 104a or 106a on the opposite side of the VTOL vehicle 100. Referring to FIG. 5b, the set of tilted engine modules on the port side of the VTOL vehicle 100 are pivoted or tilted about their corresponding tilt axes 107a, 107b, 107e, 107f of the engine modules in each tilted set such that an Z-axis component of thrust output from this tilted set of engine modules is directed in the direction opposite the arrow of the Z-axis 514c (i.e. engine modules tilted to direct thrust downwards). The set of tilted engine modules on the starboard side of the VTOL vehicle 100 are pivoted or tilted about their corresponding tilt axes 107c, 107d, 107g, 107h of the engine modules in each tilted set such that an Z-axis component of thrust output from this tilted set of engine modules is initially directed the direction of the arrow of the Z-axis 514c (i.e. engine modules tilted to direct thrust upwards). Once the desired bank to starboard has been achieved the, the turn motion may be augmented through the corresponding Y pitch, X acceleration, and/or Z yaw engine module operations. It is assumed that, since the flight mode is the horizontal mode of flight, the remaining engine modules that are not in the tilted sets of engine modules have been tilted to have a direction of thrust substantially along the X-axis 514a in the opposite direction of the arrow of the X-axis 514a.

The transition from the first flight mode 522a (e.g. the vertical mode of flight or hover) to the second flight mode 522b (e.g. the horizontal mode of flight) may be achieved by, by way of example only but is not limited to, slowly tilting the engine modules 108a-108h from a horizontal orientation (e.g. where the thrust of the engine modules 108a-108h has a substantial Z component that is substantially in the direction of the Z-axis 514c directed opposite to the arrow of the Z-axis 514c) into a vertical orientation (e.g. where the thrust of the engine modules 108a-108h has a substantial X component that is substantially in the direction of the X-axis 514c directed opposite to the arrow of the X-axis 514c or opposite the direction of flight 512) whilst at the same time blending control inputs (e.g. from both the first and second flight modes) to the engine modules and/or tilt mechanisms in line with the degree to which transition has been achieved.

Figure 5D:
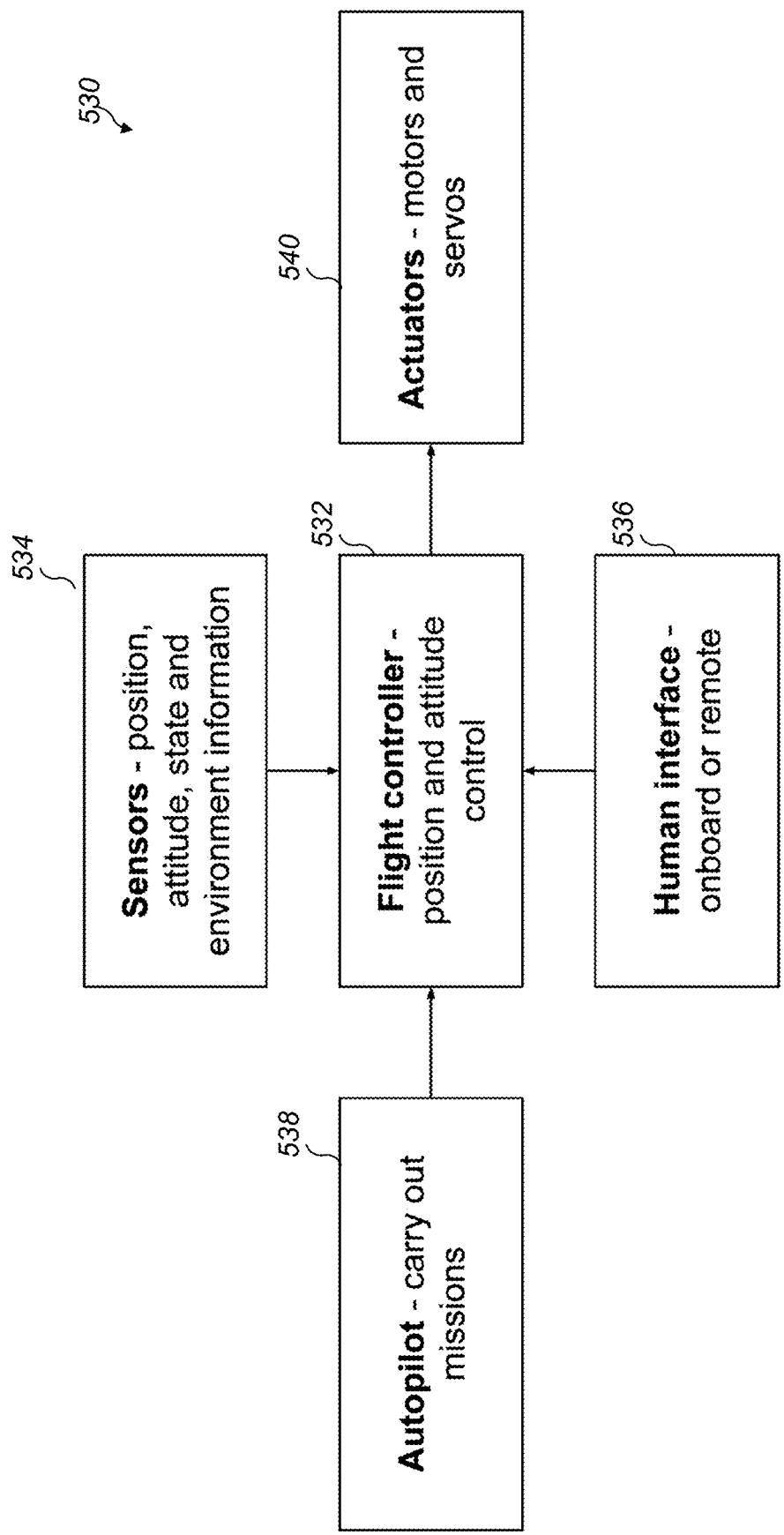
FIG. 5d is a schematic diagram illustrating an example control system for operating the example VTOL vehicle according to the invention.

FIG. 5d is a schematic diagram illustrating an example on-board flight control system 530 for operating an example VTOL vehicle 100 and/or other VTOL vehicles as described with respect to one or more of FIGS. 1a-5c according to the invention. For simplicity, reference numerals of VTOL vehicle 100 of FIG. 1a will be used, but it is to be appreciated by the skilled person that these may apply to other VTOL vehicles (e.g. VTOL vehicles 130, 140, 410-450 and the like), combinations thereof, modifications thereto and/or as described herein. The flight control system 530 includes a flight controller device 532 configured for receiving control input data from one or more of: a sensor suite 534 of one or more sensors (not shown); a user or human interface device 536; and an autonomous or autopilot device 538. The flight controller device 532 processes the received control input data and controls the engine modules of the VTOL vehicle 100 via an engine control or actuator system 540 in response to the processed control input data.

The sensor suite 534 or a set of sensor(s) comprises one or more sensors or a plurality of sensors. Each of the sensor(s) provides data representative of a sensor signal for use by the flight controller device 532 to control the operation and/or flight of the VTOL vehicle 100. The set of sensors 534 may provide data for assisting with the control and operation of the VTOL vehicle 100 when operating autonomously, semi-autonomously, remote controlled, and/or piloted by a human operator/user. Examples of sensors for use with the VTOL vehicle 100 may include, by way of example only but is not limited to, one or more of accelerometer(s); gyroscope(s); range sensor(s) for estimating distance to obstacles (e.g. stereoscopic cameras, light detection and ranging (LIDAR), sonar, radar, ultrasound sensors, and the like); altimeters; computer vision systems; relative motion sensor(s) for detecting position and motion relative to ground or other objects (e.g. visual camera); magnetometers; global positioning system (GPS) sensors or receivers; speed sensors; level sensors; airspeed sensors; position control means using electromagnetic waves between vehicle and ground stations (e.g. radio or telecommunications systems); temperature sensors; infra-red sensors; night vision sensors and the like; weather radar; and/or any other sensor or sensor equipment suitable for assisting the control and/or operation of the VTOL vehicle during operation.

The flight controller device 532 may be configured to use the engine control process(es) 500 and the set of flight modes 522a and 522b as described with reference to FIGS. 5a-5c to control the engine modules 108a-108h independently, and/or control a set of engine modules of the engine modules 108a-108h in unison. The flight controller device 532 may be configured to control the motor RPM and tilt mechanisms of each of the engine modules 108a-108h to give the VTOL vehicle 100 the desired, by way of example only but not limited to, attitude, orientation, speed and altitude. The flight controller device 532 may receive instructions to control the engine modules through inputs by a human user via the user interface device 536, or an autonomous device 538 or a machine/autopilot 538 either on board the VTOL vehicle 100 and/or remotely. For example, the flight controller device 532 may be configured to control, by way of example only but is not limited to, one or more of the modes of flight operation of the VTOL vehicle 100 (e.g. the set of flight modes 522a and/or 522b and transitioning there between), speed, position, direction, orientation and/or flight path of the VTOL vehicle 100 and other aspects of the VTOL vehicle 100 as the application demands. Thus, the flight control system 530 may further include one or more power sources connected to the engine modules 108a-108h of the VTOL vehicle 100, in which the flight controller device 532 uses the engine control device 540 to control the power source(s) and the engine modules 108a-108h and hence control, by way of example only but not limited to, the mode of operation of the VTOL vehicle 100, flight path, position, orientation, speed and attitude of the VTOL vehicle 100 and the like.

Additionally or alternatively, the flight control system 530 may further include a user interface device 536 coupled to the flight controller device 532, where the flight controller device 532 is configured for controlling one or more of the engine modules 108a-108h in response to a user position, speed or directional input from the user interface. The user interface device 536 may comprise or represent any one or more devices that is configured to receive user input in relation to controlling the VTOL vehicle 100. Examples of user interface device 536 according to the invention may include, by way of example only but is not limited to, one or more or a combination of a touch screen device(s), keyboard(s), control panel(s), control console(s), joy stick, pedals, steering wheel and any other device allowing a user to control the flight path and/or direction, take-off and landing of the VTOL vehicle 100 and the like. The user interface device 536 allows a human pilot within the VTOL vehicle 100 to pilot the VTOL vehicle with the assistance of the flight controller, which manages and controls the multiple engine modules 108a-108h to implement the desired user input received from the user interface device. Thus, a user of the VTOL vehicle 100 does not need to understand or know how to control, by way of example only but not limited to, the thrust, RPM, or pivot of each of the individual engine modules 108a-108h in order to pilot the VTOL vehicle 100. Rather, the user uses the user interface device to input the desired flight path, direction, orientation, speed, attitude, hover, take-off and landing and other inputs of the VTOL vehicle 100.

Additionally or alternatively to the user interface device 536, the flight control system may further include an autonomous interface device coupled the flight controller. The autonomous interface may include or be coupled to one or more communication interfaces for communicating with a remote operations centre. The autonomous interface is configured for interpreting mission or session instructions/commands from the remote operations centre, and based on the mission instructions/commands to autonomously direct the flight controller device to operate the VTOL vehicle 100 in accordance with the mission instructions/commands received from the remote operations control centre.

Figure 6A:
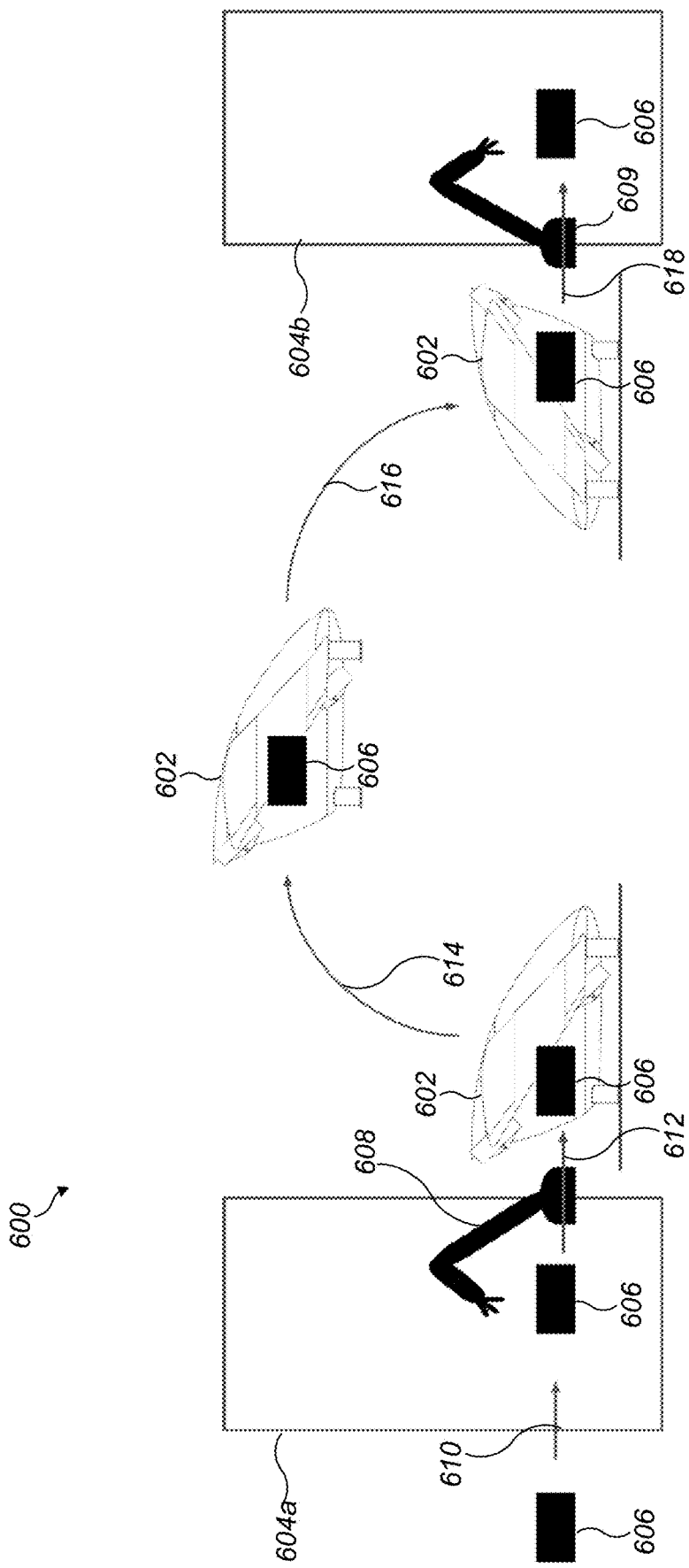
FIG. 6a is a schematic flow diagram illustrating an example parcel delivery scenario for use with an example VTOL vehicle according to the invention.

FIG. 6a is a schematic flow diagram illustrating an example parcel delivery system 600 that uses an example VTOL vehicle 602 according to the invention. The VTOL vehicle 602 may be an autonomous or semi-autonomous VTOL vehicle 602 that is in communication with an operations centre or depot 604a. The parcel delivery system 600 may include one or more VTOL vehicles 600 according to the invention and/or as described with respect to FIGS. 1a to 5d, combinations thereof, modifications thereof, and or as described herein. The parcel delivery system 600 may also include an operations centre or depot 604a in communication with the VTOL vehicle 602, the operations centre or depot 604a configured for sending mission instructions/commands to the VTOL vehicle 602 during operation. The VTOL vehicle 602 may autonomously, semi-autonomously or remotely operated according to the mission instructions/commands. The parcel delivery system is configured for ensuring the VTOL vehicle 602 performs a parcel delivery function based on remotely/autonomously controlling the VTOL vehicle 602 to/from the depot 604a to the delivery site 604b for receiving a parcel or package 606 delivered by VTOL vehicle 602. It is assumed the VTOL vehicle 602 is fuelled up and/or charged up and is ready to operate to deliver the parcel 606. The parcel delivery system may be configured to implement a parcel delivery method according to the following steps of:

In step 610, a parcel 606 enters the depot 604a with a request to deliver to another distribution site 604b before delivering to the end customer (not shown). There can be a particular urgency attached with the delivery of the parcel 606 which may, by way of example only but is not limited to, a cost if requirement was fulfilled using conventional transport (this may trigger decision to delay the delivery). Instead, given VTOL vehicle 602 is available rather than conventional transport, in step 612 the parcel 606 is transported to a take-off site where VTOL vehicle 602 may be situated and may be grouped, if necessary, with other parcels sharing the same destination 604b. The depot 604a may communicate the mission plan/instructions such as, by way of example only but not limited to, delivery site 604b for parcel 606, time of delivery and any other required information to allow VTOL vehicle 602 to autonomously and/or semi-autonomously or remotely deliver the parcel to the delivery site 604b. The cargo bay of the VTOL vehicle 602 can be loaded with parcels 606 by a robotic arm/mechanism 608 which may also secure the cargo. Alternatively, the loading of the VTOL vehicle 602 may be performed by a worker of the depot 604a.

Prior to take-off, the VTOL vehicle 602 may carry out weight and balance calculations and optimises flight path according to the mission plan/instructions taking into consideration weather, air traffic, other environmental factors and the like etc. The robotic arm 608 (or worker) disengages from loading of VTOL vehicle 602 and can optionally support the closing of the cargo doors of the VTOL vehicle 602, which can be locked by the on-board flight control system. The flight control system of the VTOL vehicle 602 runs the take-off procedures (e.g. vertical mode of flight) etc. In step 614, the VTOL vehicle 602 autonomously launches into a vertical mode of flight, transitions from a vertical mode of flight to a horizontal mode of flight as described with reference to FIGS. 1a to 5d to fulfil the mission plan and delivery to depot delivery site 604b. In step 616, upon arrival, the VTOL vehicle 602 autonomously transitions from a horizontal mode of flight to a vertical mode of flight where the flight control system of the VTOL vehicle 602 runs its landing routine and touches down at the delivery site 604b. In step 618, another robotic arm 609 (or a worker) opens the cargo bay of the VTOL vehicle 602 and takes the parcel 606 and/or other parcels from the VTOL vehicle 602. The parcel 606 is processed for delivery to the customer and/or the next destination on route to the customer. The VTOL vehicle 602 may be reloaded, recharged and/or refuelled for delivering another load of parcels to the depot 604a and/or any other depot that may be in a network of depots/delivery sites. Multiple VTOL vehicles may be controlled and managed by the operations centre/depot 604a in the parcel delivery system 600.

Figure 6B:
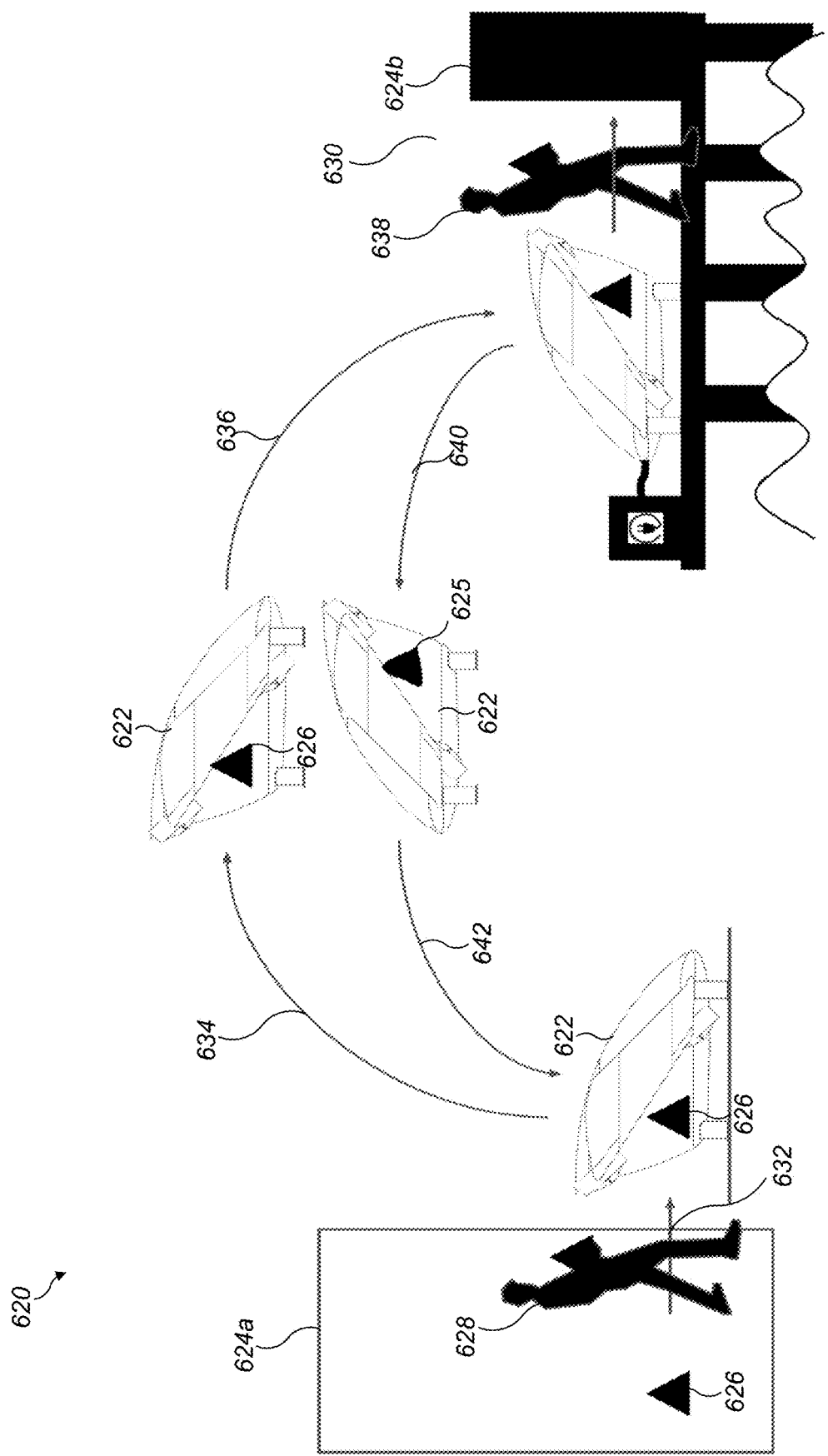
FIG. 6b is a schematic flow diagram illustrating another example spare parts delivery scenario for use with an example VTOL vehicle according to the invention.

FIG. 6b is a schematic flow diagram illustrating an example delivery system 620 for, by way of example only but not limited to, emergency supply deliveries, industrial spare parts, or heavy machinery for use with an example VTOL vehicle 622 according to the invention. The VTOL vehicle 622 may be capable of lifting heavy industrial spare parts and/or machinery and the like. Alternatively, the VTOL vehicle 622 may be capable of lifting emergency supply deliveries (e.g. medical supplies, foodstuffs, emergency equipment, survival equipment and the like) and the like.

The VTOL vehicle 622 may be an autonomous or semi-autonomous VTOL vehicle 622 that is in communication with an operations centre. The delivery system 620 may include one or more VTOL vehicles 622 according to the invention and/or as described with respect to FIGS. 1a to 5d, combinations thereof, modifications thereof, and or as described herein. The delivery system 620 may also include an operations centre in communication with the VTOL vehicle 622, the operations centre configured for sending mission instructions/commands or a mission plan to the VTOL vehicle 622 during operation. The VTOL vehicle 622 may autonomously, semi-autonomously or be remotely operated according to the mission instructions/commands/plan. The delivery system 620 may be configured for ensuring the VTOL vehicle 622 performs the required delivery function such as, by way of example only but not limited to, an emergency delivery function, a remote delivery function, off-shore heavy/industrial spare parts delivery, by picking up a delivery from an origin site 624*a* and transporting the deliver to a delivery site 624*b* that may be inaccessible and/or too costly for delivery by conventional delivery systems.

In this example, the VTOL vehicle 622 is configured for delivery of industrial spare parts that are required at a remote off-shore location. This example may be applied to any of the other forms of delivery, by way of example but not limited to, an emergency delivery function, a remote delivery function, off-shore heavy/industrial spare parts delivery, to a delivery site 624*b* that may be inaccessible and/or too costly for delivery by conventional delivery systems. In such cases, an appropriately sized VTOL vehicle may be resourced and used for the delivery.

In this example of delivering industrial spare parts, the VTOL vehicle 622 may be remotely/autonomously controlled to/from the operations control centre to an origin site 624*a* for loading the required spare part 626 and then to the delivery site 624*b* for receiving the requested delivery 626 delivered by VTOL vehicle 602. It is assumed the VTOL vehicle 602 is fuelled up and/or charged up and is ready to operate to deliver the industrial spare part(s) 626. The delivery system 620 may be configured to implement a delivery method according to the following steps of:

In step 630, a transport need for a new industrial spare part 626 (or cargo, emergency supplies or any other necessity) arises at certain remote inaccessible or off-shore site (e.g. a mountainous region, remote region, an oil platform, ship or remote island, and the like). The origin site 624*a* and stocks of the spare part 626 are identified (e.g., from inventory, online or satellite communications etc.). A VTOL vehicle delivery flight request is sent out to the operations control centre for the pick-up of the spare part 626 from the origin site 624*a* and delivery to the delivery site 624*b*. The operations control centre may send a flight request to the VTOL vehicle 622 that includes the mission plan/requirements. The VTOL vehicle 622 may assess the mission requirements/plan regarding feasibility, safety, etc. based on landing/take-off sites (e.g. origin site, delivery site etc.), weather, payload (e.g. the spare parts 626), battery charging facilities at the remote delivery site 624*b*, etc. If VTOL vehicle 622, is not already there, it is relocated to origin site 624*a* for collection of the new spare part. In step 632, a worker 628 (or robot arm) secures the cargo (e.g. spare parts 626) in the cargo bay of the VTOL vehicle 622.

Prior to take-off, the VTOL vehicle 622 may carry out weight and balance calculations and optimises flight path according to the mission plan/instructions taking into consideration weather, air traffic, other environmental factors and the like etc. The flight control system of the VTOL vehicle 622 runs the take-off procedures (e.g. vertical mode of flight) etc. In step 634, the VTOL vehicle 622 autonomously launches into a vertical mode of flight, transitions from a vertical mode of flight to a horizontal mode of flight as described with reference to FIGS. 1*a* to 5*d* to fulfil the mission plan and delivery to delivery site 624*b*. In step 636, upon arrival at the remote delivery site 624*b*, the VTOL vehicle 622 autonomously transitions from a horizontal mode of flight to a vertical mode of flight where the flight control system of the VTOL vehicle 622 assesses where to land and runs its landing routine and touches down at the delivery site 624*b*. In step 638, another worker opens the cargo bay of the VTOL vehicle 622 and takes the new spare part 626 from the VTOL vehicle 622. The worker may also load the old part 625 that is being replaced by the new spare part 626. The old part 625 may be delivered to the origin site 624*a*, home base or other delivery site for disposal, repair and reconditioning or recycling etc. Meanwhile, if necessary the VTOL vehicle 622 may refuel and/or recharge prior to returning the old part 625 to the origin site 624*a*, home base and/or any other destination.

Prior to take-off, the VTOL vehicle 622 may carry out weight and balance calculations and optimises flight path according to the mission plan/instructions taking into consideration weather, air traffic, other environmental factors and the like etc. The flight control system of the VTOL vehicle 622 runs the take-off procedures (e.g. vertical mode of flight) etc. In step 640, the VTOL vehicle 622 autonomously launches into a vertical mode of flight, transitions from a vertical mode of flight to a horizontal mode of flight as described with reference to FIGS. 1*a* to 5*d* to fulfil the remainder of mission plan and delivery to the origin site 624*a* or home base and the like. In step 642, upon arrival at the origin site 624*a* or home base, the VTOL vehicle 622 autonomously transitions from a horizontal mode of flight to a vertical mode of flight where the flight control system of the VTOL vehicle 622 assesses where to land and runs its landing routine and touches down at the origin site 624*a* or home base and the like. Another worker 628 may open the cargo bay of the VTOL vehicle 622 and take the old part 625 from the VTOL vehicle 622 for disposal, repair and reconditioning or recycling etc. Meanwhile, if necessary the VTOL vehicle 622 may refuel and/or recharge prior to returning, if not already there, to home base and/or any other destination.

Figure 6C:
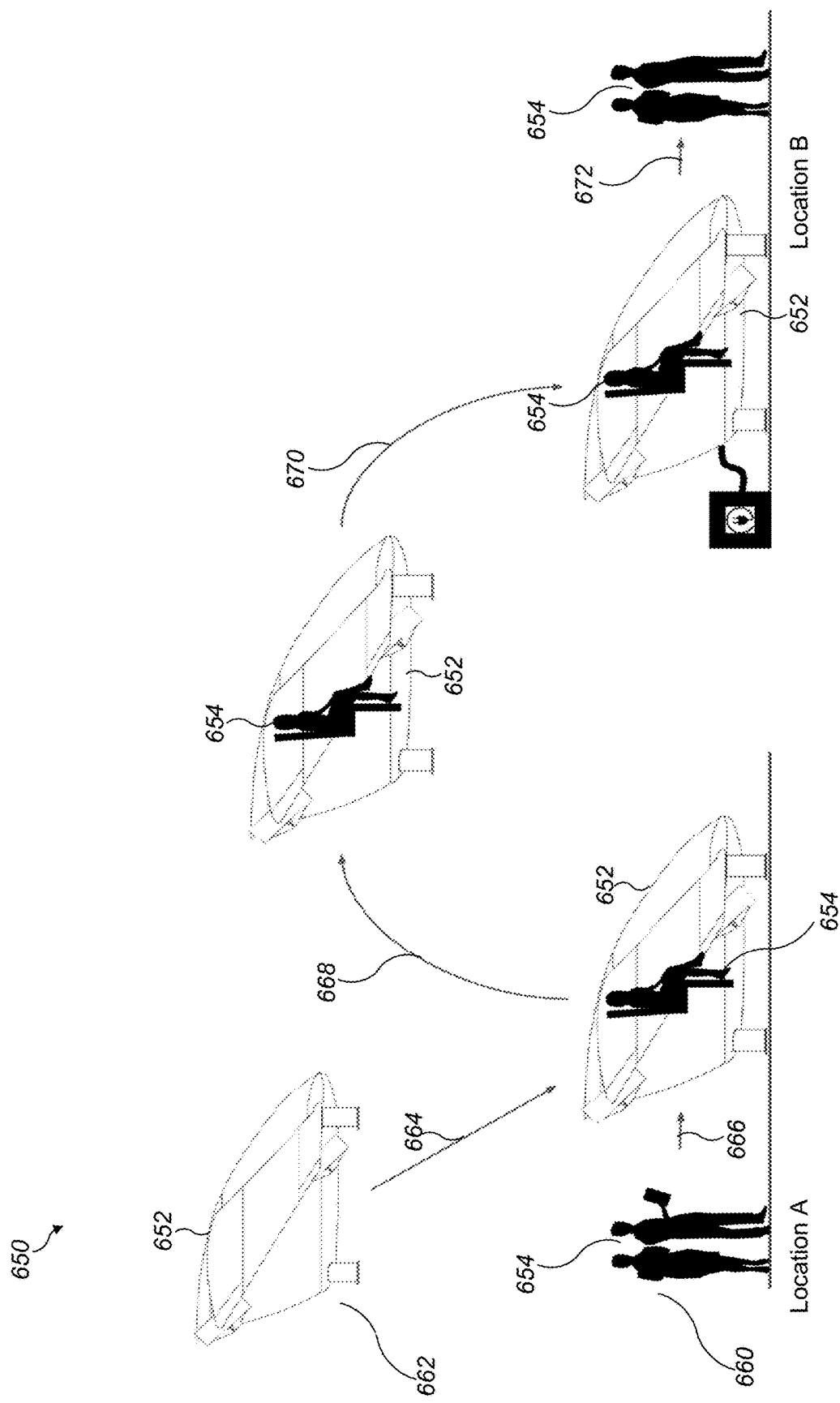
FIG. 6c is a schematic flow diagram illustrating a example passenger transport scenario for use with an example VTOL vehicle according to the invention.

FIG. 6*c* is a schematic flow diagram illustrating a example passenger transport system 650 for use with an example VTOL vehicle 652 according to the invention. The VTOL vehicle 652 may be designed to be capable of lifting a group of passengers 654 and the like. the group of passengers may include at least one passenger, or two or more passengers, or a plurality of passengers. Depending on the numbers of passengers and appropriate VTOL vehicle according to the invention with the correct lifting capacity may be provided to transport the group of passengers. The VTOL vehicle according to the invention is capable of being designed for lifting a plurality of passengers or personnel and the like. In this example, the group of passengers 654 includes, by way of example only but is not limited to, two passengers. Thus, the VTOL vehicle 652 is capable of transporting at least two passengers and/or corresponding luggage etc.

The VTOL vehicle 652 may be an autonomous or semi-autonomous VTOL vehicle 652 that is in communication with an transport operations centre. The transport system 650 may include one or more VTOL vehicles 652 according to the invention and/or as described with respect to FIGS. 1*a* to 5*d*, combinations thereof, modifications thereof, and or as described herein. The delivery system 650 may also include the transport operations centre which is in communication with the VTOL vehicle 652. The transport operations centre configured for sending mission instructions/commands or a mission plan to the VTOL vehicle 652 during operation. The VTOL vehicle 652 may autonomously, semi-autonomously or be remotely operated according to the mission instructions/commands/plan. The transport system 650 may be configured for ensuring the VTOL vehicle 652 performs the required pick-up and transport of a group of passengers 654 from a location A to a location B that may be too inaccessible, remote, have a lack of transport services, or that convention transport services are too slow or too costly.

In this example of transporting passengers 654, the VTOL vehicle 652 may be remotely/autonomously controlled to/from the transport operations control centre (e.g. air-taxi service) to location A for pick-up of the required group of passengers 654 and then to transport the group of passengers 654 to location B. It is assumed the VTOL vehicle 602 is fuelled up and/or charged up and is ready to operate to pick-up and transport the group of passengers 654. The transport system 650 may be configured to implement a transport method according to the following steps of:

In step 660, a group of passenger(s) 654 have a need to be transported from location A to a location B. The group of passenger(s) request 654 a VTOL vehicle 652 (e.g., through a handheld device, smart phone or other communications device). The handheld device may have a VTOL transport app for requesting the closest VTOL vehicle 652, the request of which is sent to the transport operations centre. Alternatively, a passenger from the group of passengers may call the transport operations centre and request a VTOL vehicle 652 in a similar manner as requesting a conventional taxi. Once the request is received by the transport operations centre is it assessed for identifying a nearby VTOL vehicle 652. Alternatively, the VTOL transport app may show nearby free VTOL vehicles 652, which may assess the request. The request is denied by the operations centre and/or the VTOL vehicle 652 if it cannot be fulfilled.

In step 662, a nearby VTOL vehicle 652 redirected to the pick-up point at location A. Alternatively or additionally, the nearby VTOL vehicle 652 may be sent a mission plan, from the transport operations centre, associated with the request for transporting the group of passengers 654 from location A to location B. The VTOL vehicle 652 is directed, based on the request and/or the mission plan, to the pick-up point at location A.

In step 664, upon arrival at location A, the VTOL vehicle 652 autonomously transitions from a horizontal mode of flight to a vertical mode of flight where the flight control system of the VTOL vehicle 652 assesses where to land and runs its landing routine and touches down at location A. Once the VTOL vehicle 652 reaches the pick-up point at location A, the batteries may require charging or the VTOL vehicle 652 may need refuelling. The pick-up point at location A may have the required facilities to recharge/refuel the VTOL vehicle 652. The group of passenger(s) 654 may wait for the VTOL vehicle 652 to be recharged. Meanwhile, prior to take-off, the VTOL vehicle 622 may carry out weight and balance calculations and optimises flight path according to the mission plan/instructions taking into consideration weather, air traffic, other environmental factors and the like etc.

In step 666, the group of passenger(s) 654 are informed that the journey can be started and enter the VTOL vehicle 652. The group of passenger(s) 654 arrives at the VTOL vehicle and enters the VTOL vehicle. The VTOL vehicle doors may be locked automatically, checks are made to ensure the passenger(s) 654 are safely harnessed/secured, a briefing may be given to the passenger(s) 654, weight and balance and flight mission plan is generated/adjusted.

In step 668, the flight mission plan is executed once its assessment has been completed successfully. The flight control system of the VTOL vehicle 652 runs the take-off procedures (e.g. vertical mode of flight) etc. The VTOL vehicle 652 autonomously launches into a vertical mode of flight, transitions from a vertical mode of flight to a horizontal mode of flight as described with reference to FIGS. 1*a* to 5*d* to fulfil the remainder of flight mission plan and transport of the group of passenger(s) 654 to location B. In step 670, upon arrival at the set-down site at location B, the VTOL vehicle 652 autonomously transitions from a horizontal mode of flight to a vertical mode of flight where the flight control system of the VTOL vehicle 652 assesses where to land and runs its landing routine and touches down at the set-down site at location B. In step 672, the group of passenger(s) 654 exits the VTOL vehicle 654 and the mission is completed. Meanwhile, if necessary the VTOL vehicle 652 may refuel and/or recharge prior to returning to active service, and/or stands by for the next transport mission, and/or returns, if necessary, for servicing/cleaning at a service centre and/or any other destination.

As described with reference to FIGS. 1*a*-6*c* the VTOL vehicle according to the invention is capable of taking-off into a vertical mode of flight (e.g. first flight mode or hover), transitioning between a vertical mode of flight to a horizontal mode of flight (e.g. second flight mode or flight in which the wings of the VTOL vehicle carry the weight of the VTOL vehicle).

In operation the VTOL vehicle may take-off and manoeuvre from vertical mode of flight (e.g. VTOL) to the horizontal mode of flight. In the following the VTOL vehicle may be piloted and/or it may be operating autonomously or semi-autonomously. Initially, prior to take-off, the pilot or even the VTOL vehicle when operating autonomously, may prepare all pre-flight checks, perform mission planning based on the mission instructions/commands and/or weather and other environmental factors, and even perform air traffic control interaction. The VTOL vehicle may then orient itself according to ambient conditions due to, for example, wind or slope. The VTOL vehicle then operates to align all rotors (or engine modules) horizontally or in a horizontal plane so that thrust is directed towards the ground. The rotors are powered up via the flight control system to approximately 80-90% of available power to achieve lift-off. The flight control system of the VTOL vehicle continuously works in vertical mode of flight (e.g. hover control mode) and monitors all environmental variables (wind, temperature, altitude, etc.) and adjusts the engine modules independently according to the flight plan. The VTOL vehicle may revert to a landing procedure or execute an emergency procedure in case of malfunction and the like. Otherwise the VTOL vehicle may transition from the vertical mode of flight to the horizontal mode of flight.

When transitioning from the vertical mode of flight (e.g. Hover) to the horizontal mode of flight (e.g. flight mode transition), the flight control system of the VTOL vehicle may tilt all engine modules (e.g. rotors) to accelerate the VTOL vehicle along a flight path direction while using multi-copter control logic, and/or the engine configuration and control as described with reference to FIGS. 1*a*-6*c*. The angle of attack of the VTOL vehicle wings may be increased to increase the lift component generated from wings whilst at the same time the engine modules (or rotors) are continuously rotated into a vertical position (or where the thrust from the engine modules is substantially directed along the wing chord and towards the rear of the VTOL vehicle, i.e. in the opposite direction of the direction of flight. The flight control system also switches from vertical mode of flight (e.g. hover control mode) to the horizontal mode of flight (e.g. horizontal flight control mode). Once the horizontal mode of flight is fully achieved, where all lift is generated by wings, the flight control system fully switches into the horizontal mode of flight control mode and maintains stable flight conditions along the flight path as determined by the flight control system, or the pilot (if any). The VTOL vehicle may abort or execute emergency procedure in case of malfunction, in which it may attempt to enter the vertical mode of flight and land or alternatively deploy emergency procedures, e.g. deploy a parachute and the like.

The VTOL vehicle may then begin landing procedure by manoeuvring from the horizontal mode of flight to the vertical mode of flight (e.g. from horizontal to VTOL flight). This is may be achieved by, by way of example only but is not limited to, gradually decreasing flight velocity and increasing the angle of attack until near-to-stall conditions are achieved. Then, the flight control system swiftly tilts the engine modules from their vertical orientation (e.g. thrust is opposite to the direction of flight) during the horizontal mode of flight to a horizontal orientation (e.g. thrust is perpendicular to the wing plane and/or directed downwards) for the vertical mode of flight. The flight control system changes from the horizontal mode of flight to the vertical mode of flight (e.g. hover). Thus, gradually the angle of attack is reduced and the engine modules (or rotor thrust) can be used to further decelerate by tilting the engine modules towards the horizontal orientation (e.g. in line with wing plane with thrust directed downwards). Once hover is achieved the flight control system fully switches to the vertical mode of flight (or hover mode). The system may abort or execute emergency procedure in case of malfunction.

When landing, the VTOL vehicle achieves a stable hover or vertical mode of flight above the landing site considering external conditions (wind, obstacles, etc.). The VTOL vehicle then gradually lowers thrust until max descend velocity is achieved. The flight control system monitors altitude and counters/landing gear descends by increasing thrust just before touch-down. Touch-down may not, by way of example only but not limited to, occur with all landing gear/legs/struts at once due to wind/slope which may require continuous controlled thrust/tilt of engine modules (or rotors) until VTOL vehicle is fully supported by the ground. The VTOL vehicle may execute emergency procedure in case of malfunction.

As can be seen, the high degrees of freedom for the independent control of a plurality of engine modules (e.g. in the example VTOL vehicle 100 according to the invention there were 8× rotor speed, 8× tilt mechanisms) allow better controllability and reaction to changing external environmental conditions (e.g., wind, turbulence). Although the example VTOL vehicles 100 and the like were described, for simplicity and by way of example only but are not limited to, having eight engine modules, it is to be appreciated by the skilled person that the VTOL vehicles 100 and the like as described herein may have at least one engine module on each wing of the VTOL as the application demands, or a plurality of engine modules on each wing of the VTOL vehicle as the application demands, or two or more engine modules on each wing of the VTOL vehicle as the application demands. The VTOL vehicle also allows for energy optimized flight paths, more stability of flight and enhances comfort to cargo and/or passengers and the like. Controlled flight is achieved with on-board flight control systems allowing less complex and less expensive airframes. There are also higher levels of redundancy with eight engine modules as compared to one or two engine modules of a helicopter.

Figure 7:
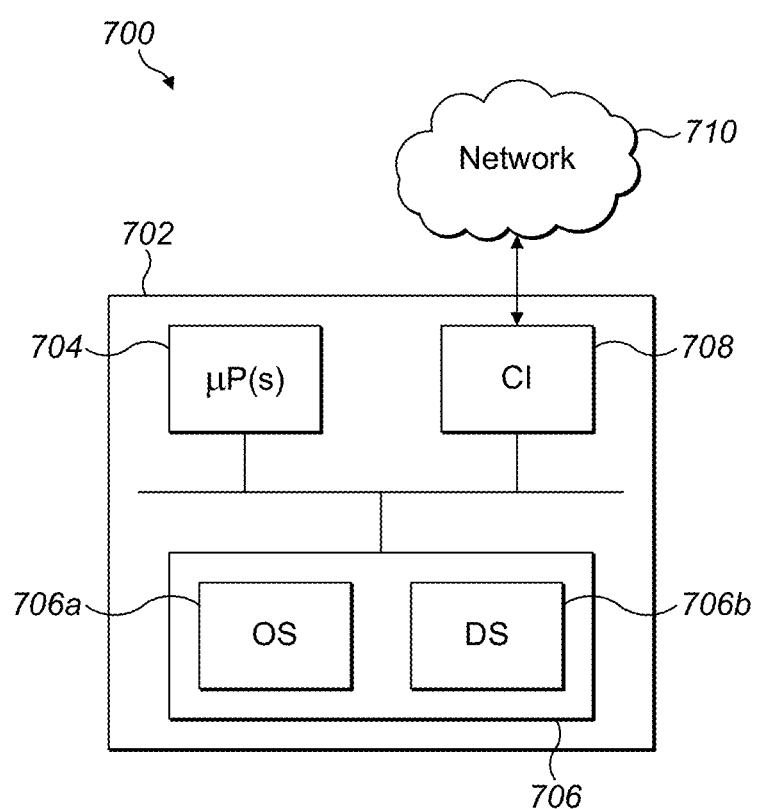
FIG. 7 is a schematic diagram illustrating an example computing device according to the invention.

FIG. 7 is a schematic diagram illustrating an example computing system that comprises at least one computing device 702 that may be used to implement one or more aspects of the VTOL vehicle, remote command systems, flight control systems and any other aspects according to the invention and/or includes the methods/process(es)/system(s) and apparatus as described with reference to FIGS. 1a-6c. Computing device 702 includes one or more processor unit(s) 704, memory unit 706 and communication interface 708 in which the one or more processor unit(s) 704 are connected to the memory unit 706 and the communication interface 708. The communications interface 708 may connect the computing device 702 with a subject, one or more device(s), one or more sensor(s), external or cloud storage or processing system(s) and the like. The memory unit 706 may store one or more program instructions, code or components such as, by way of example only but not limited to, an operating system 706a for operating computing device 702 and a data store 706b for storing additional data and/or further program instructions, code and/or components associated with implementing the functionality and/or one or more function(s) or functionality associated with the VTOL vehicle and/or functionality of one or more of the flight control system(s), user interfaces, autonomous devices, flight control device(s), tilt mechanism and engine module control, sets of flight mode(s), engine module configurations, method(s), process(es), any other functionality of the VTOL vehicle, remote operations centre as described with reference to FIGS. 1a to 6c, combinations thereof, modifications thereof and/or as described herein and the like according to the invention.

The memory unit may include a computer-readable medium with data or instruction code, which when executed on the processor unit, causes the processor unit to implement the functionality of the flight controller as described herein and/or modifications thereof. The apparatus or computing device may be further configured to implement the functionality of the autonomous device, the user interface and/or the sensor suite or interface with the sensor suite as described herein and/or modifications thereof.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform or implement the functionality of the flight control system(s), flight control device(s), tilt mechanism and engine module control, sets of flight mode(s), method(s), process(es), any other functionality of the VTOL vehicle as described with reference to FIGS. 1a to 6c, combinations thereof, modifications thereof and/or as described herein.

In the embodiment(s) and example(s) described above the flight control system and/or the operations control centre may include computing device(s) and/or one or more server(s), which may comprise a single server or a network of servers. In some examples the functionality or parts of the functionality of the computing device and/or server may be provided by a network of servers distributed across a geographical area, such as a worldwide distributed network of servers, and a user may be connected to an appropriate one of the network of servers based upon a user location.

There may be provided a computer-readable medium including data or instruction code, which when executed on one or more processor(s), causes the one or more processor(s) to implement the functionality and/or one or more function(s) or functionality associated with the VTOL vehicle and/or functionality of one or more of the flight control system(s), user interfaces, autonomous devices, flight control device(s), tilt mechanism and engine module control, sets of flight mode(s), engine module configurations, method(s), process(es), any other functionality of the VTOL vehicle, remote operations centre as described with reference to FIGS. 1a to 6c, combinations thereof, modifications thereof and/or as described herein and the like according to the invention.

There may also be provided an apparatus including a processor unit and a memory unit, the processor unit connected to the memory unit, the memory unit including a computer-readable medium comprising data or instruction code, which when executed on the processor unit, causes the processor unit to implement the functionality and/or one or more function(s) or functionality associated with the VTOL vehicle and/or functionality of one or more of the flight control system(s), user interfaces, autonomous devices, flight control device(s), tilt mechanism and engine module control, sets of flight mode(s), engine module configurations, method(s), process(es), any other functionality of the VTOL vehicle, remote operations centre as described with reference to FIGS. 1a to 6c, combinations thereof, modifications thereof and/or as described herein and the like according to the invention.

The above description discusses embodiments of the invention with reference to a single user for clarity. It will be understood that in practice the system may be shared by a plurality of users, and possibly by a very large number of users simultaneously.

The embodiments described above according to the invention can be a fully automatic or autonomous, semi-autonomous, remote controlled, and/or may require manual user control (e.g. pilot). In some examples a user or operator of the system may manually instruct some steps of the method(s) and/or process(es) to be carried out.

In the described embodiments of the invention the method(s), process(es) and/or system(s) may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence.

For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed:

1. A vertical take-off and landing, VTOL, vehicle comprising:
   a fuselage having longitudinally a front section, a central section, and a rear section;
   a first lifting surface comprising two rear wings respectively secured to opposite sides of the rear section of the fuselage, each respective rear wing comprising a respective cut-out along a respective trailing edge of the respective rear wing, each respective cut-out of the respective trailing edge mounted with a respective engine module, each respective engine module pivotable along a respective tilting axis perpendicular to the longitudinal axis of the fuselage and configured to be independently controlled to transition between a vertical mode of flight and a horizontal mode of flight;
   a second lifting surface comprising two front wings respectively secured to opposite sides of the front section of the fuselage, each respective front wing comprising a respective cut-out along a leading edge of the respective front wing, each respective cut-out of the respective leading edge mounted with a respective engine module, each respective engine module pivotable along a respective tilting axis perpendicular to the longitudinal axis of the fuselage and configured to be independently controlled to transition between a vertical mode of flight and a horizontal mode of flight,
   wherein a direction of a front opening of the respective cutout along the leading edge of the respective front wing is opposite a second direction of a rear opening of the respective cutout along the trailing edge of the respective rear wing.

2. The VTOL vehicle as claimed in claim 1, wherein the front opening and the rear openings are of a similar size and shape in longitudinally opposite directions.

3. A vertical take-off and landing, VTOL, vehicle comprising:
   a fuselage having longitudinally a front section, a central section and a rear section;
   a first lifting surface comprising two rear wings respectively secured to opposite sides of the rear section of the fuselage;
   a second lifting surface comprising two front wings respectively secured to opposite sides of the front section of the fuselage;
   a first tiling mechanism connected to the first lifting surface utilizing at least one rear strut, the first tilting mechanism comprising two or more rear engine modules, each of the two or more rear engine modules pivotable about a tilting axis perpendicular to the longitudinal axis of the fuselage; and
   a second tilting mechanism connected to the second lifting surface utilizing at least one front strut, the second tilting mechanism comprising two or more front engine modules, each of the two or more front engine modules pivotable about a tilting axis perpendicular to the longitudinal axis of the fuselage,
   wherein the at least one rear strut extending longitudinally from a trailing edge of the two rear wings and the at least one front strut extending longitudinally, opposite from a longitudinal direction of the at least one rear strut, from a leading edge of the two front wings.

4. A vertical take-off and landing, VTOL, vehicle comprising:
   a fuselage having longitudinally a front section, a central section and a rear section;
   a first lifting surface comprising two rear wings respectively secured to opposite sides of the rear section of the fuselage;

a second lifting surface comprising two front wings respectively secured to opposite sides of the front section of the fuselage; and at least one first support strut coupled to a rear portion of the rear section of the fuselage for supporting a first set of engine modules, the at least one first support strut extending longitudinally away from a respective trailing edge of a respective wing of the two rear wings;

at least one second support strut coupled to a front portion of the front section of the fuselage for supporting a second set of engine modules, the at least one second support strut extending longitudinally away from a respective leading edge of a respective wing of the two front wings, wherein each of the engine modules of the sets of engine modules being pivotally coupled to corresponding support struts and each engine module configured to be independently controlled to transition between a vertical mode of flight and a horizontal mode of flight, and wherein the first lifting surface is positioned in a staggered spaced apart configuration with respect to the second lifting surface.

5. The VTOL vehicle as claimed in claim 4, wherein the at least one first support strut connected to the rear portion of the fuselage for supporting the first set of engine modules is pivotable about a tilting axis perpendicular to the longitudinal axis of the fuselage.

6. The VTOL vehicle as claimed in claim 5, further comprising least one further rear support strut connected to the rear portion of the rear section of the fuselage, the at least one further rear support strut for supporting the one or more engine modules of the first set of engine modules, the one or more engine modules pivotable about a tilting axis perpendicular to the longitudinal axis of the fuselage.

7. The VTOL vehicle as claimed in claim 4, wherein the at least one second support strut connected to the front portion of the fuselage for supporting one or more engine modules of the second set of engine modules, the one or more engine modules pivotable about a tilting axis perpendicular to the longitudinal axis of the fuselage.

8. The VTOL vehicle as claimed in claim 7, further comprising at least one further front support strut connected to the front portion of the front section of the fuselage, the at least one further front support strut for supporting the one or more engine modules of the second set of engine modules, the one or more engine modules pivotable about a tilting axis perpendicular to the longitudinal axis of the fuselage.

9. The VTOL vehicle as claimed in claim 4, wherein:

the first set of engine modules comprises one or more engine modules associated with a first wing of the first lifting surface and one or more engine modules associated with a second wing of the first lifting surface; and the second set of engine modules comprises one or more engine modules associated with a first wing of the second lifting surface and one or more engine modules associated with a second wing of the second lifting surface.

10. The VTOL vehicle as claimed in claim 4, wherein each of the respective front wings and the respective rear wings have an end-tip distal from the end secured to the fuselage, the VTOL vehicle further comprising:

a first stabiliser connecting the end-tip of a first wing of the first lifting surface secured to a first side of the fuselage with the end-tip of a first wing of the second lifting surface secured to the first side of the fuselage; and a second stabiliser connecting the end-tip of a second wing of the first lifting surface secured to a second side of the fuselage opposite the first side with the end-tip of a second wing of the second lifting surface secured to the second side of the fuselage.

11. The VTOL vehicle as claimed in claim 4, wherein the staggered spaced apart configuration comprises the first lifting surface being secured to an upper portion of the fuselage and the second lifting surface being secured to a lower portion of the fuselage.

12. The VTOL, vehicle as claimed in claim 4, wherein a distance between the at least one first support strut and the at least second support strut is in a longitudinal direction with respect to the VTOL more than a distance between the respective leading edge and the respective trailing edge.

* * * * *